United States Patent
Ohlsen et al.

(10) Patent No.: US 6,641,948 B1
(45) Date of Patent: Nov. 4, 2003

(54) FUEL CELLS HAVING SILICON SUBSTRATES AND/OR SOL-GEL DERIVED SUPPORT STRUCTURES

(75) Inventors: Leroy J. Ohlsen, Seattle, WA (US);
Aaron M. Cooke, Seattle, WA (US);
Jonathan C. Mallari, Seattle, WA (US); Chung M. Chan, Bellevue, WA (US); Gordon L. Rice, Seattle, WA (US); Craig E. Nelson, Seattle, WA (US)

(73) Assignee: Neah Power Systems Inc, Bothell, WA (US)

(*) Notice: Subject to any disclaimer, the term of this patent is extended or adjusted under 35 U.S.C. 154(b) by 170 days.

(21) Appl. No.: 09/715,830

(22) Filed: Nov. 17, 2000

Related U.S. Application Data
(60) Provisional application No. 60/200,866, filed on May 2, 2000, provisional application No. 60/189,205, filed on Mar. 14, 2000, and provisional application No. 60/166,372, filed on Nov. 17, 1999.

(51) Int. Cl.[7] .......................... H01M 4/86; H01M 4/92; H01M 4/94; H01M 8/10

(52) U.S. Cl. .............................. 429/44; 429/30; 429/32; 429/40; 429/41; 429/42

(58) Field of Search .............................. 429/30, 32, 40, 429/41, 42, 44, 46

(56) References Cited

U.S. PATENT DOCUMENTS

| | | | |
|---|---|---|---|
| 3,506,561 A | 4/1970 | Ceasar | 204/290 |
| 4,262,063 A | 4/1981 | Kudo et al. | 429/41 |
| 4,337,137 A | 6/1982 | Ezzell | 204/252 |

(List continued on next page.)

FOREIGN PATENT DOCUMENTS

| | | |
|---|---|---|
| DE | 196 24 887 A1 | 1/1997 |
| DE | 196 25 617 A1 | 1/1998 |
| DE | 196 46 487 A1 | 5/1998 |

OTHER PUBLICATIONS

Kelly et al; Sep. 2000; No. XP–002196002; abstract; "A miniature methanol/air polymer electrolyte fuel cell"; Electrochemical and Solid State Letters; vol. 3, No. 9; pp. 407–409.

Kendall, DL; Jul. 1990; No. XP000223116; abstract; "A New Theory for the Anisotropic Etching of Silicon and Some Underdeveloped Chemical Micromachining Concepts"; p. 3604, Journal of Vacuum Science and Technology, vol. 8, No. 4.

Derwent World Patent Index Acc. No. 1997–053958/199706, abstract of DE 196 24 887 A1, Jan. 2, 1997.

(List continued on next page.)

*Primary Examiner*—Randy Gulakowski
*Assistant Examiner*—Jonathan Crepeau
(74) *Attorney, Agent, or Firm*—Thomas E Loop

(57) ABSTRACT

Fuels cells, electrode assemblies, and electrodes that comprise silicon and/or sol-gel derived support structures, as well as to methods relating thereto, are disclosed herein. In one embodiment, the invention is directed to an electrode assembly adapted for use with a fuel cell comprises: an anode derived from a first planar silicon substrate; an electrolyte; a cathode derived from a second planar silicon substrate; wherein the anode and the cathode are parallel to each other and separated by an interstitial region comprising the electrolyte. In another embodiment, the invention is directed to electrode adapted for use with a fuel cell, wherein the electrode comprises a silicon substrate that functions as a current conductor, wherein the silicon substrate has a plurality of pores that define pore surfaces, wherein at least a portion of the pore surfaces have a catalyst thereon, wherein the catalyst is derived from one or more metallic precursors chemisorbed onto at least the pore surfaces.

55 Claims, 54 Drawing Sheets

U.S. PATENT DOCUMENTS

| | | | |
|---|---|---|---|
| 4,390,603 A | 6/1983 | Kawana et al. | 429/30 |
| 4,407,905 A | 10/1983 | Takeuchi et al. | 429/42 |
| 4,420,544 A | 12/1983 | Lawson et al. | 429/13 |
| 4,469,579 A | 9/1984 | Covitch et al. | 204/283 |
| 4,478,917 A | 10/1984 | Fujita et al. | 429/33 |
| 4,500,395 A | 2/1985 | Nakamura | 204/284 |
| 4,537,840 A | 8/1985 | Tsukui et al. | 429/33 |
| 4,562,123 A | 12/1985 | Shimizu et al. | 429/27 |
| 4,593,534 A | 6/1986 | Bloomfield | 62/201 |
| 4,610,938 A | 9/1986 | Appleby | 429/42 |
| 4,612,261 A | 9/1986 | Tsukui et al. | 429/13 |
| 4,629,664 A | 12/1986 | Tsukui et al. | 429/23 |
| 4,659,634 A | 4/1987 | Struthers | 429/19 |
| 4,664,761 A | 5/1987 | Zupancic et al. | 204/129 |
| 4,673,624 A | 6/1987 | Hockaday | 429/41 |
| 4,828,941 A | 5/1989 | Sterzel | 429/33 |
| 4,851,377 A | 7/1989 | Breault | 502/101 |
| 4,863,813 A | 9/1989 | Dyer | 429/33 |
| 4,876,115 A | 10/1989 | Raistrick | 427/115 |
| 4,910,099 A | 3/1990 | Gottesfeld | 429/13 |
| 4,931,168 A | 6/1990 | Watanabe et al. | 204/284 |
| 5,028,498 A | 7/1991 | Lindström | 429/40 |
| 5,084,144 A | 1/1992 | Reddy et al. | 205/104 |
| 5,132,193 A | 7/1992 | Reddy et al. | 429/13 |
| 5,242,764 A | 9/1993 | Dhar | 429/30 |
| 5,262,021 A | 11/1993 | Lehmann et al. | 204/129 |
| 5,292,600 A | 3/1994 | Kaufman | 429/39 |
| 5,338,430 A | 8/1994 | Parsonage et al. | 204/412 |
| 5,364,711 A | 11/1994 | Yamada et al. | 429/15 |
| 5,409,785 A | 4/1995 | Nakano et al. | 429/33 |
| 5,432,023 A | 7/1995 | Yamada et al. | 429/34 |
| 5,468,574 A | 11/1995 | Ehrenberg et al. | 429/33 |
| 5,518,831 A | 5/1996 | Tou et al. | 429/42 |
| 5,523,177 A | 6/1996 | Kosek et al. | 429/40 |
| 5,525,436 A | 6/1996 | Savinell et al. | 429/30 |
| 5,573,866 A | 11/1996 | Van Dine et al. | 429/13 |
| 5,599,638 A | 2/1997 | Surampudi et al. | 429/33 |
| 5,631,099 A | 5/1997 | Hockaday | 429/30 |
| 5,672,438 A | 9/1997 | Banerjee et al. | 429/33 |
| 5,672,439 A | 9/1997 | Wilkinson et al. | 429/40 |
| 5,677,074 A | 10/1997 | Serpico et al. | 429/43 |
| 5,679,482 A | 10/1997 | Ehrenberg et al. | 429/249 |
| 5,683,828 A | 11/1997 | Spear et al. | 429/13 |
| 5,683,829 A | 11/1997 | Sarangapani | 429/42 |
| 5,702,839 A | 12/1997 | Frost et al. | 429/42 |
| 5,723,228 A | 3/1998 | Okamoto | 429/12 |
| 5,759,712 A | 6/1998 | Hockaday | 429/30 |
| 5,766,786 A | 6/1998 | Fleck et al. | 429/17 |
| 5,773,162 A | 6/1998 | Surampudi et al. | 429/39 |
| 5,795,668 A | 8/1998 | Banerjee | 429/33 |
| 5,849,428 A | 12/1998 | Hamlen | 429/33 |
| 5,853,798 A | 12/1998 | Dubé | 427/125 |
| 5,856,036 A | 1/1999 | Smotkin et al. | 429/40 |
| 5,861,222 A | 1/1999 | Fischer et al. | 429/42 |
| 5,863,673 A | 1/1999 | Campbell et al. | 429/44 |
| 5,865,968 A | 2/1999 | Denton et al. | 204/284 |
| 5,869,416 A | 2/1999 | Mussell | 502/101 |
| 5,871,860 A | 2/1999 | Frost et al. | 429/40 |
| 5,874,182 A | 2/1999 | Wilkinson et al. | 429/30 |
| 5,879,827 A | 3/1999 | Debe et al. | 429/40 |
| 5,879,828 A | 3/1999 | Debe et al. | 429/41 |
| 5,882,810 A | 3/1999 | Mussell et al. | 429/33 |
| 5,885,727 A | 3/1999 | Kawatsu | 429/17 |
| 5,904,740 A | 5/1999 | Davis | 44/385 |
| 5,910,378 A | 6/1999 | Debe et al. | 429/42 |
| 5,916,505 A | 6/1999 | Cisar et al. | 264/85 |
| 5,919,583 A | 7/1999 | Grot et al. | 429/33 |
| 5,925,476 A | 7/1999 | Kawatsu | 429/24 |
| 5,935,726 A | 8/1999 | Chow et al. | 429/13 |
| 5,945,231 A | 8/1999 | Narayanan et al. | 429/30 |
| 5,952,119 A | 9/1999 | Wilson | 429/34 |
| 5,958,616 A | 9/1999 | Salinas et al. | 429/41 |
| 5,976,726 A | 11/1999 | Wilkinson et al. | 429/35 |
| 5,981,097 A | 11/1999 | Rajendran | 429/33 |
| 5,992,008 A | 11/1999 | Kindler | 29/730 |
| 6,001,500 A | 12/1999 | Bass et al. | 429/31 |
| 6,010,798 A | 1/2000 | Hammerschmidt et al. | 429/30 |
| 6,011,324 A | 1/2000 | Kohlstruck et al. | 307/64 |
| 6,013,386 A | 1/2000 | Lewin et al. | 429/30 |
| 6,015,634 A | 1/2000 | Bonville, Jr. et al. | 429/17 |
| 6,017,646 A | 1/2000 | Prasad et al. | 429/13 |
| 6,020,083 A | 2/2000 | Breault et al. | 429/36 |
| 6,024,848 A | 2/2000 | Dufner et al. | 204/252 |
| 6,028,414 A | 2/2000 | Chouinard et al. | 320/110 |
| 6,033,793 A | 3/2000 | Woods et al. | 429/17 |
| 6,039,823 A | 3/2000 | Grasso et al. | 156/89.26 |
| 6,040,073 A | 3/2000 | Okamoto | 429/26 |
| 6,042,968 A | 3/2000 | Onorato et al. | 429/188 |
| 6,045,933 A | 4/2000 | Okamoto | 429/17 |
| 6,045,935 A | 4/2000 | Ketcham et al. | 429/30 |
| 6,048,383 A | 4/2000 | Breault et al. | 95/44 |
| 6,048,634 A | 4/2000 | Kaufman et al. | 429/34 |
| 6,051,173 A | 4/2000 | Fasano et al. | 264/44 |
| 6,053,266 A | 4/2000 | Greenhill et al. | 180/65.3 |
| 6,054,228 A | 4/2000 | Cisar et al. | 429/18 |
| H1849 H | 5/2000 | Fourie et al. | 429/17 |
| 6,060,188 A | 5/2000 | Muthuswamy et al. | 429/31 |
| 6,060,190 A | 5/2000 | Campbell et al. | 429/40 |
| 6,063,515 A | 5/2000 | Epp et al. | 429/17 |
| 6,063,516 A | 5/2000 | Grot et al. | 429/22 |
| 6,063,517 A | 5/2000 | Montemayor et al. | 429/31 |
| 6,066,409 A | 5/2000 | Ronne et al. | 429/39 |
| 6,068,941 A | 5/2000 | Fuller et al. | 429/13 |
| 6,068,943 A | 5/2000 | Divisek et al. | 429/17 |
| 6,074,692 A | 6/2000 | Hulett | 427/115 |
| 6,074,769 A | 6/2000 | Johnssen | 429/2 |
| 6,074,770 A | 6/2000 | Autenrieth et al. | 429/19 |
| 6,074,773 A | 6/2000 | Wilkinson et al. | 429/41 |
| 6,077,620 A | 6/2000 | Pettit | 429/26 |
| 6,080,500 A | 6/2000 | Fuju et al. | 429/12 |
| 6,080,502 A | 6/2000 | Nolscher et al. | 429/34 |
| 6,083,637 A | 7/2000 | Walz et al. | 429/17 |
| 6,083,863 A | 7/2000 | Autenrieth et al. | 502/56 |
| 6,087,031 A | 7/2000 | Iwasaki et al. | 429/33 |
| 6,087,032 A | 7/2000 | Yoshitake et al. | 429/33 |
| 6,093,501 A | 7/2000 | Werth | 429/17 |
| 6,096,286 A | 8/2000 | Autenrieth | 423/651 |
| 6,096,448 A | 8/2000 | Wilkinson et al. | 429/13 |
| 6,099,983 A | 8/2000 | Nakagaki et al. | 429/13 |
| 6,099,984 A | 8/2000 | Rock | 429/39 |
| 6,103,414 A | 8/2000 | Cabasso et al. | 429/33 |
| 6,106,964 A | 8/2000 | Voss et al. | 429/20 |
| 6,107,691 A | 8/2000 | Gore et al. | 290/1 R |
| 6,110,613 A | 8/2000 | Fuller | 429/17 |
| 6,117,581 A | 9/2000 | Shelef | 429/44 |
| 6,124,052 A | 9/2000 | Katoh et al. | 429/33 |
| 6,124,054 A | 9/2000 | Gorman et al. | 429/34 |
| 6,132,895 A | 10/2000 | Pratt et al. | 429/39 |
| 6,361,892 B1 * | 3/2002 | Ruhl et al. | 429/30 |

FOREIGN PATENT DOCUMENTS

| | | | |
|---|---|---|---|
| DE | 19757320 | | 7/1999 |
| DE | 198 20 756 | * | 11/1999 |
| EP | 717 458 A1 | | 6/1996 |
| EP | 942 482 A2 | | 9/1999 |
| EP | 951 084 A2 | | 10/1999 |
| FR | 2667728 | * | 4/1992 |
| JP | 11-3724 | | 1/1999 |
| JP | 11-3725 | | 1/1999 |
| JP | 11-7964 | | 1/1999 |
| JP | 11-16587 | | 1/1999 |

| | | |
|---|---|---|
| JP | 11-16588 | 1/1999 |
| JP | 11-135137 | 5/1999 |
| JP | 11-144745 | 5/1999 |
| JP | 11-273695 | 10/1999 |
| RU | 2148878 | 5/2000 |
| WO | WO 99/54389 | 10/1990 |
| WO | WO 95/13869 | 5/1995 |
| WO | WO 96/29752 | 9/1996 |
| WO | WO 97/21256 | 6/1997 |
| WO | WO 97/43796 | 11/1997 |
| WO | WO 97/50140 | 12/1997 |
| WO | WO 97/50141 | 12/1997 |
| WO | WO 98/04014 | 1/1998 |
| WO | WO 98/21777 | 5/1998 |
| WO | WO 98/22989 | 5/1998 |
| WO | WO 98/45694 | 10/1998 |
| WO | WO 98/50974 | 11/1998 |
| WO | WO 98/50975 | 11/1998 |
| WO | WO 98/52243 | 11/1998 |
| WO | WO 98/54777 | 12/1998 |
| WO | WO 98/56058 | 12/1998 |
| WO | WO 99/04444 | 1/1999 |
| WO | WO 99/06138 | 2/1999 |
| WO | WO 99/08336 | 2/1999 |
| WO | WO 99/10165 | 3/1999 |
| WO | WO 99/15007 | 4/1999 |
| WO | WO 99/16546 | 4/1999 |
| WO | WO 99/31012 | 6/1999 |
| WO | WO 99/34467 | 7/1999 |
| WO | WO 99/38223 | 7/1999 |
| WO | WO 99/39398 | 8/1999 |
| WO | WO 99/44253 | 9/1999 |
| WO | WO 99/54407 | 10/1999 |
| WO | WO 99/61368 | 12/1999 |
| WO | WO 99/66575 | 12/1999 |
| WO | WO 00/03126 | 1/2000 |
| WO | WO 00/13791 | 3/2000 |
| WO | WO 00/24072 | 4/2000 |
| WO | WO 00/24073 | 4/2000 |
| WO | WO 00/26136 | 5/2000 |
| WO | WO 00/39876 | 7/2000 |
| WO | WO 00/44055 | 7/2000 |
| WO | WO 00/45457 | 8/2000 |
| WO | WO 00/55928 | 9/2000 |
| WO | WO 00/543531 | 9/2000 |
| WO | WO 00/69007 | 11/2000 |

OTHER PUBLICATIONS

Derwent World Patent Index Acc. No. 1998–063982/199807, abstract of DE 196 25 617 A1, Jan. 8, 1998.

Derwent World Patent Index Acc. No. 1998–273188/199825, abstract of DE 196 46 487 A1, May 14, 1998.

Derwent World Patent Index Acc. No. 1999–362890/199931, abstract of JP 11–135137, May 21, 1999.

Derwent World Patent Index Acc. No. 1999–377254/199932, abstract of JP 11–144745, May 28, 1999.

Derwent World Patent Index Acc. No. 1999–159163/199914, abstract of JP 11–16587, Jan. 22, 1999.

Derwent World Patent Index Acc. No. 1999–159164/199914, abstract of JP 11–16588. Jan. 22, 1999.

Derwent World Patent Index Acc. No. 1999–624874/199954, abstract of JP 11–273695, Oct. 8, 1999.

Derwent World Patent Index Acc. No. 1999–127387/199911, abstract of JP 11–3724, Jan. 6, 1999.

Derwent World Patent Index Acc. No. 1999–127388/199911, abstract of JP 11–3725, Jan. 6, 1999.

Derwent World Patent Index Acc. No. 1999–138633/199912, abstract of JP 11–7964, Jan. 12, 1999.

* cited by examiner

Dimensions in microns

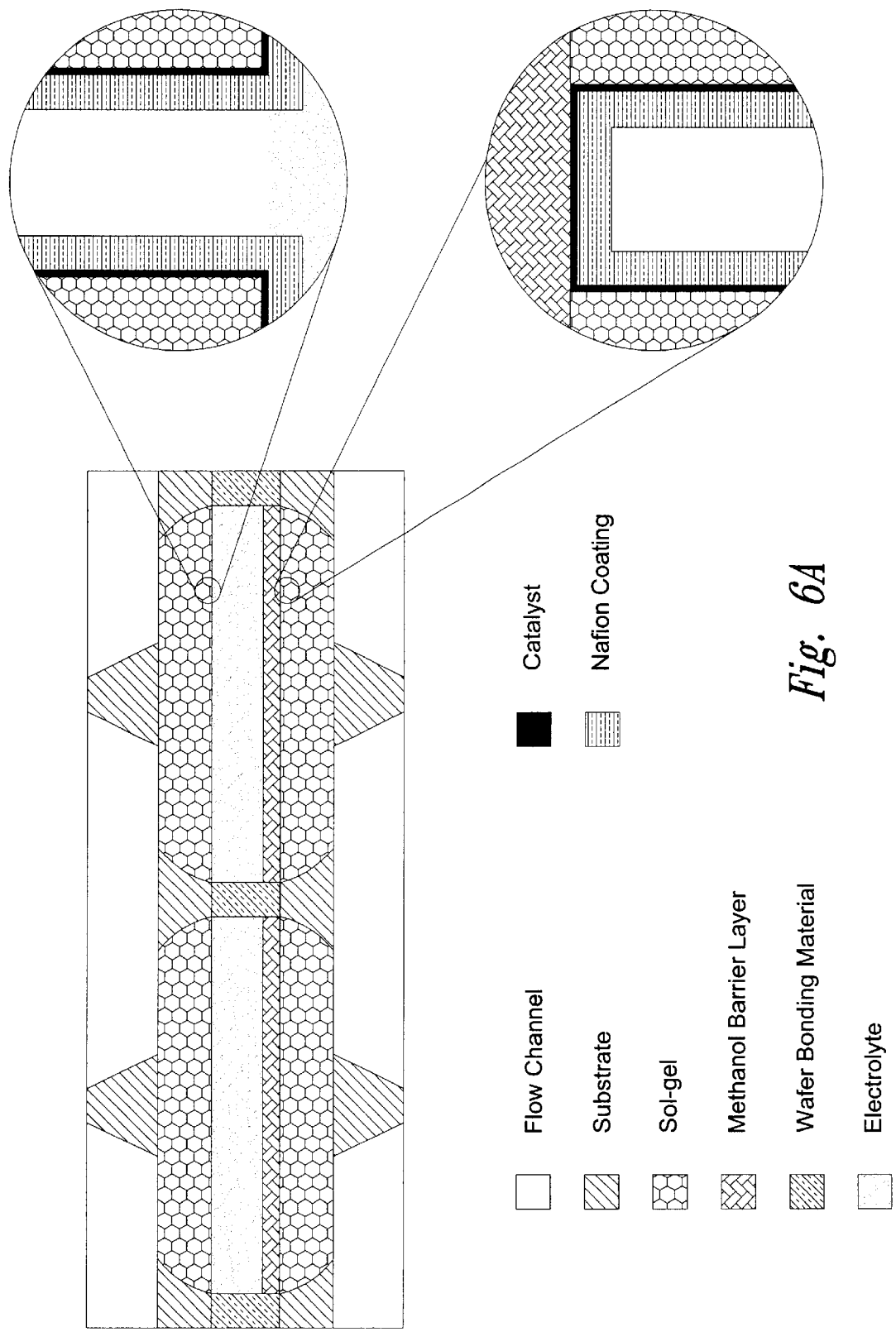

- Flow Channel
- Substrate
- Sol-gel
- Methanol Barrier Layer
- Wafer Bonding Material
- Electrolyte Top View (Anode and Cathode are similar)

☐ Flow Channel
▨ Substrate
▥ Porous Silicon
▩ Methanol Barrier Layer
▨ Wafer Bonding Material
░ Electrolyte ☐ Flow Channel
▨ Substrate
▥ Porous Silicon
▩ Methanol Barrier Layer
▦ Electrolyte ☐ Flow Channel
▨ Substrate
⬡ Sol-gel
▩ Methanol Barrier Layer
▢ Electrolyte Side 1 (S1)

Side 2 (S2)

Substrate

Silicon Nitride

Substrate

Silicon Nitride

Substrate

Hexamethyldilazane

Silicon Nitride

Substrate

Hexamethyldilazane

Photoresist

Silicon Nitride

Substrate

Hexamethyldilazane

Photoresist

| | Silicon Nitride |
| --- | --- |
| | Substrate |
| | Hexamethyldilazane |
| | Photoresist |

| | Silicon Nitride |
| --- | --- |
| | Substrate |
| | Hexamethyldilazane |
| | Photoresist |

|  | Silicon Nitride |
|---|---|
|  | Substrate |
|  | Hexamethyldilazane |
|  | Photoresist |

|  | Silicon Nitride |
|---|---|
|  | Substrate |

- ▨ Silicon Nitride
- ☐ Flow Channel
- ▨ Substrate

- ▨ Silicon Nitride
- ☐ Flow Channel
- ▨ Substrate
- ▦ Hexamethyldilazane

| | Silicon Nitride |
| --- | --- |
| | Flow Channel |
| | Substrate |
| | Hexamethyldilazane |
| | Photoresist |

| | Silicon Nitride |
| --- | --- |
| | Flow Channel |
| | Substrate |
| | Hexamethyldilazane |
| | Photoresist |

| | Silicon Nitride |
| --- | --- |
| | Flow Channel |
| | Substrate |
| | Hexamethyldilazane |
| | Photoresist |

☒ Silicon Nitride

☐ Flow Channel

▨ Substrate

☒ Silicon Nitride

☐ Flow Channel - Coated with Aluminum

▨ Substrate

▦ Aluminum Ohmic Contact

Silicon Nitride

Flow Channel - Coated with Aluminum

Substrate

Porous Silicon

Aluminum Ohmic Contact

Silicon Nitride

Flow Channel

Substrate

Porous Silicon

| | Flow Channel |
| --- | --- |
| ▨ | Substrate |
| ⦀ | Porous Silicon |

| ▨ | Silicon Nitride |
| --- | --- |
| | Flow Channel |
| ▨ | Substrate |
| ▨ | Hexamethyldilazane |
| ▨ | Photoresist |

UV Exposure

| | Silicon Nitride |
|---|---|
| | Flow Channel |
| | Substrate |
| | Hexamethyldilazane |
| | Photoresist |

| | Silicon Nitride |
|---|---|
| | Flow Channel |
| | Substrate |
| | Hexamethyldilazane |
| | Photoresist |

|  | Silicon Nitride |
|---|---|
|  | Flow Channel |
|  | Substrate |

|  | Silicon Nitride |
|---|---|
|  | Flow Channel - Coated with Aluminum |
|  | Substrate |
|  | Aluminum Ohmic Contact |

| | Silicon Nitride |
| --- | --- |
| | Flow Channel - Coated with Aluminum |
| | Substrate |
| | Porous Silicon |
| | Aluminum Ohmic Contact |

| | Silicon Nitride |
| --- | --- |
| | Flow Channel |
| | Substrate |
| | Porous Silicon |

| | Flow Channel |
| --- | --- |
| | Substrate |
| | Porous Silicon |

| | Flow Channel |
| --- | --- |
| | Substrate |
| | Porous Silicon |
| | Hexamethyldilazane |

| | Flow Channel |
|---|---|
|  | Substrate |
|  | Porous Silicon |
|  | Hexamethyldilazane |
|  | Photoresist |

Flow Channel

Substrate

Porous Silicon

Hexamethyldilazane

Photoresist

UV Exposure

| | Flow Channel |
| --- | --- |
| ▨ | Substrate |
| ▥ | Porous Silicon |
| ▦ | Hexamethyldilazane |
| ▩ | Photoresist |

- ☐ Flow Channel
- ▨ Substrate
- ▥ Porous Silicon
- ▨ Hexamethyldilazane
- ▨ Photoresist
- ▨ Methanol Barrier Layer

- ☐ Flow Channel
- ▨ Substrate
- ▥ Porous Silicon
- ▨ Methanol Barrier Layer

| | Flow Channel |
|---|---|
|  | Substrate |
|  | Porous Silicon |
|  | Wafer Bonding Material |

- ☐ Flow Channel
- ▨ Substrate
- ▥ Porous Silicon
- ▨ Methanol Barrier Layer
- ▨ Wafer Bonding Material

| | Flow Channel |
| | Substrate |
| | Porous Silicon |
| | Methanol Barrier Layer |
| | Wafer Bonding Material |
| | Electrolyte |

| | Flow Channel |
| --- | --- |
| | Substrate |
| | Porous Silicon |
| | Electrolyte |

| | Flow Channel |
| --- | --- |
| | Substrate |
| | Porous Silicon |
| | Methanol Barrier Layer |
| | Electrolyte |

☐ Flow Channel

▨ Substrate

▥ Porous Silicon

▧ Methanol Barrier Layer

☐ Electrolyte

|  | Silicon Nitride |
|---|---|
|  | Substrate |
|  | Hexamethyldilazane |

|  | Silicon Nitride |
|---|---|
|  | Substrate |
|  | Hexamethyldilazane |
|  | Photoresist |

| | Silicon Nitride |
| --- | --- |
| | Substrate |
| | Hexamethyldilazane |
| | Photoresist |

| | Silicon Nitride |
| --- | --- |
| | Substrate |
| | Hexamethyldilazane |
| | Photoresist |

UV Exposure

☒ Silicon Nitride

☒ Substrate

☒ Silicon Nitride

☒ Substrate

☐ Flow Channel & Cavity for Porous Medium

Substrate

Flow Channel & Cavity for Porous Medium

Substrate

Flow Channel & Cavity for Porous Medium

Sol-gel in Solution Form

| | Substrate |
| --- | --- |
| | Flow Channel & Cavity for Porous Medium |
| | Sol-gel in Solution Form |

| | Substrate |
| --- | --- |
| | Flow Channel |
| | Sol-gel |

| | Substrate |
| --- | --- |
| | Flow Channel |
| | Sol-gel |
| | Hexamethyldilazane |

| | Substrate |
| --- | --- |
| | Flow Channel |
| | Sol-gel |
| | Hexamethyldilazane |
| | Photoresist |

| | Substrate |
| --- | --- |
| | Flow Channel |
| | Sol-gel |
| | Methanol Barrier Layer |

| | Substrate |
| --- | --- |
| | Flow Channel & Cavity for Porous Medium |
| | Sol-gel |
| | Wafer Bonding Material |

| | Substrate |
|---|---|
| | Flow Channel |
| | Sol-gel |
| | Wafer Bonding Material |
| | Methanol Barrier Layer |

| | Substrate |
| | Flow Channel |
| | Sol-gel |
| | Wafer Bonding Material |
| | Methanol Barrier Layer |
| | Electrolyte |

| | Substrate |
| --- | --- |
| | Flow Channel & Cavity for Porous Medium |
| | Sol-gel |
| | Electrolyte |

| | Substrate |
| --- | --- |
| | Flow Channel |
| | Sol-gel |
| | Electrolyte |
| | Methanol Barrier Layer |

| | Substrate |
| | Flow Channel |
| | Sol-gel |
| | Electrolyte |
| | Methanol Barrier Layer |

FUEL CELLS HAVING SILICON SUBSTRATES AND/OR SOL-GEL DERIVED SUPPORT STRUCTURES

CROSS-REFERENCE TO RELATED APPLICATIONS

This application claims the benefit of U.S. Provisional Patent Application No. 60/166,372 filed Nov. 17, 1999; U.S. Provisional Patent Application No. 60/189,205 filed Mar. 14, 2000, and; U.S. Provisional Patent Application No. 60/200,866 filed May 2, 2000; which provisional applications are incorporated herein by reference in their entireties.

TECHNICAL FIELD

The present invention relates generally to fuel cells and, more specifically, to fuels cells, electrode assemblies, and electrodes that comprise silicon substrates and/or sol-gel derived support structures, as well as to methods relating thereto.

BACKGROUND OF THE INVENTION

A fuel cell is an energy conversion device that consists essentially of two electrodes, an anode and a cathode, and an electrolyte that is interposed between the anode and cathode. Unlike a battery, fuel cell reactants are supplied externally rather than internally. Fuel cells operate by converting fuels, such as hydrogen or methanol, to electrical power through an electrochemical process rather than combustion. It does so by harnessing the electrons released from controlled oxidation-reduction reactions occurring on the surface of a catalyst. A fuel cell can produce electricity continuously so long as fuel is supplied from an outside source.

In electrochemical fuel cells employing methanol as the fuel supplied to the anode, the electrochemical reactions are essentially as follows: first, a methanol molecule's carbon-hydrogen, and oxygen-hydrogen bonds are broken to generate electrons and protons; simultaneously, a water molecule's oxygen-hydrogen bond is also broken to generate an additional electron and proton. The carbon from the methanol and the oxygen from the water combine to form carbon dioxide. Oxygen from air supplied to the cathode is reduced to anions with the addition of electrons. The ions formed at the anode and the cathode migrate through the interposing electrolyte and combine to form water. Thus, the electrochemical reactions of a direct methanol fuel cell (DMFC) are as follows:

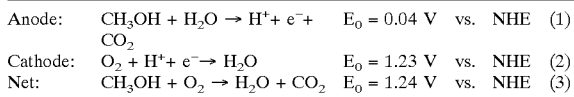

| Anode: | $CH_3OH + H_2O \rightarrow H^+ + e^- + CO_2$ | $E_0 = 0.04$ V vs. NHE | (1) |
| --- | --- | --- | --- |
| Cathode: | $O_2 + H^+ + e^- \rightarrow H_2O$ | $E_0 = 1.23$ V vs. NHE | (2) |
| Net: | $CH_3OH + O_2 \rightarrow H_2O + CO_2$ | $E_0 = 1.24$ V vs. NHE | (3) |

With respect to state-of-the-art fuels cells, electrode assemblies, and electrodes, several different configurations and structures have been contemplated. For example, numerous attempts have been made to construct fuel cells and electrode assemblies that utilize a solid polymer electrolyte (SPE) as an integral part of the electrode assembly (hence, the term membrane electrode assembly (MEA) has been coined). A significant problem, however, with DMFCs utilizing solid polymer electrolytes is a phenomenon known as "methanol crossover." As is depicted in FIG. 1, methanol in conventional DMFCs has a tendency to cross-over from the anode to the cathode via diffusion (i.e., it migrates through the electrolyte), where it adsorbs onto the cathode catalyst and reacts with oxygen from the air resulting in a parasitic loss of methanol fuel and concomitant reduction in fuel cell voltage. Indeed, performance losses of 40–100 mV at a given current density have been observed at the cathode of DMFCs utilizing a direct methanol feed (Potje-Kamloth et al., Abstract No. 105, Extended Abstracts 92-2, "Fall Meeting of the Electrochemical Society" (1992), (Kuver et al., *J. Power Sources* 52:77 (1994)).

Exemplary solid polymer electrolyte DMFCs include those that have recently been developed by NASA's Jet Propulsion Laboratory (JPL). A detailed description of such JPL fuel cell designs may be found, for example, in U.S. Pat. No. 5,523,177 to Kosek et al., U.S. Pat. No. 5,599,638 to Surampundi et al., U.S. Pat. No. 5,773,162 to Surampundi et al., and U.S. Pat. 5,945,231 to Narayanan et al. Although the teachings associated with these patents have arguably advanced the art, the various membrane electrode assemblies (MEAs) disclosed therein do not eliminate the problem of methanol cross-over.

Other attempts for reducing methanol cross-over in solid polymer electrolyte DMFCs include structural modifications of the central solid polymer membrane. Exemplary in this regard are the MEAs disclosed in U.S. Pat. No. 4,664,761 to Zupancic et al. (discloses proton-conducting membrane made of an interpenetrating polymer network), U.S. Pat. No. 5,672,438 to Banarjee et al. (discloses proton-conducting laminated membrane), and U.S. Pat. No. 5,919,583 to Grot et al. (discloses proton-conducting membrane that includes an inorganic filler). Although the various MEA designs disclosed in these patents are able to reduce methanol cross-over to some degree, they nevertheless still have relatively high methanol permeabilities.

In addition to methanol cross-over, another significant problem with state-of-the-art fuel cell designs (especially solid polymer electrolyte DMFC designs) is catalytic inefficiency. For example, conventional solid polymer electrolyte DMFC designs generally attempt to maximize the surface contact between the catalyst and the solid polymer electrolyte. In this regard, it is reportedly crucial to maximize the three-phase interface that exists between the catalyst, the solid polymer electrolyte membrane, and the reactants (that permeate through the solid polymer electrolyte); such a three-phase boundary is reportedly needed to enhance efficiency and electrical capacity. As a result, a primary objective of previous DMFC research has been to optimize catalyst use by maximizing the surface area of catalyst in contact with the solid polymer electrolyte (catalyst not in direct contact with the solid polymer electrolyte has been termed "non-reacting" catalyst).

Thus, conventional methods for fabricating high-surface-area electro-catalytic electrodes for use with solid polymer electrolyte DMFCs generally include: (1) depositing on the surface of a solid polymer electrolyte either a porous metal film, a planar distributions of metal particles, or carbon supported catalyst powders; (2) embedding metal grids or meshes into the surface of a solid polymer electrolyte; or (3) embedding catalytically active components into the surface of a solid polymer electrolyte. All of these conventional methods employ traditional electrocatalyst deposition techniques such as, for example, electroplating, sputtering and metal evaporation. As such, these methods generally result in catalyst loadings in excess of 0.4 mg/cm². A conventional state-of-the-art electrode assembly is shown in FIG. 2A, and a conventional catalyst utilization scheme is shown in FIG. 2B (wherein the three-phase interface between the catalyst, the membrane, and the reactants are shown). As shown in FIG. 2A, an exemplary conventional state-of-the-art electrode assembly 200 consists essentially of a graphite block 202 (that functions as a current collector and as a flow field), an interposing Teflon mask 204, a porous anode 206, a catalyzed membrane 208 (with embedded catalyst particles), a porous cathode 210, a second interposing Teflon mask 212, and a graphite block 214, all of which are sandwiched together. The conventional fabrication techniques and materials associated with making such state-of-the art fuel cells are not generally amenable to miniaturization or mass production.

Although significant progress has been made with respect to these and other fuel cell problems, there is still a need in the art for improved fuels cells, electrode assemblies, and electrodes. The present invention fulfills these needs and provides for further related advantages.

SUMMARY OF THE INVENTION

In brief, the present invention is directed fuels cells, electrode assemblies, and electrodes that comprise silicon substrates and/or sol-gel derived support structures, as well as to methods relating thereto. In one embodiment, the present invention is directed to an electrode assembly adapted for use with a fuel cell, wherein the electrode assembly comprises: an anode derived from a first planar silicon substrate; an electrolyte; a cathode derived from a second planar silicon substrate; wherein the anode and the cathode are spaced apart and substantially parallel to each other so as to define a spaced apart region (or an interstitial region), and wherein the electrolyte is interposed between the anode and the cathode. The first and second planar silicon substrates may be silicon wafers (n-type, p-type, doped, or nondoped). In addition, the electrode assembly may further comprise a blocking media that is substantially impermeable to at least methanol and is substantially permeable to hydrogen atoms, wherein the blocking media is interposed between the anode and the cathode. The blocking media may be located anywhere within the spaced apart region; however, it is preferably integrally connected to the cathode. The blocking media may comprise a metallic membrane, and the blocking media may comprise palladium, niobium, tantalum, vanadium, or various combinations thereof. The blocking may even comprise a plurality of proton conducting plugs.

The anode of the electrode assembly may have a plurality of etched or micromachined flow channels (for delivering a hydrogen or hydrocarbon fuel), and may have a plurality of porous regions wherein each of the plurality of porous regions contains a solid porous rectangular region having a volume of about $3 \times 10^{-4}$ cm$^3$. In addition, the plurality of porous regions of the anode may be nanoporous, mesoporous, and/or macroporous, and may comprise an ordered or random array of parallel pores. In addition, the plurality of porous regions of the anode may contain anode pore surfaces, wherein the anode pore surfaces have a catalyst thereon. The catalyst may comprise a plurality of noncontiguous chemisorbed metallic particles; and the catalyst may be a chemisorbed bi-metallic catalyst derived from platinum and ruthenium percursors.

The cathode of the electrode assembly may have a plurality of etched or micromachined flow channels (for delivering oxygen or air), and may have a plurality of porous regions that may be nanoporous, mesoporous, and/or macroporous, and may comprise a random array of sponge-like interconnected pores having an open cell structure. In addition, the plurality of porous regions of the cathode may contain cathode pore surfaces, wherein the cathode pore surfaces have a catalyst thereon. The catalyst may comprise a plurality of noncontiguous chemisorbed metallic particles; and the catalyst may be a chemisorbed metallic catalyst derived from platinum percursors.

The electrolyte of the electrode assembly may comprise a solid polymer electrolyte such as, for example, a perfluorosulfonic polymer membrane. In addition, the anode pore surfaces having a catalyst thereon, may further include at least a portion of the electrolyte thereon, wherein the electrolyte may be a solid polymer electrolyte that has a thickness ranging from about 0.05 to about 0.5 microns. Similarly, the cathode pore surfaces having a catalyst thereon, may also further include at least a portion of the electrolyte thereon, wherein the electrolyte may be a solid polymer electrolyte that has a thickness ranging from about 0.05 to about 0.5 microns. Still further, the electrolyte may comprise a first and second solid polymer electrolyte coating and an acid, wherein the first solid polymer electrolyte coating is on the anode, and wherein the second solid polymer electrolyte coating is on the cathode, and wherein the acid is contained in an organic fuel that flows through the anode and the spaced apart region.

The organic fuel may comprise water and an alcohol selected from the group consisting ethanol, propanol, methanol, or a combination thereof, and the acid may be phosphoric acid, sulfuric acid, or a combination thereof. In addition, the organic fuel may be equal molar amounts of methanol and water together with the acid in amount of about 0.25 M.

In another embodiment, the present invention is directed to an electrode assembly adapted for use with a fuel cell, wherein the fuel cell comprises: an anode derived from a first planar silicon substrate, wherein the anode has integrally associated therewith a plurality of anode sol-gel derived support structures; an electrolyte; a cathode derived from a second planar silicon substrate, wherein the cathode has integrally associated therewith a plurality of cathode sol-gel derived support structures; wherein the anode and the cathode are spaced apart and substantially parallel to each other so as to define a spaced apart region, and wherein the electrolyte is interposed between the anode and the cathode. This embodiment of the present invention is inclusive of all of the various aspects and features associated with the above-described non-sol-gel electrode assembly and need not be repeated here.

The present invention is also directed to an electrode adapted for use with a fuel cell, wherein the electrode comprises a silicon substrate that functions as a current conductor, wherein the silicon substrate has a plurality of pores that define pore surfaces, wherein at least a portion of the pore surfaces have a catalyst thereon, wherein the catalyst is derived from one or more metallic precursors chemisorbed onto at least the pore surfaces.

The present invention is also directed to an electrode assembly adapted for use with a fuel, comprising: anode derived from a first planar silicon substrate; an electrolyte; a cathode derived from a second planar silicon substrate; wherein the anode and the cathode are spaced apart and substantially parallel to each other so as to define a spaced apart region, and wherein the electrolyte is interposed between the anode and the cathode, and wherein the anode and the cathode each have a plurality of porous regions that are separated from one another by a plurality of nonporous silicon regions and that define anode pore surfaces and cathode pore surfaces, and wherein the anode pore surfaces and the cathode pore surfaces each have a catalyst dispersed thereon such that the catalyst is noncontiguously dispersed throughout the plurality of porous regions of the anode and the cathode, and wherein the anode and the cathode each have been doped such that the anode and the cathode are each capable of serving as a current conductor.

The present invention is also directed to an electrode adapted for use with a fuel cell, wherein the fuel-cell comprises a sol-gel derived support structure that functions as a current conductor, wherein the sol-gel derived support structure has a plurality of pores that define pore surfaces, wherein at least a portion of the pore surfaces have a catalyst thereon, wherein the catalyst is derived from one or more metallic precursors chemisorbed onto at least the pore surfaces.

The present invention is also directed to a hydrogen and/or hydrocarbon fuel cell that comprises any of the above-described electrodes and/or electrode assemblies.

These and other aspects of the present invention will become more evident upon reference to following detailed description and attached drawings. It is to be understood that various changes, alterations, and substitutions may be made to the teachings contained herein without departing from the spirit and scope of the present invention. It is to be further understood that the drawings are illustrative (hence, not to scale) and symbolic of exemplary embodiments of the present invention.

BRIEF DESCRIPTION OF THE DRAWINGS

FIG. 6A illustrates a cross-sectional view of an exemplary electrode assembly in accordance with an embodiment of the present invention, wherein the cross-sectional view has an exploded region that depicts a NAFION coating on a pore surface of a sol-gel derived support structure.

DETAILED DESCRIPTION OF THE INVENTION

The present invention relates to fuels cells, electrode assemblies, and electrodes that comprise silicon and/or sol-gel derived support structures, as well as to methods relating thereto. In one embodiment, the present invention is directed to an electrode assembly adapted for use with a fuel cell, wherein the electrode assembly comprises: an anode made from a silicon substrate; an electrolyte; a cathode made from a silicon substrate; and an optional blocking or barrier layer (also referred to herein as a blocking media) that is substantially impermeable to at least methanol and is substantially permeable to hydrogen atoms (protons); wherein the electrolyte and the blocking or barrier layer (blocking media) are interposed between the anode and the cathode. In other embodiments, the present invention is directed to an electrode adapted for use with a fuel cell, wherein the electrode comprises a silicon substrate and/or a sol-gel derived support structure that functions as a current conductor, and wherein the silicon substrate and/or a sol-gel derived support structure has a plurality of pores that define pore surfaces, and wherein at least a portion of the pore surfaces have a catalyst thereon. Although many specific details of certain embodiments of the present invention are set forth in the following detailed description and accompanying drawings, those skilled in the art will recognize that the invention may have additional embodiments, or that the invention may be practiced without several of the details described herein.

Figure 1:
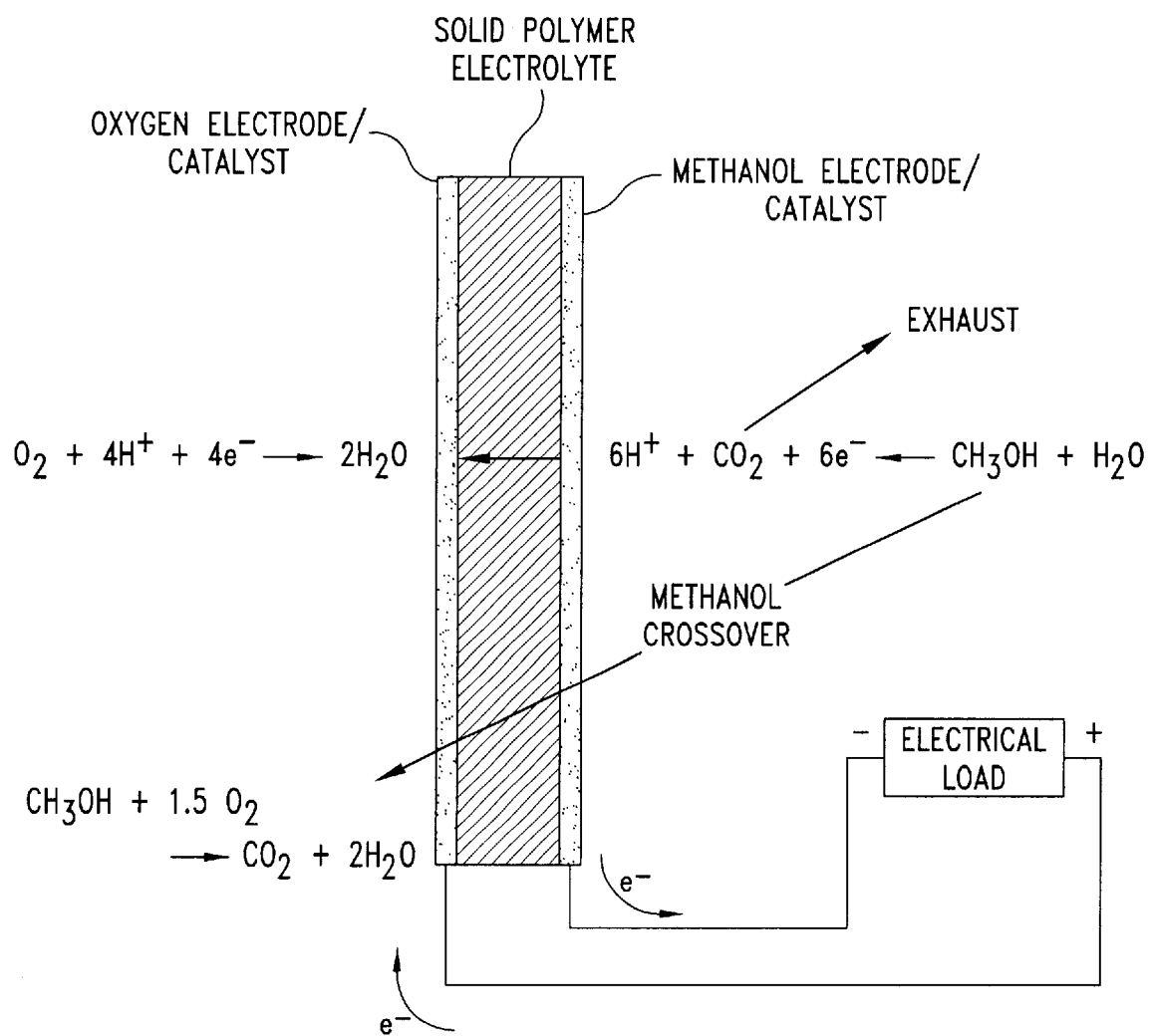
FIG. 1 illustrates a membrane electrode assembly of a direct methanol fuel cell in accordance with the prior art.
Figure 2A:
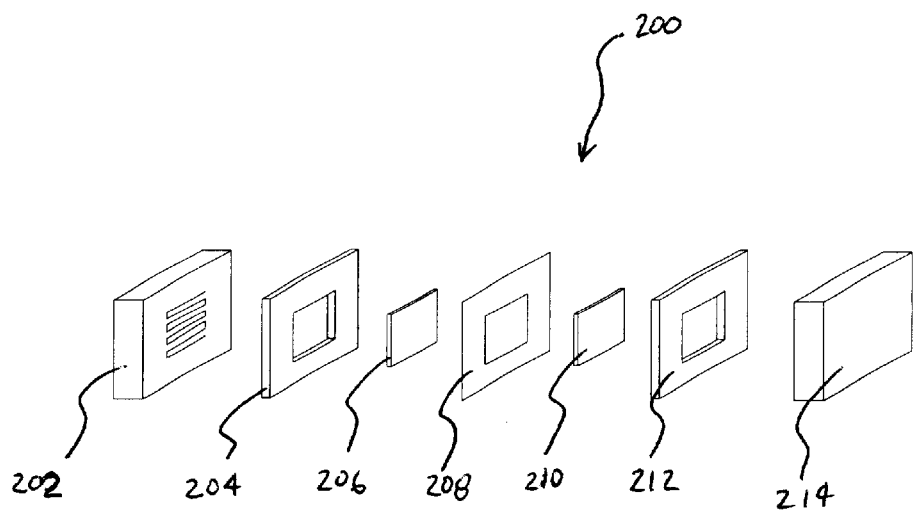
FIG. 2A illustrates an exploded isometric view of a membrane electrode assembly in accordance with the prior art.
Figure 2B:
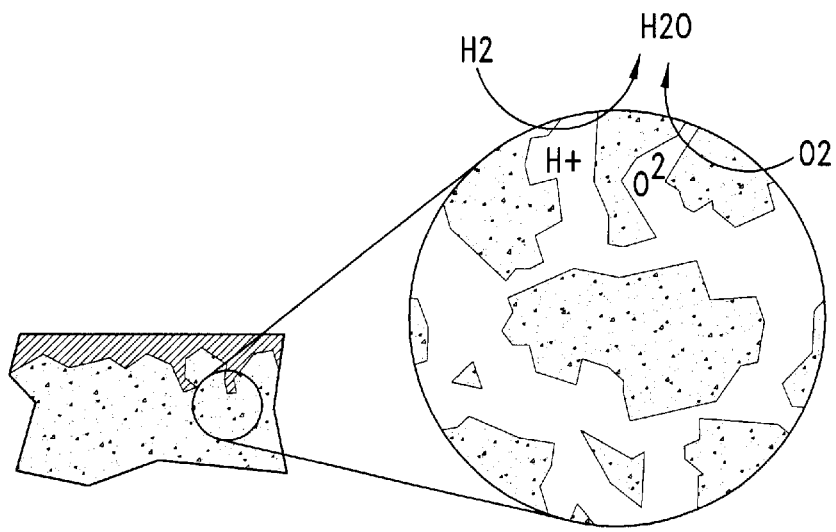
FIG. 2B illustrates a cross-sectional view of the three-phase interface between the catalyst, the membrane, and the reactants of a membrane electrode assembly in accordance with the prior art.
Figure 3:
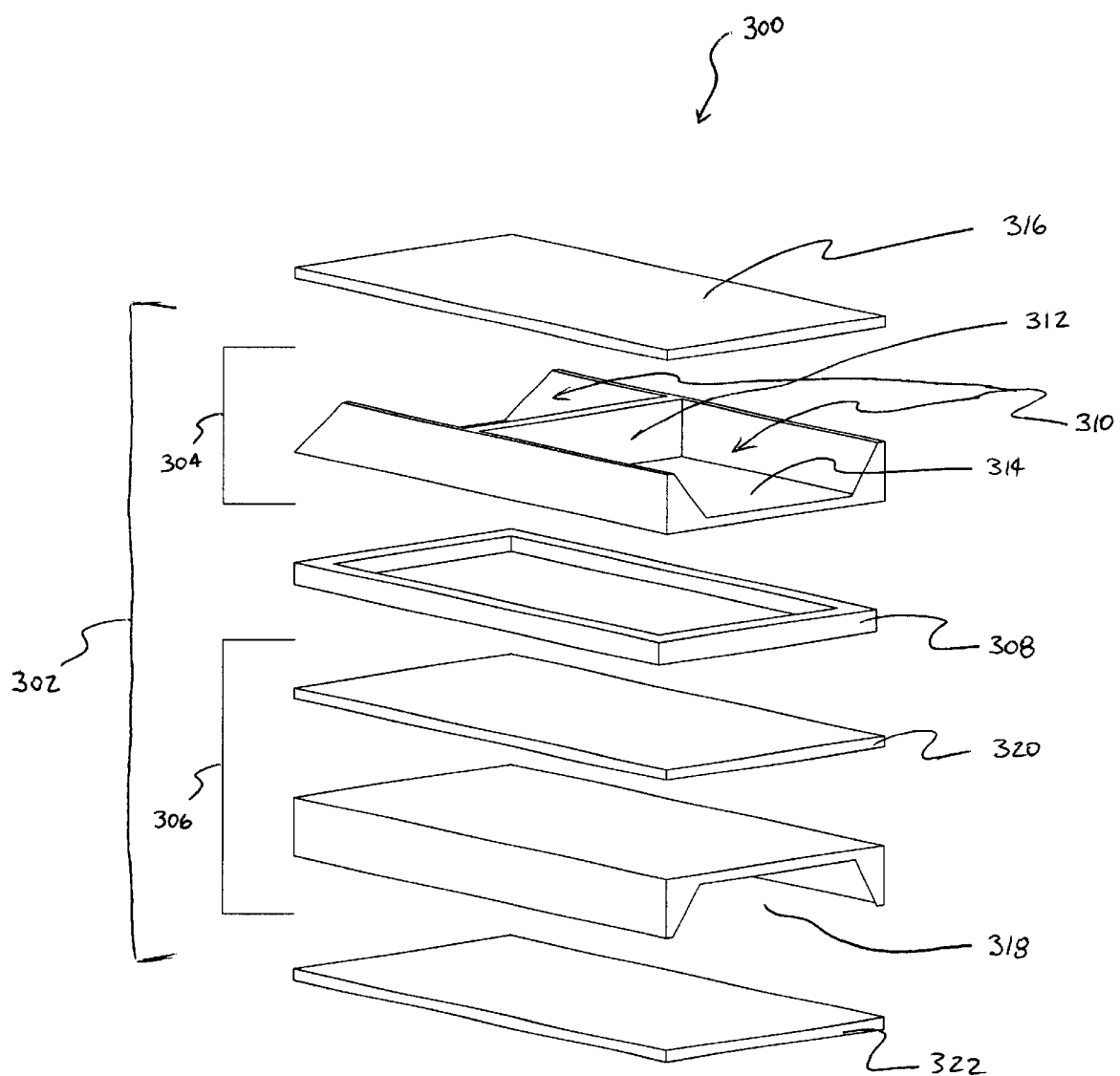
FIG. 3 illustrates an exploded isometric view of a fuel cell and its components in accordance with an embodiment of the present invention.

Thus, and in one embodiment as shown in FIG. 3, the present invention is directed to a fuel cell 300 that includes an electrode assembly 302. The electrode assembly (shown without an interposing electrolyte) includes an anode 304 and a cathode 306 that are separated apart from each other, but are connected together via a bonding structure 308. The anode 304 and the cathode 306 may both be derived from planar silicon substrates or wafers that are commonly used in the semiconductor industry. As shown, the anode 304 has two etched or micromachined flow channels 310 that are separated from each other by a first flow barrier 312. In addition, the anode has two active regions 314 (one of which is hidden) that are also separated from each other by the first flow barrier 312. The active regions may be catalytically enhanced porous silicon and/or a sol-gel derived support structure. Finally, the anode 304 has adjacent thereto a flow channel cover 316 that encloses the two flow channels 310.

Figure 4A:
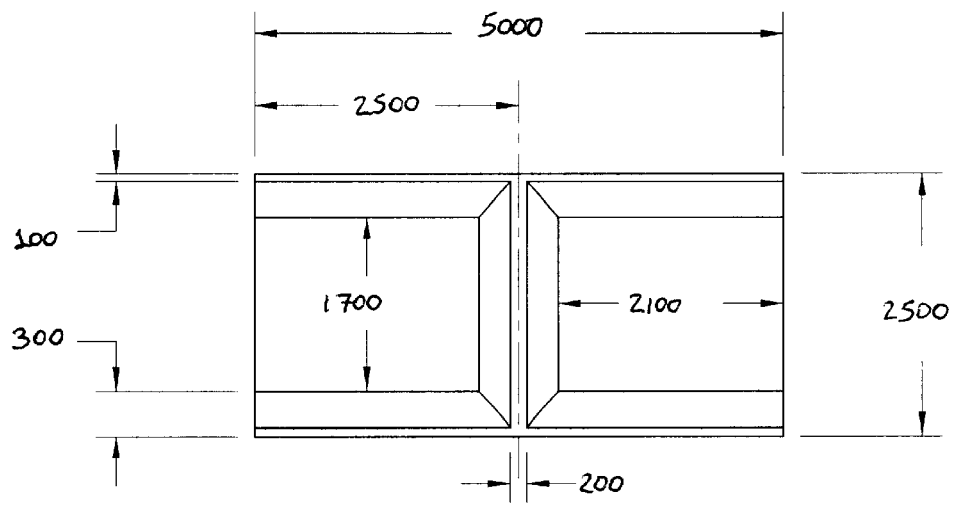
FIG. 4A illustrates a top view of a fuel cell in accordance with an embodiment of the present invention.
Figure 4B:
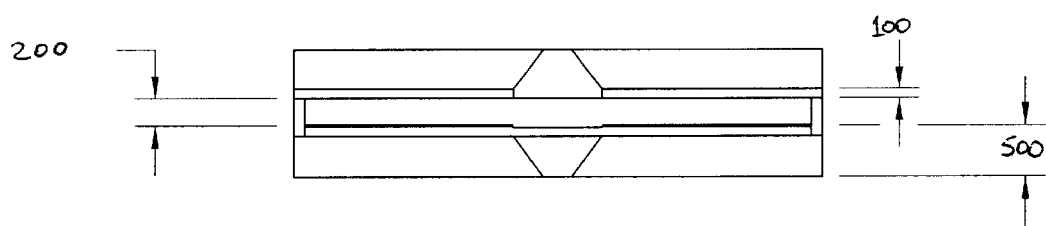
FIG. 4B illustrates a side view of the fuel cell shown in FIG. 4A.

As further shown, the cathode 306 also has two etched or micromachined flow channels 318 that are separated from each other by a second flow barrier (hidden). In addition, the cathode has two active regions (both of which is hidden) that are also separated from each other by the second flow barrier. The active regions may be catalytically enhanced porous silicon and/or a sol-gel derived support structure. Also included as part of the cathode is a blocking media 320 that is substantially permeable to hydrogen atoms and is substantially impermeable to all other molecules. Finally, the cathode 306 has adjacent thereto a flow channel cover 322 that encloses the two flow channels 318. FIGS. 4A and 4B show proximate dimensions in microns of the above-described exemplary fuel cell; however, it is to be understood that various other dimensions and configurations are within the scope of the present invention. The materials and methods of construction of such a fuel cell a more fully described herein; moreover, such a fuel cell is operational with hydrogen or a hydrocarbon fuel (supplied to the anode) and air (supplied to the cathode).

In the several embodiments set forth herein, the inventive fuel cells, electrode assemblies, and electrodes are based, in large part, on novel substrates and support structures that are particularly useful for carrying a catalyst. In this regard, the substrates and support structures disclosed herein principally include silicon substrates, sol-gel derived support structures, and combinations thereof. In particular, it has been discovered that these types of substrates and/or support structures are useful as electrodes for fuel cells (especially for micro-scale direct methanol fuel cells), mainly because such substrates and/or support structures are able to provide a high surface area to bulk volume ratio, have good mechanical strength, and are compatible with thin/thick films that are often needed for making selected electrical connections. Because of these physical characteristics, among others, and because such substrates and/or support structures are amenable to micro-fabrication techniques, the electrodes, electrode assemblies, and fuel cells of the present invention are useful for the manufacture of small-scale portable power generating devices—portable power devices capable of delivering up to 200 Watts of power.

Accordingly, and without limitation to any particular methodology, the novel silicon substrates disclosed herein may be made by utilizing standard microelectronic processes such as, for example, alkaline etching, plasma etching, lithography, electroplating, as well as electrochemical pore formation on silicon substrates. In this way, a silicon substrate useful for carrying a catalyst may be produced, wherein the silicon substrate may have any number of pores and pore sizes such as, for example, random and ordered pore arrays—including pore arrays having selected pore diameters, depths, and distances relative to one another. Similarly, the novel sol-gel derived support structures may be made by conventional sol-gel processing techniques, wherein the sol-gel derived support structures may have any number of pores, pore sizes, and/or pore structures. In short, the present invention is inclusive of all silicon substrates and sol-gel derived support structures, including combinations thereof, that have any number of possible porosities and/or void spaces associated therewith.

In addition to (1) silicon substrates and (2) sol-gel derived support structures made by microelectronic and sol-gel processes, other aspects of the present invention relate to the incorporation of (3) metallic catalysts on and/or within the silicon substrate and/or sol-gel derived support structures, (4) blocking or barrier layers associated with the silicon and/or sol-gel derived support structures, wherein the blocking or barrier layers selectively allow for the transport of hydrogen atoms or protons while blocking substantially all other molecules, and (5) electrolyte utilization schemes.

For purposes of clarity and to better enable those skilled in the art to practice the present invention, each of the above-enumerated aspects are more fully described in each of the following sub-sections.

1. Silicon Support Structures

As noted above, an aspect of the present invention relates to the use of a silicon substrate for carrying a catalyst, wherein the silicon substrate together with the catalyst serve as an electrode of a fuel cell. Thus, and in one aspect, the present invention is directed to an electrode made from a porous silicon substrate. In this regard, porous silicon sates (and/or support structures) may be formed by silicon micromachining and/or wet chemical techniques (employed by the semiconductor industry) such as, for example, anodic polarization of silicon in hydrofluoric acid. As is appreciated by those skilled in the a the anodic polarization of silicon in hydrofluoric acid (HF) is a chemical dissolution technique and is generally referred to as HF anodic etching; this technique has been used in the semiconductor industry for wafer thinning, polishing, and the manufacture of think porous silicon films. (see, e.g., Eijkel, et al., "A New Technology for Micromachining of Silicon: Dopant Selective HF Anodic Etching for the Realization of Low-Doped Monocrystalline Silicon Structure," IEEE Electron Device Ltrs., 11(12);588–589 (1990)). In the context of the present invention, it is to be understood that the porous silicon may be nanoporous silicon (i.e., average pore size<2 nm), mesaporous silicon (i.e., average pore size of 2 nm to 50 nm), or microporous silicon (i.e., average pore size>50 nm).

More specifically, porous silicon substrates useful in the context of the present invention may be formed by a photoelectrochemical HF anodic etching technique, wherein selected oxidation-dissolution of silicon occurs under a controlled current density. (see, e.g., Levy-Clement et al., "Porous n-silicon Produced by Photoelectrochemical Etching," *Applied Surface Science*, 65/66: 408–414 (1993); M. J. Eddowes, "Photoelectrochemical Etching of Three-Dimensional Structures in Silicon," *J. of Electrochem. Soc.*, 137(11):3514–3516 (1990).) An advantage of this relatively more sophisticated technique over others is that it is largely independent of the different principal crystallographic planes associated with single-crystal silicon wafers (whereas most anisotropic wet chemical etching methods have very significant differences in rates of etching along the different principal crystallographic planes). The photoelectrochemical HF anodic etching of n-type silicon, for example, depends upon, among other things, the existence of holes ($h^+$) at or near the silicon surface/solution interface. As is appreciated by those skilled in the art, such holes may be generated by illumination of the silicon surface (n-type); and the holes' transport or flux to the silicon/solution interface may be controlled by an applied potential bias (together with its associated electric field). Once at or near the silicon/solution interface, the photogenerated holes may take part in oxidation-reduction reactions with surface atoms. In a suitable electrolyte HF solution, oxidation-reduction will be followed by dissolution of the oxidation product such that etching will proceed. (Note that for p-type silicon, holes are readily available so there is generally no need for photo-illumination.)

Several chemical oxidation-dissolution models have been reported to explain the reaction mechanism that occurs during the electrochemical HF anodic etching of silicon. Perhaps, the most popular model is the one proposed by Lehmann and Gosele. (Lehmann et al., "Porous Silicon Formation: A Quantum Wire Effect," *Applied Physics Letter*, 58(8)856–858 (1991)). The mechanism proposed by Lehmann and Gosele is schematically depicted below in chemical equation (4).

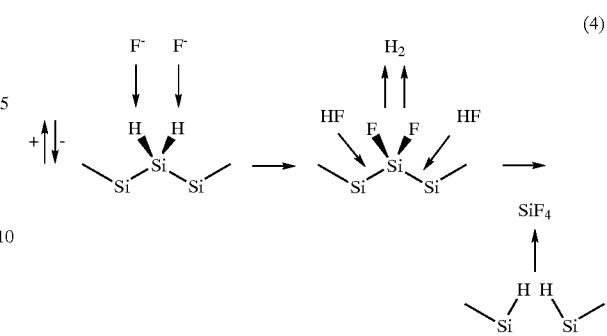

According to the Lehmann and Gosele model as represented by chemical equation (4), silicon, when immersed in a HF solution, will form a Si—H bond on the surface. The holes and their transport to or near the silicon surface/solution interface (caused by supplying a voltage together UV illumination for n-type silicon) reduces the strength of the Si—H bonds thereby allowing formation of Si—$F_2$, which, in turn, results in a weakening of the Si—Si bonds. Hydrofluoric acid form the solution then causes the weakened Si—Si bond to break, thereby causing the formation of $SiF_4$, which, in turn, goes into the surrounding solution.

In order to form porous silicon substrates by a photoelectrochemical HF anodic etching technique as described above (and in the context of the present invention), it is necessary to either obtain or construct an anodic etching cell. In this regard, a suitable anodic etching cell may be obtained commercially from Advanced Micromachining Tools GmbH (Frankenthal, Germany). Alternatively, an appropriate anodic etching cell may be constructed.

Figure 5:
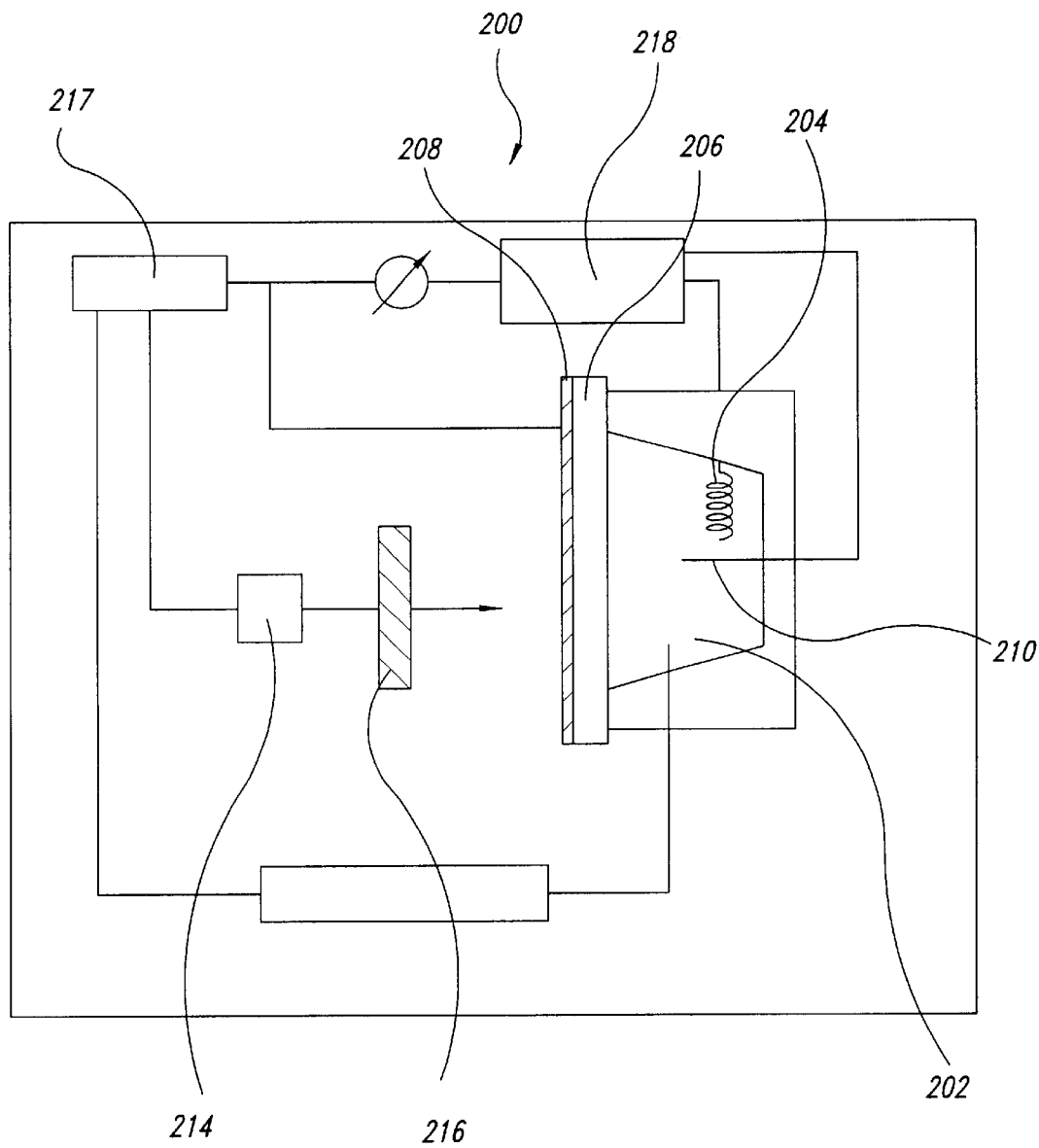
FIG. 5 illustrates a schematic cross-sectional representation of an exemplary anodic etching cell that is useful for forming porous silicon substrates in accordance with an embodiment of the present invention.

A schematic cross-sectional representation of an exemplary anodic etching cell that may be constructed has been provided as FIG. 5. Although not depicted, the anodic etching cell 200 should have sealing capabilities so as to prevent/minimize release of the electrolyte 202 into the environment, and should be adapted so as to accommodate substrate size changes. Moreover, the anodic etching cell 200 should be coated or made of HF resistant parts (e.g., HDPE or Teflon). As shown, an electrical/ohmic connection 204 may be located on the backside of a secured substrate 206 via a metal plate 208 (preferably made of aluminum or brass). As further shown, the electrical/ohmic connection 204 on the backside of the secured substrate 206 is preferably configured to allow a uniform distribution of voltage (a uniform distribution of voltage results in uniformity with respect to pore dimensions across the face of secured substrate 206).

The anodic etching cell 200 should be of a standard three electrode arrangement so as to include a reference electrode 210, a counter electrode 204, and a working electrode (which corresponds to the metal plate 208). In this regard, a platinum screen may be used as a reference electrode 210. Finally, illumination is provided (for n-type silicon hole generation is not dependent on UV by photon flux from incident light) by a light source 214 (such as a halogen lamp) with an attached optical interference filter 216, and the potential may be applied and controlled via a personal computer 217 and an external power supply (not shown).

2. Sol-gel Derived Support Structures

As noted above, an aspect of the present invention relates to the use of a sol-gel derived support structure for carrying a catalyst, wherein the sol-gel derived support structure together with the catalyst serve as an electrode of a fuel cell. Thus, and in one aspect, the present invention is directed to an electrode made from a sol-gel derived support structure (optionally integrated together with a silicon substrate). As is appreciated by those skilled in the art, sol-gel processes are a way to make dispersed ceramic materials through the growth of metal oxo polymers in a solvent. (see, e.g., Brinker et al., "Sol-Gel Science, the Physics and Chemistry of Sol-Gel Processing," *Academic* (1990).) The chemistry associated with sol-gel processes is based on inorganic polymerization reactions. In this regard, metal oxo polymers may be obtained through hydrolysis and condensation of molecular precursors such as metal alkoxides $M(OR)_Z$ (wherein M=Si, Ti, Al, Zr, V, W, Ir, Mn, Mo, Re, Rh, Nb, Ni, Sr, Ba, Ta, Mg, Co; OR is an alkoxy group and Z is the valence or oxidation state of the metal) (Sanchez et al., "Inorganic and Organometallic Polymers with Special Properties," *Nato ASI Series* (Laine R. M., Ed.), 206:267 (1992)).

The reaction proceeds first through the hydroxylation of metal alkoxides, which occurs upon the hydrolysis of alkoxy groups as follows:

$$M-OR+H_2O \rightarrow M-OH+ROH \quad (5)$$

The mechanism occurs in three steps: (a) nucleophilic attack of the metal M by the oxygen atom of a water molecule; (b) transfer of a proton from the water to an OR group of the metal; and (c) release of the resulting ROH molecule (Livage et al., "Sol-Gel Chemistry of Transition-Metal Oxides," *Progress in Solid State Chemistry*, 18(4):259–341 (1988)).

As soon as reactive hydroxy groups are generated, the formation of branched oligomers and polymers with a metal oxo based skeleton and reactive residual hydroxo and alkoxy groups occurs through a polycondensation process. Depending on experimental conditions, two competitive mechanisms have been described, namely, oxolation and olation.

Oxolation involves the formation of oxygen bridges as follows:

$$M-OH+M-OX \rightarrow M-O-M+XOH \quad (6)$$

(X=H or alkyl group)

As with hydrolysis, oxolation is a three step nucleophilic substitution reaction which occurs through the elimination of $H_2O$ or ROH. Generally, under a stoichiometric hydrolysis ratio ($h=H_2O/M<2$) the alcohol producing condensation is favored, whereas the water forming condensation is favored for larger hydrolysis ratio ($h>>2$) (Brinker et al., "Sol-Gel Science, the Physics and Chemistry of Sol-Gel Processing," *Academic* (1990)).

Olation, on the other hand, involves the formation of hydroxo bridges as follows:

$$M-OH+HO-M \rightarrow M-(OH)_2-M \quad (7)$$

Olation is a nucleophilic addition reaction that can take place when the coordination of the metallic center is not fully satisfied (N−Z>0). The hydroxo nucleophilic group enters the unsaturated coordination sphere of the metal. This reaction does not need the proton transfer described above (step b) and the removal of a leaving group (step c). Consequently, the kinetics of olation are usually faster than those of oxolation because steps b and c are not necessary (Sanchez et al., "Inorganic and Organometallic Polymers with Special Properties," *Nato ASI Series* (Laine R. M., Ed.), 206:267 (1992)).

In accordance with an aspect of the present invention, these three reactions (hydrolysis, oxolation and olation) may all be involved in the transformation of a metal alkoxide precursor into a metal oxo macromolecular network, where such a metal oxo macromolecular network is referred to herein as a sol-gel derived support structure. The exact structure and morphology of such a sol-gel derived support structure generally depends on the relative contribution of each of these reactions.

In an exemplary embodiment of the present invention, a sol-gel derived support structure comprising platinum ruthenium dioxide ($Pt\text{-}RuO_2$) may be cast into etched or micromachined trenches, channels, and/or pits of a silicon substrate, wherein the sol-gel derived support structure combined with silicon substrate and a catalyst serves as an electrode of a fuel cell. An exemplary platinum-ruthenium oxide precursor solution useful for this purpose may be prepared, for example, by mixing hexachloroplatinic acid ($H_2PtCl_6 \cdot xH_2O$), ruthenium nitrosyl nitrate ($Ru(NO)(NO_3)_x(OH)_{3-x}$) with nitric acid ($HNO_3$), ethyl alchohol ($C_2H_5OH$), and DI water. The solution may be refluxed under vigorous stirring at ~60° C. for ~1 hr to yield a nominal molar ratio of 1:0.5:5:0.08:20 of $H_2PtCl_6 \cdot xH_2O$:$Ru(NO)(NO_3)_x(OH)_{3-x}$:$H_2O$:$HNO_3$:$C_2H_5OH$. (Chemicals are commercially available from Aldrich Chemical Company, Inc., Milwaukee, Wis.)

Alternatively, an exemplary ruthenium dioxide precursor solution may be prepared, for example, by dissolving ruthenium chloride hydate $RuCl_3 \cdot XH_2O$ in a mixture of ethyl alcohol, nitric acid, and DI water. The solution may be refluxed under vigorous stirring at ~60° C. for ~1 hr to yield a nominal molar ratio of 1:20:5:0.08 of $RuCl_3 \cdot XH_2O$:$C_2H_5OH$:$H_2O$:$HNO_3$ (optionally, a 10 wt % ruthenium (IV) oxide sub-micron particles may then be dispersed into the precursor solution). (Chemicals are commercially available from Aldrich Chemical Company, Inc., Milwaukee, Wis.)

Alternatively, an exemplary aluminum oxide precursor solution may prepared by mixing aluminum sec-butoxide ($Al[O(CH_3)CHC_2H_5]_3$), hydrochloric acid (HCl), ethyl alchohol ($C_2H_5OH$), and DI water. The solution may be refluxed under vigorous stirring at ~60° C. for ~1 hr to yield a nominal molar ratio of 1:0.5:20:40 of $Al[O(CH_3)CHC_2H_5]_3$:$HCl$:$C_2H_5OH$:$H_2O$. (Chemicals are commercially available from Aldrich Chemical Company, Inc., Milwaukee, Wis.)

Alternatively, an exemplary vanadium pentoxide precursor solution may be prepared by mixing vanadyl triisopropoxide ($VO(OC_3H_7)_3$), ethyl alchohol ($C_2H_5OH$), and DI water. The solution will be refluxed under vigorous stirring at ~60° C. for ~1 hr to yield a nominal molar ratio of 1:15:30 of $VO(OC_3H_7)_3$:$CH_3OCH_3$:$H_2O$. (Chemicals are commercially available from Aldrich Chemical Company, Inc., Milwaukee, Wis.)

3. Metallic Catalysts

As noted above, an aspect of the present invention relates to a metallic catalyst carried on a silicon substrate and/or a sol-gel derived support structure, wherein the catalyst facilitates oxidation-reduction reactions of a fuel (e.g., hydrogen or methanol) or an oxidant (e.g., oxygen from the air), which reactions occur on each respective electrode of a fuel cell electrode assembly during operation of the fuel cell. In this regard, it is to be understood that the catalyst may be carried on the surface or face of the silicon substrate; and/or the catalyst may be carried on the pore surfaces (i.e., within the bulk matrix of the substrate or support structure) of either a porous silicon substrate or a sol-gel derived support structure (wherein the pore surfaces are also referred to herein as active regions).

Unlike traditional electrocatalyst deposition methods such as, for example, electroplating, sputtering and metal evaporation (which methods have all been used in conjunction with known fuel cell electrodes), the metallic catalyst aspect of present invention contemplates the use of novel surface organometallic chemistry techniques to form a noncontiguous metallic and/or bimetallic catalyst layer on or within a silicon substrate or sol-gel derived support structure (i.e., the active regions). The formation of such a noncontiguous metallic and/or bi-metallic catalyst layer by the use of surface organometallic chemistry techniques provides for an extremely efficient use of the catalyst (thereby resulting in significant cost savings), and allows for dispersion of the catalyst throughout the bulk matrix of the substrate and/or support structure (thereby enhancing the oxidation-reactions occurring thereon).

In the context of direct methanol fuel cells, for example, it is known that platinum provides one of the best surfaces for the dissociative adsorption of methanol. However, at potentials required for methanol electrooxidation, the —C≡O intermediates formed during the complete oxidation process are relatively stable on the surface, and as a result they tend to poison the catalyst by blocking the adsorption sites. This tendency may be avoided, to some extent, by the addition of certain other metal additives so as to decrease the stability of the —C≡O on the surface (and in so doing, it is believed that such metal additives may facilitate the overall oxidation-reduction process). Thus, several mixed metal catalysts may be used (i.e., combinations of one ore more noble metals) and are thus considered to be within the scope of the present invention; however, a bimetallic platinum:ruthenium catalyst is a particularly active bimetallic catalyst and is therefore preferred (at least with respect to the anode).

As is appreciated by those skilled in the art, the reaction of selected organometallic percursors with exposed surface atoms is one way to deposit or chemisorb a metallic catalyst. For example, the surface of a silicon substrate (including its pore surfaces) may be oxidized by exposure to air and water vapor at slightly elevated temperatures, thereby causing the surface to be covered with hydroxyl groups (Si—OH). These surface hydroxyl groups are active sites, and therefore may be used as the starting point for chemisorbing catalysts thereon via surface organometallic chemistry techniques. For example, the reaction of selected organometallic precursors with surface hydroxyl groups causes the chemisorption of surface supported molecular analogues thereof, which upon reduction gives rise to chemisorbed metallic nanoparticles having very small size distributions. Such methodologies are amenable to not only silicon surfaces, but are also well suited for deposition onto bulk oxides such as, for example, the various sol-gel derived support structures of the present invention. For purposes of clarity, the terms "chemisorb" and "chemisorption" are to have meanings as understood by those skilled in the art of surface organometallic chemistry; and as such, these terms refer to molecules held to a surface by forces of the same general type as those occurring between bound atoms in molecules. Moreover, the heat evolved per mole of chemisorbed material is usually comparable to that evolved in chemical bonding, namely, about 100–500 k J. (Laidler et al., "Physical Chemistry," Benjamin/Cummings Publishing Company, Inc. (1982).)

In an exemplary embodiment of the present invention, a noncontiguous bi-metallic layer of platinum and ruthenium may be chemisorbed on and/or within a nonporous/porous silicon substrate by selective use of platinum and ruthenium precursors. For example, a silicon substrate may be immersed, under basic conditions (pH 8.5), into an aqueous ammonia solution of tetraamineplatinum(II) hydroxide hydrate, $[Pt(NH_3)_4](OH)_2$–$xH_2O$, (commercially available from Strem Chemicals, Inc., Newburyport, Me.) and stirred for a selected period of time, thereby causing formation of a platinum complex in accordance with chemical equation (8):

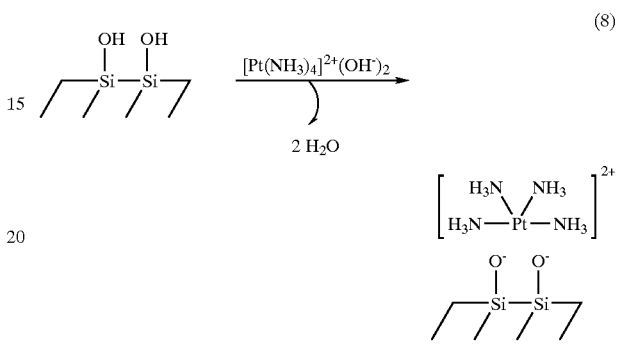

After washing with cold water, the silicon substrate may then be calcined in air to remove the remainder of the ligands from the platinum. This step may be done under a slow temperature ramp, 25–400° C., over a selected period of time, as is shown in chemical equation (9).

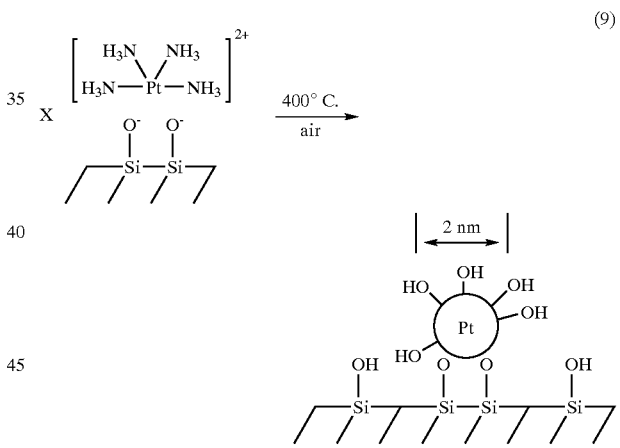

In general, the slower the temperature is increased, the smaller the size of the chemisorbed platinum particles (i.e., greater surface area, and narrower size distribution). (Humblot et al., "Surface Organometallic Chemistry on Metals: Formation of a Stable Sn(n-C4H9) Fragment as a Precursor of Surface Alloy Obtained by Stepwise Hydrogenolysis of Sn(n-C4H9)(4) on a Platinum Particle Supported on Silica," *J. Am. Chem. Soc.*, 120(1):137–146 (1998); and Humblot et al., "Surface Organometallic Chemistry on Metals: Selective Dehydrogenation of Isobutane into Isobutene on Bimetallic Catalysts Prepared by Reaction of Tetra-n-Butyltin on Silica-Supported Platinum Catalyst," *J. Catal.*, 179(2):458–468 (1998).).

Next, and after the silicon substrate has reached room temperature, it may then be immersed, under basic conditions (pH 8.5), into an aqueous ammonia solution of hexamineruthenium(III) chloride, $[Ru(NH_3)_6]Cl_3$ (commercially available from Strem Chemicals, Inc., Newburyport, Me.), and stirred for a selected period of time, thereby causing formation of a ruthenium complex in accordance with chemical equation (10).

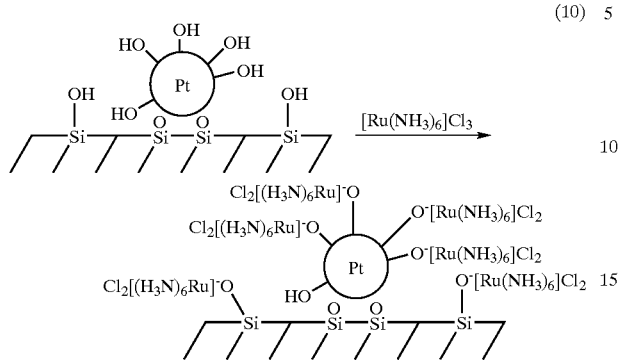

(10)

Finally, the catalyst may be reduced under flowing W at 400° C. (1% in nitrogen) to form a mixed platinum ruthenium catalyst in accordance with chemical equation (11).

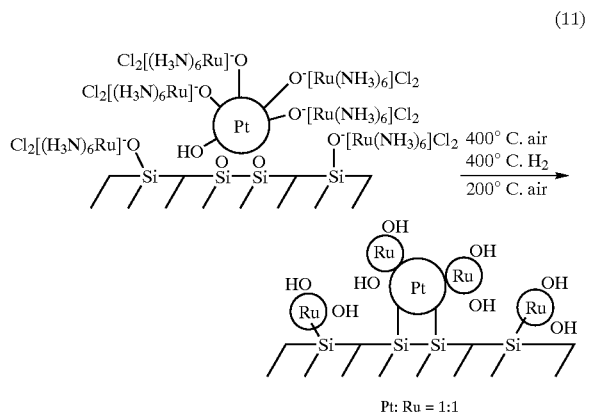

(11)

Furthermore, the previously described techniques are not limited to the silicon substrate but can also be used for the deposition of catalyst onto the sol-gel support structure. For example, a ruthenium dioxide sol-gel substrate can be immersed in an aqueous ammonia solution of tetraamineplatinum(II) hydroxide hydrate as described above resulting in the formation of a surface bound platinum complex, equation (12).

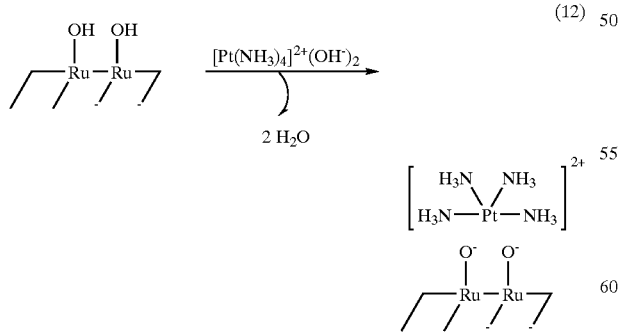

(12)

After washing with cold water, the ruthenium dioxide substrate may then be calcined in air to remove the remainder of the ligands from the platinum. This step may be done under a slow temperature ramp, 25–400° C., over a selected period of time. The catalyst may then be reduced under flowing $H_2$ at 400° C. (1% in nitrogen) to reduce the platinum followed by heating at 200° C. in air to ensure the surface of the ruthenium dioxide is fully oxidized, equation (13).

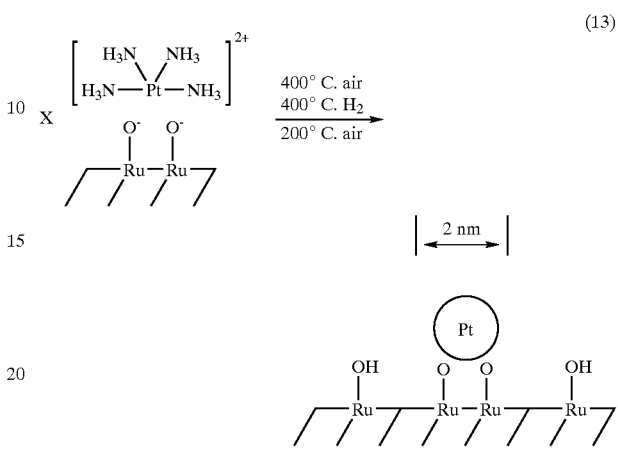

(13)

4. Blocking Layer for Selective Transport of Protons

As noted above, an aspect of the present invention relates to the use of a blocking or barrier layer in association with a silicon substrate and/or a sol-gel derived support structure, wherein the blocking or barrier layer selectively allows for the transport of hydrogen atoms or protons while blocking substantially all other molecules. In particular, this aspect of the invention enjoys significant utility with respect to preventing "methanol cross-over," which phenomena commonly occurs in electrode assemblies of DMFCs (wherein the methanol has a tendency to cross-over from the anode to the cathode).

Thus, and in one aspect, the electrodes, electrode assemblies, and fuel cells of the present invention may optionally include a metallic membrane that is useful for selectively separating specific chemical species from a mixture adjacent to the membrane. In the context of electrodes and electrode assemblies adapted for use with a DMFC, the metallic film is useful for separating hydrogen from a mixture of water, methanol and hydrogen ions, wherein the mixture resides within an adjacent matrix of an acidic polymer electrolyte. As is appreciated by those skilled in the art, the transport mechanism for such a system may be stated as follows:

1. Hydrogen ions diffuse via the polymer electrolyte to the surface of the methanol barrier.
2. The hydrogen ions adsorb to the surface of the methanol barrier.
3. The hydrogen ions gain an electron from the metallic electron cloud and transfers from an adsorbed state on the surface of the film to an absorbed state within the crystalline matrix of the film.
4. The hydrogen atom diffuses through the crystalline matrix by jumping from interstitial site to interstitial site in a manner similar to the Brownian diffusion of molecules through a fluid.
5. The hydrogen atom reaches the surface of the thin film on the side opposite of where it entered, loses an electron to the electron cloud of the metallic film and changes from the absorbed state within the crystalline matrix to the adsorbed state on the surface.

6. The hydrogen ion desorbs from the surface of the methanol barrier into the polymer electrolyte.
7. The hydrogen ion diffuses away from the methanol barrier via the polymer electrolyte.

The rate-limiting steps associated with such a transport mechanism are believed to be the electron transfer steps and the bulk diffusion step. In this regard, the diffusion of hydrogen through the crystalline matrix of the methanol barrier is known as the Bulk Diffusion step. The rate at which hydrogen diffuses through the matrix is largely controlled by the concentration gradient across the membrane, the thickness of the membrane, and the diffusion coefficient of the membrane as set forth below in the following equation (14):

$$N = \frac{D_T(C_{out} - C_{in})}{\delta} \qquad (14)$$

wherein $N$    Hydrogen flux through the membrane    $ccH_2/cm_2 \cdot sec$ $D_T$   Hydrogen diffusivity for a given membrane    $cm_2/sec$
at a given temperature $C_{out}$  Concentration of hydrogen in the membrane    $ccH_2/ccMetal$
materials on the inlet side of the membrane $C_{in}$   Concentration of hydrogen in the membrane    $ccH_2/ccMetal$
material on the outlet side of the membrane $\delta$   Thickness of the metal membrane    cm Accordingly, the greater the concentration difference between the inlet and outlet side of the membrane, the greater the hydrogen flux. In a methanol blocking system, the concentration at the inlet and outlet are generally affected only by the concentration of hydrogen ions in the electrolyte, wherein the electrolyte resides on either side of the membrane (however, it is to be understood that the membrane may be integral with either electrode). Thus, the thinner the membrane, the greater the hydrogen flux. The diffusivity of the membrane is largely controlled by the membrane's composition and temperature (the diffusivity of the membrane increases with increasing operating temperature). Materials that typically have high rates of bulk diffusion include the noble metal palladium and the transition metals vanadium, niobium and tantalum.

The rate at which the electron transfer step proceeds is related to the total amount of surface area available for the electron transfer to occur, the suitability of the surface for the electron transfer reaction, and the temperature of the surface. The electron transfer reaction generally only occurs at specific locations on a membrane surface. These reactions sites have a set density depending on how the surface of the membrane is prepared. The greater the surface area of the membrane the greater the total number of reactions sites where electron transfer can occur. In order to facilitate the electron transfer reactions, electrons from the metallic membrane need to be readily available. In order for this to occur, the surface of the membrane is preferably a metal with minimal adsorbed contaminants or oxide deposits. In general, increasing the temperature of the reaction system causes an increase of the rate at which the electron transfer reactions occur. In this regard, vanadium, niobium and tantalum all have bulk diffusion rates higher than that of palladium at similar temperatures; however, these metals all readily form layers of tightly bound oxides that greatly inhibit the electron transfer reaction. As a result, and although the bulk diffusion rate is greater in these metals, the actual rate of diffusion through these metals is much lower than a comparable palladium film under the same operating conditions.

In order to incorporate the high diffusion rates and relatively lower cost of the transition metals with the fast electron transfer reaction rate of palladium, a layered membrane structure may be formed. This structure generally comprises a central transition metal diffusion layer, such as vanadium, together with a thin palladium surface reaction layer on either side. Such a metallic membrane may be either be a solid self-supported metallic film, or it may be deposited into a porous matrix (e.g., porous silicon substrates and/or sol-gel derived support structures).

In the context of the present invention, there are several different methods are available for depositing a metallic membrane layer (depending on the material being deposited and the structure of the underlying substrate). In the case of a transition metal foil, no deposition process needs to occur as processing is simply a matter of preparing the surface in such a way so as to enhance the electron transfer reaction. Alternatively, when depositing the diffusion layer into a porous matrix, the metal needs to be deposited in such a way as to ensure intimate contact with pore surfaces of the matrix. In this way, delamination and strain effects caused by crystal lattice expansion are minimized by virtue of there being a support matrix around the metal. As is appreciated by those skilled in the art, a metallic film of palladium may be deposited on a silicon substrate and/or a sol-gel derived support structure by electroplating, physical vapor deposition, sputtering, or thermal vaporation ion plating.

5. Electrolyte Utilization Schemes

As noted above, an aspect of the present invention relates to the use of novel electrolyte utilization schemes. In this regard, and in one aspect, the present invention relates to the impregnation of a polymer electrolyte into the porous silicon substrates and/or sol-gel derived support structures having a chemisorbed catalyst thereon so as to optimize the three-phase interface between catalyst, fuel and proton-conducting electrolyte. With respect to the polymer electrolyte associated with the various electrode assemblies disclosed herein, it may be a polymer ion-exchange membrane—generally of an acid type, such as, for example, a perfluorosulfonic acid membrane. Exemplary in this regard, are membranes known as NAFION (E. I. Du Pont de Nemours and Company, United States) which are, in general, electrochemically stable at temperatures up to about 100° C. These membranes have a polytetraflouoroethylene (PTFE) polymer chain as a backbone, several units (n=6–10) in length, with a flexible branch pendant to this chain, a perfluorinated vinyl polyether (m≦1) with a terminal acidic (sulfonic) group to provide the cation- (proton-) exchange capability. As an example, such an ionomer unit may have the following structure (equivalent weight about 1200):

(15)

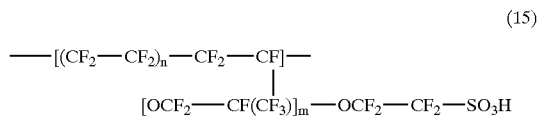

In general, membranes of this type have a high proton conductivity ($>2\Omega^{-1} \cdot cm^{-2}$); the proton transport number is generally unity with a low electro-osmotic water transport rate (though the water content may be about 30%). The hydrogen and oxygen permeabilities are generally small:

3–5×10$^{-4}$ cm$^3$·cm/cm$^2$·h·atm at 25° C. Such a membrane is generally stable against chemical attack in strong bases, strong oxidizing and reducing acids, hydrogen peroxide, chlorine, etc., up to temperatures of 125° C. In the context of the present invention, the polymer electrolyte is preferably a perfluorosulfonic polymer membrane having a thickness ranging from about 20 to 200 microns.

Figure 6B:
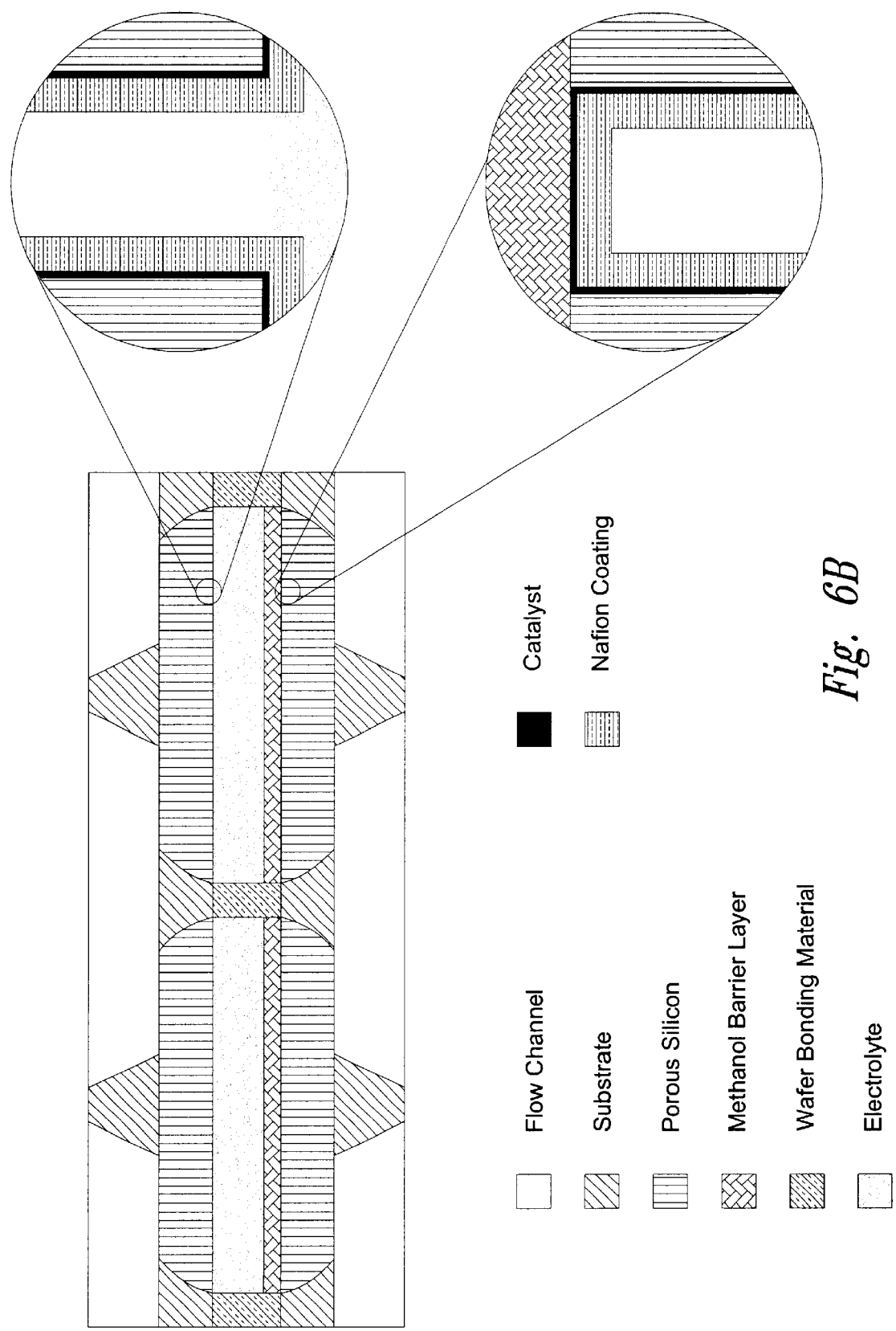
FIG. 6B illustrates a cross-sectional view of an exemplary electrode assembly in accordance with an embodiment of the present invention, wherein the cross-sectional view has an exploded region that depicts a NAFION coating on a pore surface of a porous silicon substrate.

As is appreciated by those skilled in the art, NAFION is available as a 5 wt % solution in alcohols and water, which when applied to the electrodes disclosed herein may wet the surface and flow into the pores of the active regions. When dry, the polymer tends to stick to the internal surfaces but does not completely fill the channels, so that fuel will be able to infuse the structure and protons will be conducted across the cell. With a coating of the surfaces inside the porous structure, exceptional catalyst utilization and proton transport may be achieved. FIGS. 6A and 6B illustrate a cross-sectional view of an exemplary electrode assembly in accordance with an embodiment of the present invention, wherein the cross-sectional view has an exploded region that depicts a NAFION coating on a pore surface associated with active regions.

Figure 7A:
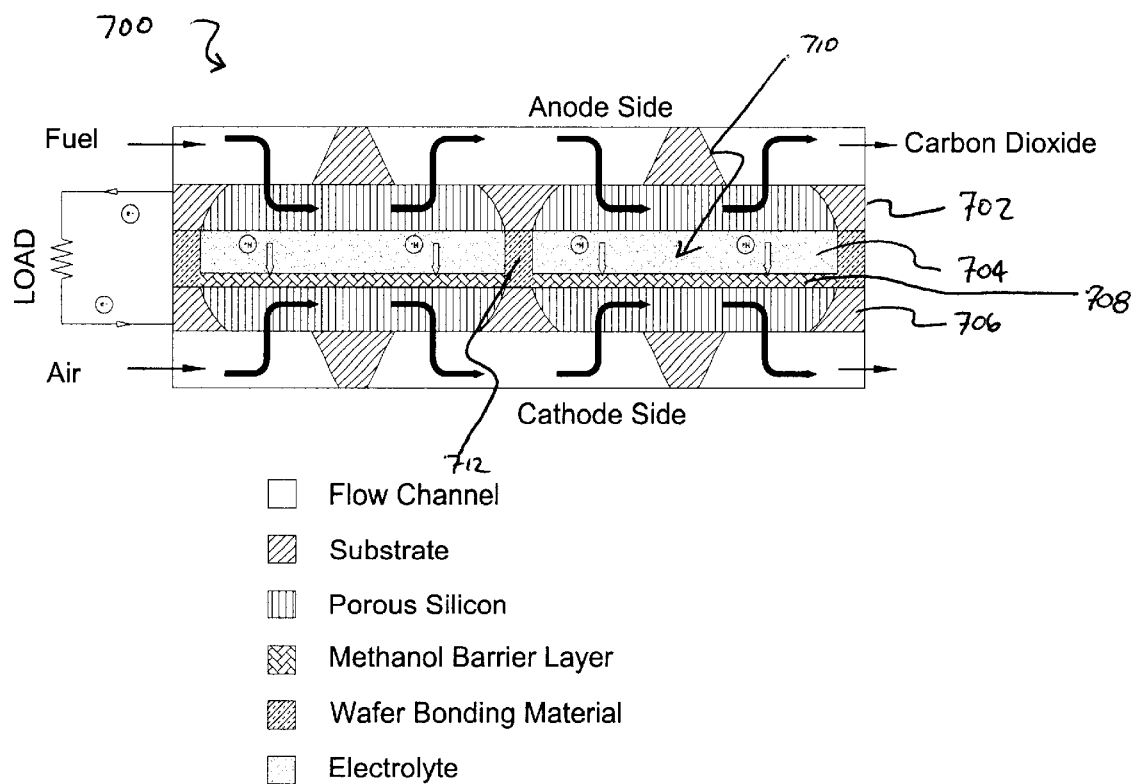
FIG. 7A illustrates a cross-sectional view of an exemplary electrode assembly in accordance with an embodiment of the present invention, wherein a planar anode and a planar cathode have porous silicon substrate regions, and wherein the planar anode and the planar cathode are attached to each other by a plurality of bridge members that span across a spaced apart region.
Figure 7B:
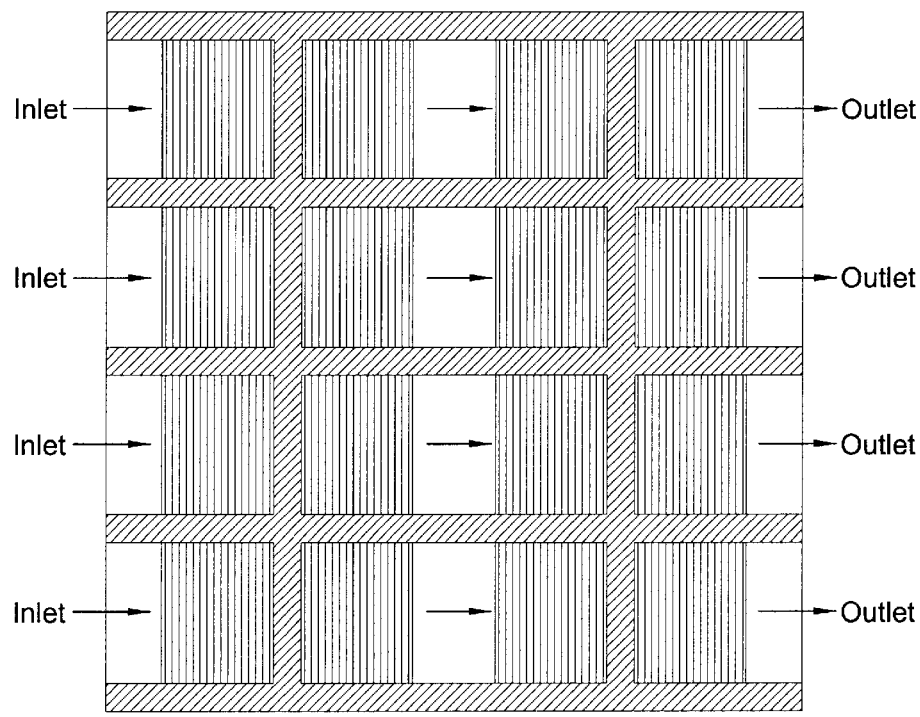
FIG. 7B illustrates a top view of the electrode assembly of FIG. 7A.
Figure 8A:
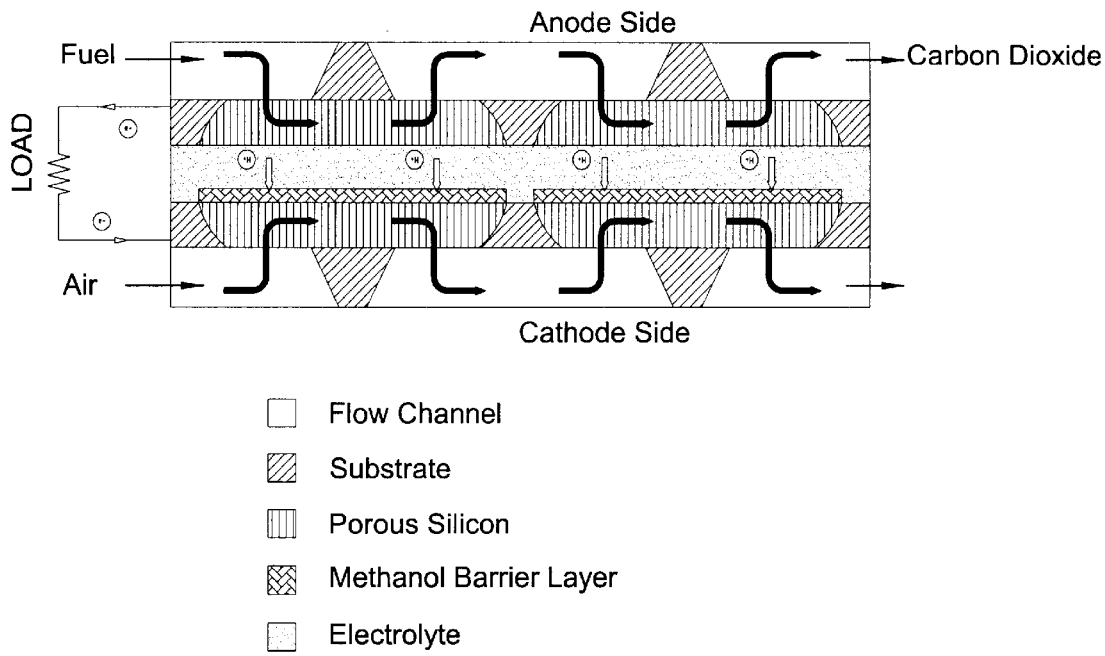
FIG. 8A illustrates a cross-sectional view of an exemplary electrode assembly in accordance with an embodiment of the present invention.
Figure 8B:
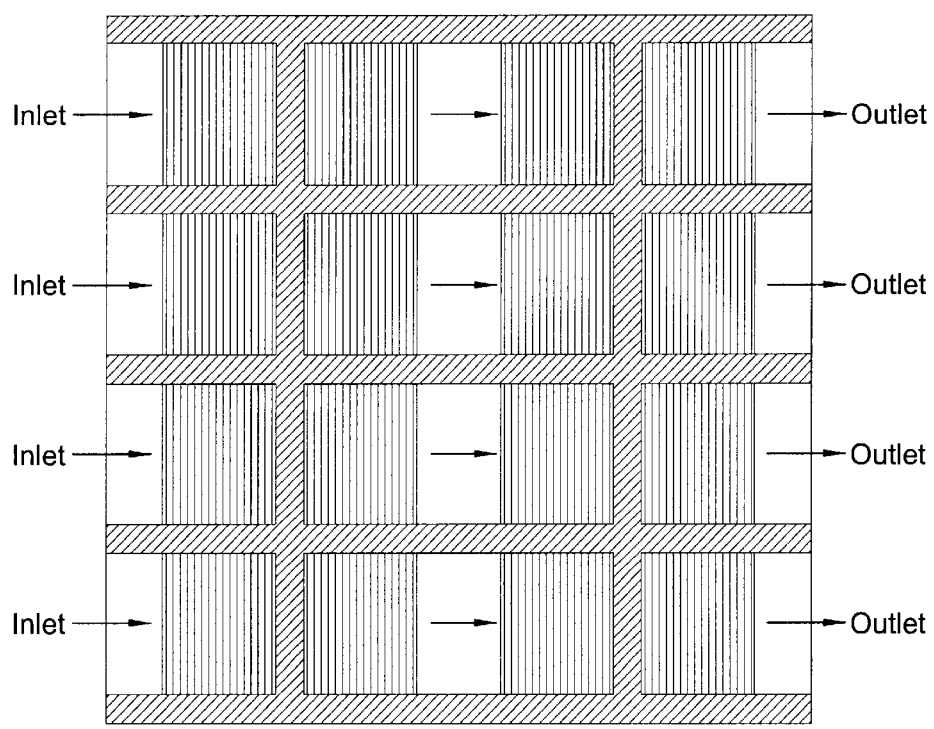
FIG. 8B illustrates a top view of the electrode assembly of FIG. 8A.
Figure 9A:
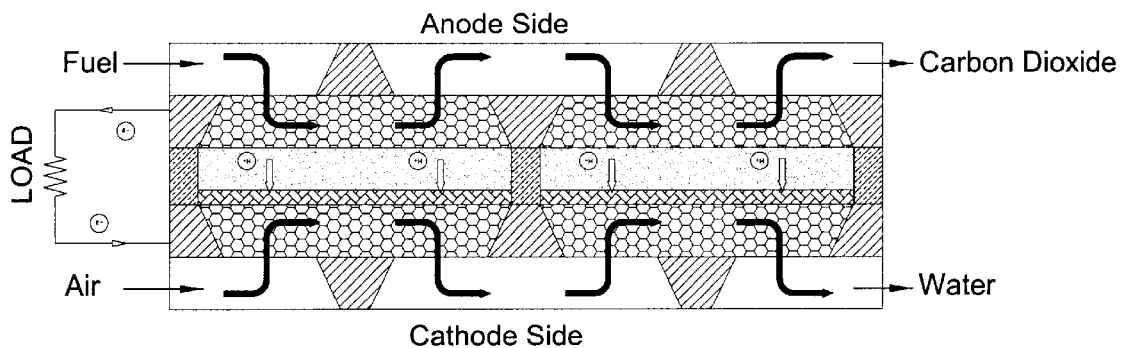
FIG. 9A illustrates a cross-sectional view of an exemplary electrode assembly in accordance with an embodiment of the present invention, wherein a planar anode and a planar cathode have sol-gel derived support structure regions, and wherein the planar anode and the planar cathode are attached to each other by a plurality of bridge members that span across a spaced apart region.
Figure 9B:
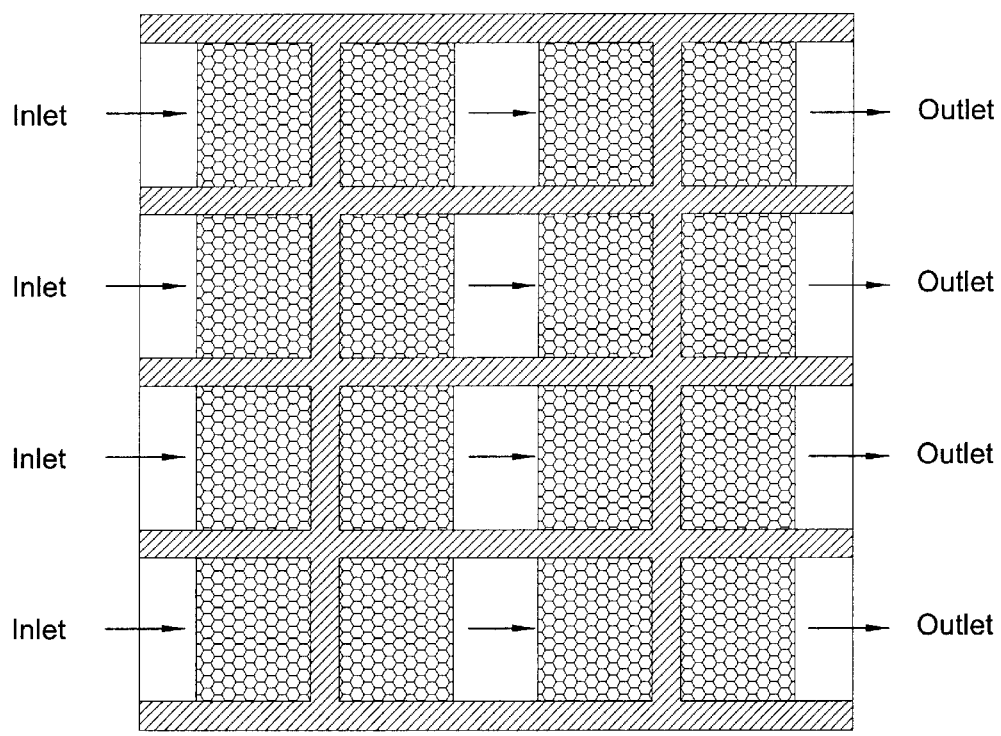
FIG. 9B illustrates a top view of the electrode assembly of FIG. 9A.
Figure 10A:
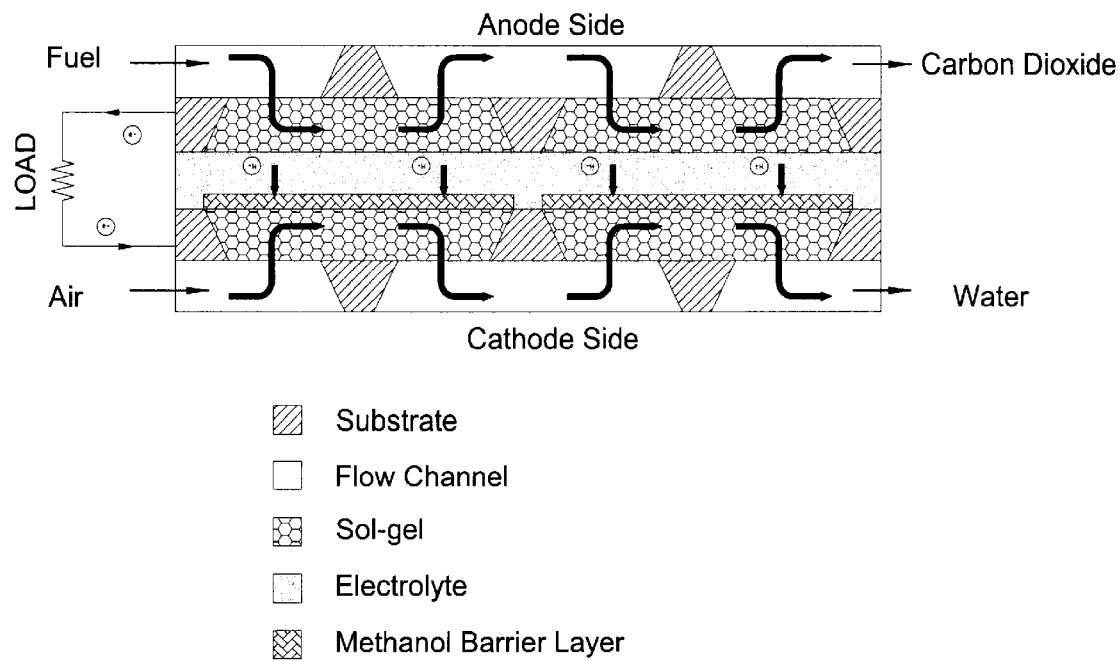
FIG. 10A illustrates a cross-sectional view of an exemplary electrode assembly in accordance with an embodiment of the present invention.
Figure 10B:
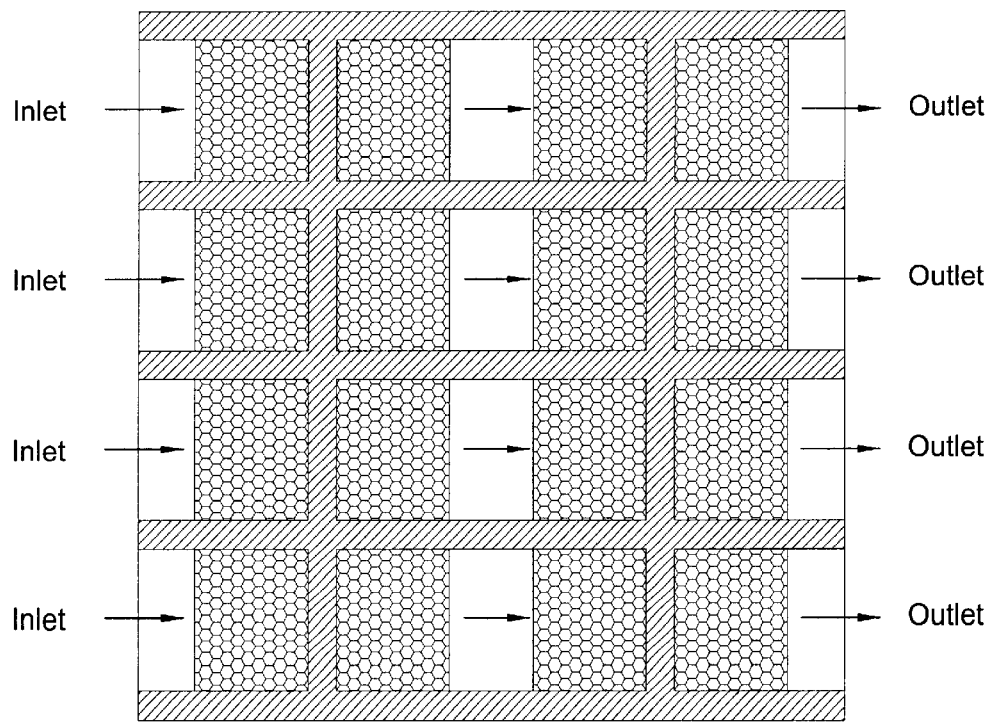
FIG. 10B illustrates a top view of the electrode assembly of FIG. 10A.
Figure 11A:
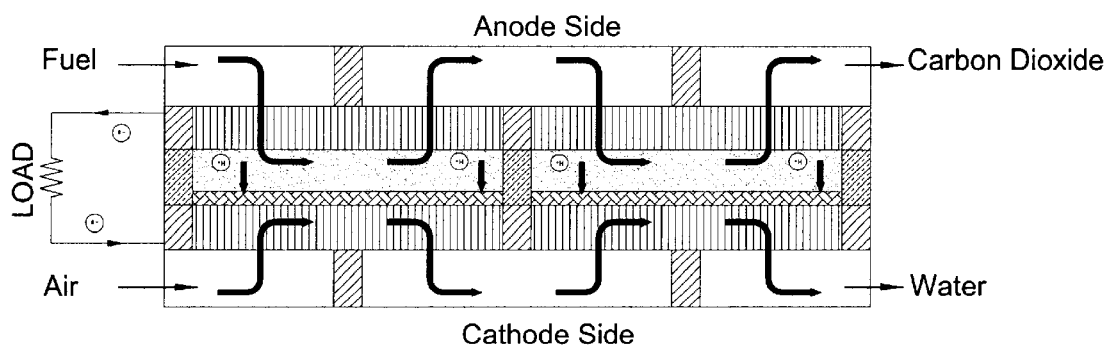
FIG. 11A illustrates a cross-sectional view of an exemplary electrode assembly in accordance with an embodiment of the present invention.
Figure 11B:
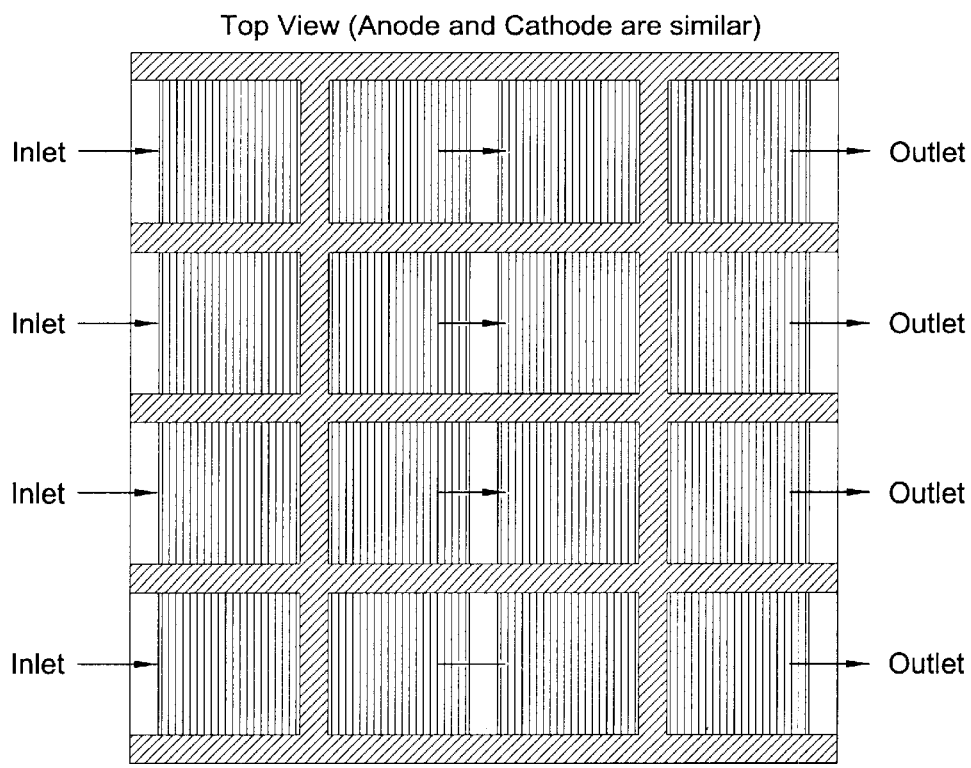
FIG. 11B illustrates a top view of the electrode assembly of FIG. 11A.
Figure 12A:
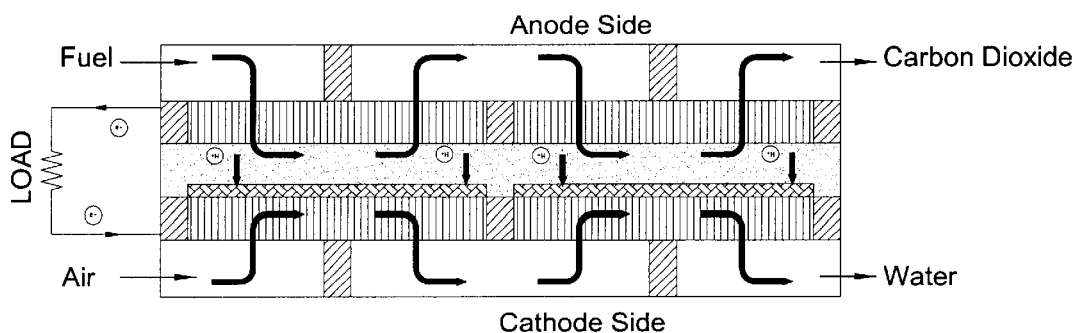
FIG. 12A illustrates a cross-sectional view of an exemplary electrode assembly in accordance with an embodiment of the present invention.
Figure 12B:
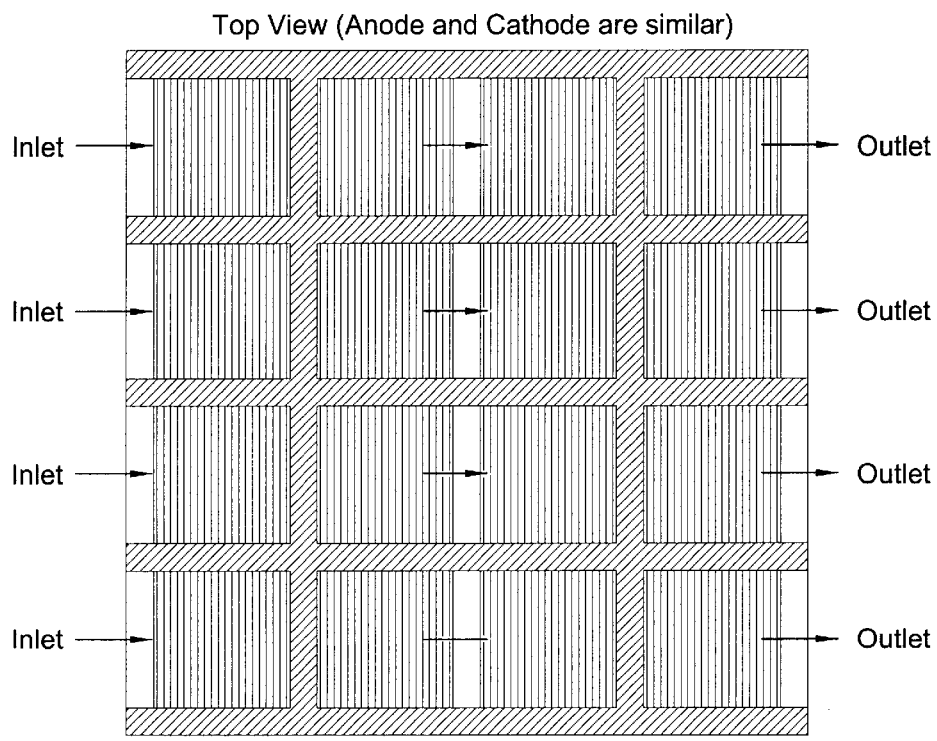
FIG. 12B illustrates a top view of the electrode assembly of FIG. 12A.
Figure 13A:
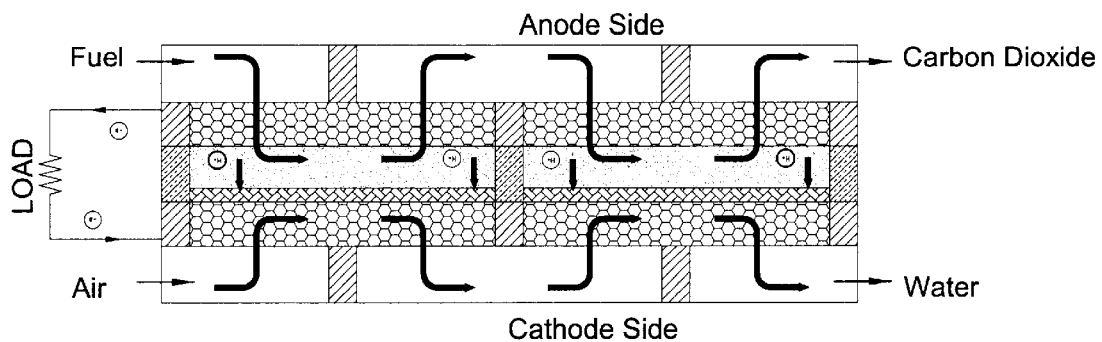
FIG. 13A illustrates a cross-sectional view of an exemplary electrode assembly in accordance with an embodiment of the present invention.
Figure 13B:
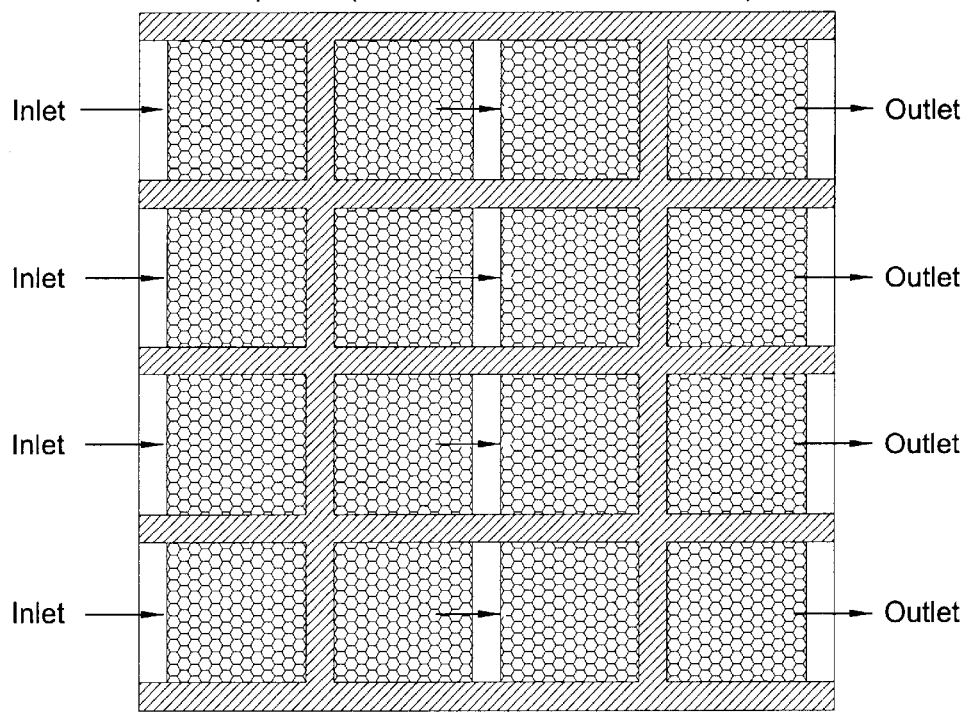
FIG. 13B illustrates a top view of the electrode assembly of FIG. 13A.
Figure 14A:
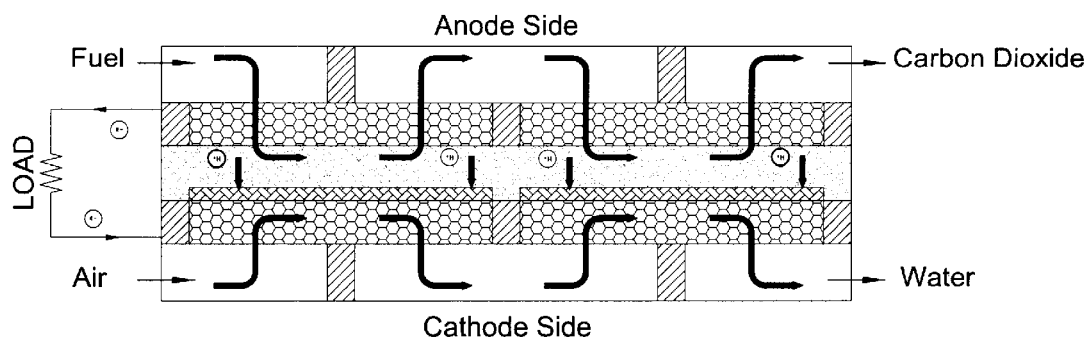
FIG. 14A illustrates a cross-sectional view of an exemplary electrode assembly in accordance with an embodiment of the present invention.
Figure 14B:
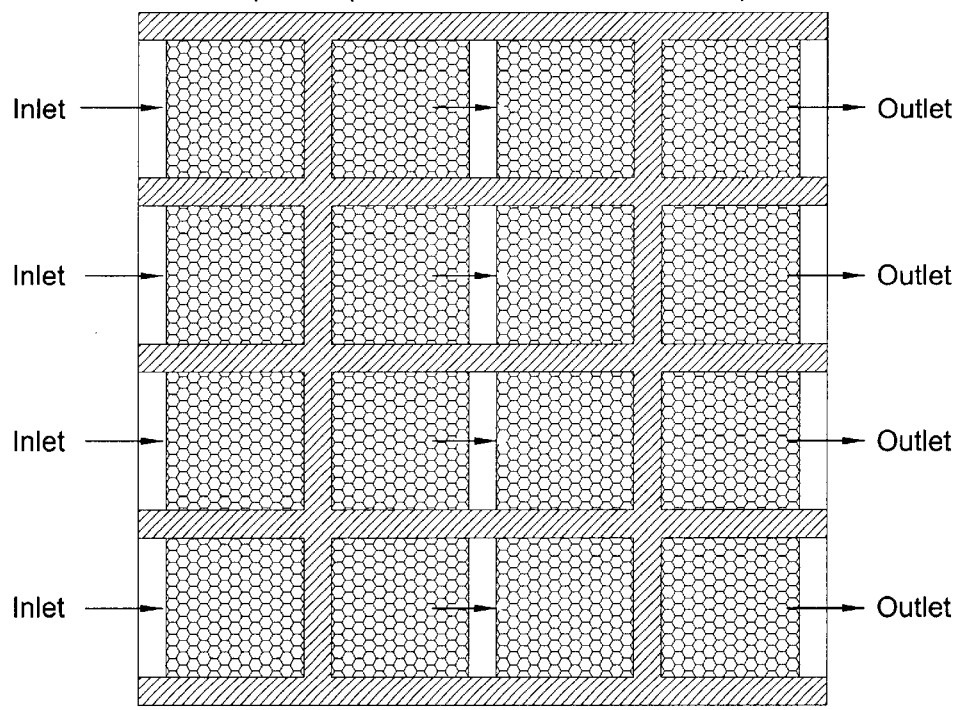
FIG. 14B illustrates a top view of the electrode assembly of FIG. 14A.

In view of the foregoing disclosure relating to several pertinent aspects of the present invention, various embodiments associated therewith are more fully set forth below (and with reference to several of the accompanying drawings). Thus, and in accordance with the embodiment represented by FIGS. 7A and 7b, the present invention is directed to an electrode assembly 700 adapted for use with a fuel cell (not shown). In this embodiment, the electrode assembly 700 comprises a planar anode 702 made from a silicon substrate, an electrolyte layer 704, a planar cathode 706 made from a silicon substrate, and optionally a blocking layer 708 that is substantially impermeable to at least methanol and is substantially permeable to protons. As shown, the planar anode 702 and the planar cathode 706 are spaced apart and substantially parallel to each other so as to define a spaced apart region 710, wherein the electrolyte layer 704 and optional blocking layer 708 are interposed between the planar anode 702 and the planar cathode 706 and within at least a portion of the spaced apart region 710, and wherein the planar anode 702 and the planar cathode 706 are attached to each other by at least one bridge member 712 that spans across the spaced apart region 710. As depicted, fuel flows through the anode and partially into the electrolyte, whereas flows only through the cathode. Several other exemplary electrode assemblies in accordance with other embodiments of the invention are shown in FIGS. 8A–14B.

For purposes of illustration and not limitation, the following examples more specifically disclose various aspects of the present invention.

EXAMPLES

EXAMPLE 1

SILICON SUBSTRATE ELECTRODE ASSEMBLY WITH SPANNING BRIDGE MEMBERS

This example discloses the processing steps associated with making a membrane electrode assembly adapted for use with a fuel cell, wherein the membrane electrode assembly comprises: a planar anode made from a silicon substrate; an electrolyte layer; a planar cathode made from a silicon substrate; and optionally a blocking layer that is substantially impermeable to at least methanol and is substantially permeable to protons; wherein the planar anode and the planar cathode are spaced apart and substantially parallel to each other so as to define a spaced apart region, wherein the electrolyte layer and optional blocking layer are interposed between the planar anode and the planar cathode and within at least a portion of the spaced apart region, and wherein the planar anode and the planar cathode are attached to each other by at least one bridge member that spans across the spaced apart region.

In this example, the processing steps consist essentially of (1) the anode fabrication steps, (2) the cathode fabrication steps, and (3) the anode/electrolyte/cathode fabrication steps as set forth below and with reference to FIGS. 15 to 51.

Figure 15:
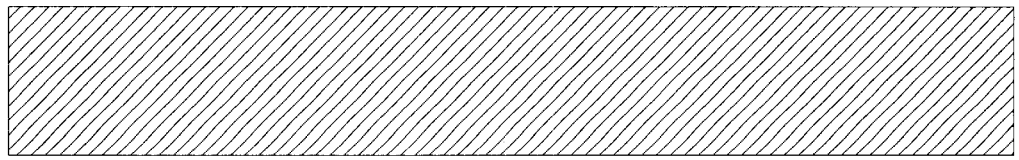
FIG. 15 illustrates a double sided polished silicon wafer.
Figure 15:

ANODE FABRICATION—The anode fabrication steps involve processing a silicon wafer so as to form (1) a plurality of channels, (2) a plurality of porous regions, (3) an enhanced current conductor, and (4) a chemisorbed catalyst as set forth below:

1.1 CHANNEL—BASE MATERIAL—Start with a 500 μm double sided polished silicon wafer as shown in FIG. 15 (Note that the top side will be referred to as S1 and that the bottom side will be referred to as S2 in the rest of Section 1.0).

1.2 CHANNEL—NANOSTRIP IMMERSION—Remove organics adhered to surface of silicon by immersing in nanostrip solution for half an hour at room temperature.

1.3 CHANNEL—RINSE—Rinse off nanostrip solution with DI H$_2$O three times.

1.4 CHANNEL—RINSE AND DRY—Use a Verteq Spin/Dryer to (1) clean substrate by rinsing with DI H$_2$O at 300 rpm for 5 minutes; then (2) dry with N$_2$ at 900 rpm for 10 minutes.

Figure 16:
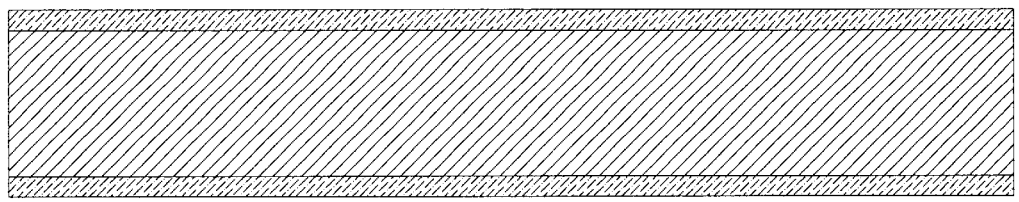
FIG. 16 illustrates a silicon wafer having a 1,000 Å layer of silicon nitride deposited on both sides.
Figure 16:
Figure 16:

1.5 CHANNEL—SILICON NITRIDE DEPOSITION—Deposit a 1000 Å layer of silicon nitride via CVD on both sides of the silicon wafer as shown in FIG. 16.

1.6 CHANNEL—NANOSTRIP IMMERSION—Remove organics adhered to surface of silicon nitride by immersing in nanostrip solution.

1.7 CHANNEL—RINSE—Rinse off nanostrip solution with DI H$_2$O three times.

1.8 CHANNEL—RINSE AND DRY—Use a Verteq Spin/Dryer to (1) clean substrate by rinsing with DI H$_2$O at 300 rpm for 5 minutes; then (2) dry with N$_2$ at 900 rpm for 10 minutes.

Figure 17:
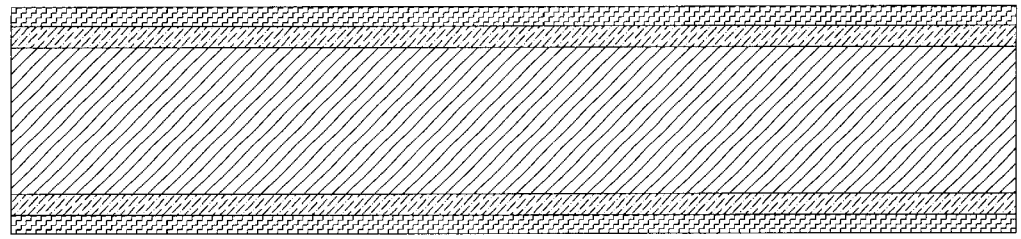
FIG. 17 illustrates a silicon wafer having a 1,000 Å layer of silicon nitride and a thin layer of hexamethyldilazane deposited on both sides.
Figure 17:
Figure 17:
Figure 17:

1.9 CHANNEL—PRIMER DEPOSITION—Primer Oven is used to deposit a thin layer of hexamethyldilazane to increase the photoresist adhesion on the silicon wafer surface as shown in FIG. 17.

Figure 18:
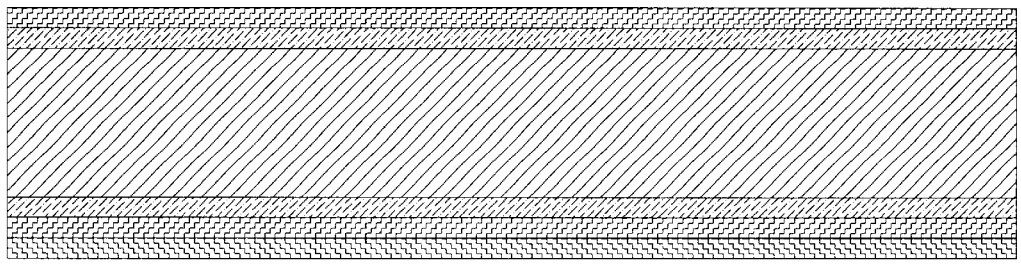
FIG. 18 illustrates a silicon wafer having a 1,000 Å layer of silicon nitride and a thin layer of hexamethyldilazane deposited on both sides, as well as a thin layer of photoresist deposited on one side.
Figure 18:
Figure 18:
Figure 18:
Figure 18:

1.10 CHANNEL—SPIN COAT RESIST—Deposit a thin layer of photoresist (which acts as a mask so that patterns can be introduced on the nitride layer for selective nitride etching) with a Spin Coater at 3,000 rpm for 30 seconds on one side of the wafer on S2 as shown in FIG. 18.

1.11 CHANNEL—POST BAKE RESIST—Place wafer on a hot plate at 145° C. for 45 seconds to harden the resist.

Figure 19:
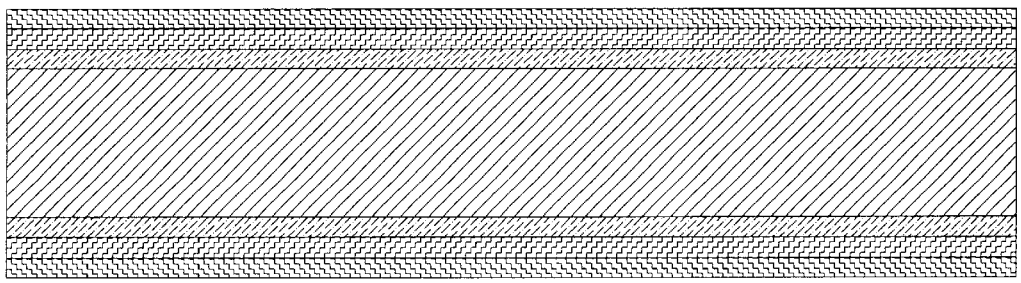
FIG. 19 illustrates a silicon wafer having a 1,000 Å layer of silicon nitride and a thin layer of hexamethyldilazane deposited on both sides, as well as a thin layer of photoresist deposited on both sides.
Figure 19:
Figure 19:
Figure 19:
Figure 19:

1.12 CHANNEL—SPIN COAT RESIST—Deposit a thin layer of photoresist (which acts as a mask so that patterns can be introduced on the nitride for selective nitride etching) with a Spin Coater at 3,000 rpm for 30 seconds on the other side of the wafer, S1, as shown in FIG. 19.

1.13 CHANNEL—PRE-BAKE RESIST—Place wafer on a hot plate at 90° C. for 45 seconds to semi-harden photoresist for UV exposure preparation.

Figure 20:
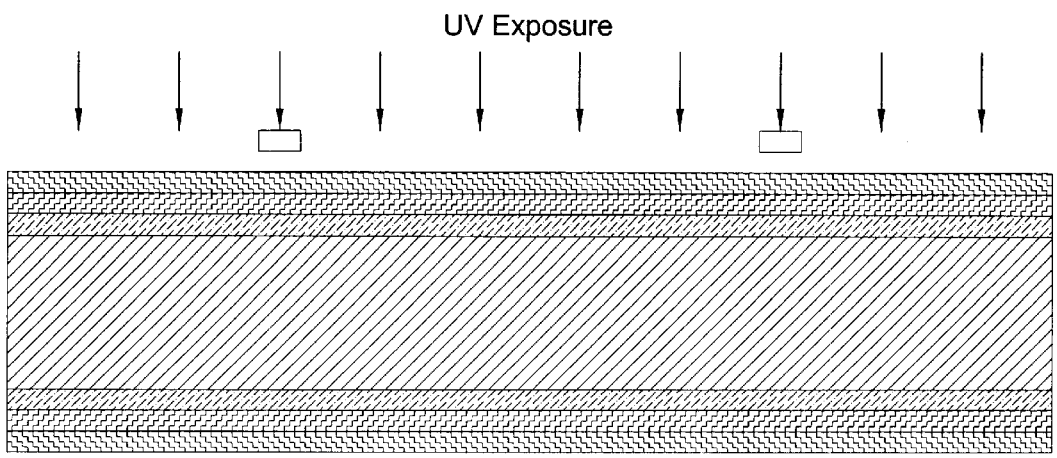
FIG. 20 illustrates the transferring of a pattern onto a photoresist layer associated with a silicon wafer.

1.14 CHANNEL—UV EXPOSURE—Transfer pattern on mask onto the photoresist layer with a IR contact aligner under UV for 15 seconds on S1 as shown in FIG. 20.

Figure 21:
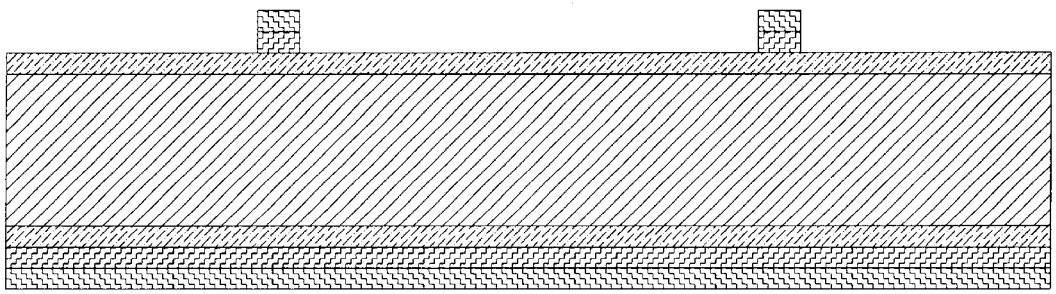
FIG. 21 illustrates a silicon wafer having a developed photoresist layer removed therefrom.

1.15 CHANNEL—DEVELOP PATTERN—Immerse sample in 1:5 AZ312 MIF:DI $H_2O$ solution for 60 seconds to develop Pattern onto the wafer as shown in FIG. 21.

1.16 CHANNEL—RINSE AND DRY—Use a Verteq Spin/Dryer to (1) clean substrate by rinsing with DI H20 at 300 rpm for 5 minutes; then (2) dry with $N_2$ at 900 rpm for 10 minutes.

1.17 CHANNEL—POST BAKE RESIST—Place wafer on a hot plate at 145° C. for 45 seconds to harden the resist.

Figure 22:
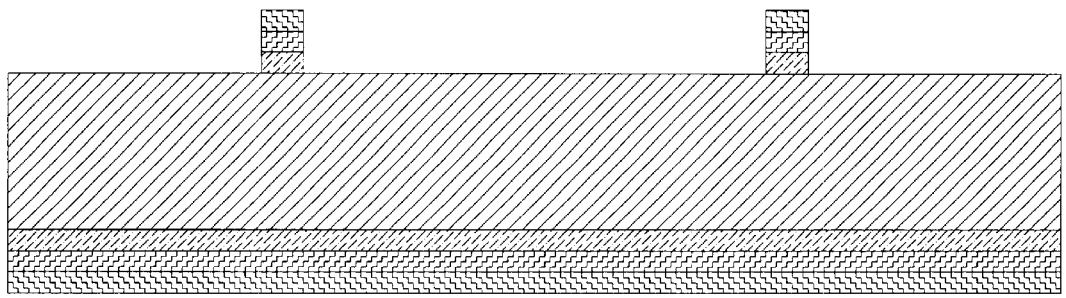
FIG. 22 illustrates a silicon wafer having a nitride layer removed therefrom.

1.18 CHANNEL—PHOSPHORIC ACID ETCH—Selectively remove nitride layer on S1 by immersing in 85 wt % phosphoric acid at 160° C. (depth is dependent on duration of etching, 30 Å/min) as shown in FIG. 22.

1.19 CHANNEL—RINSE—Rinse off phosphoric acid etching solution with DI $H_2O$ three times.

Figure 23:
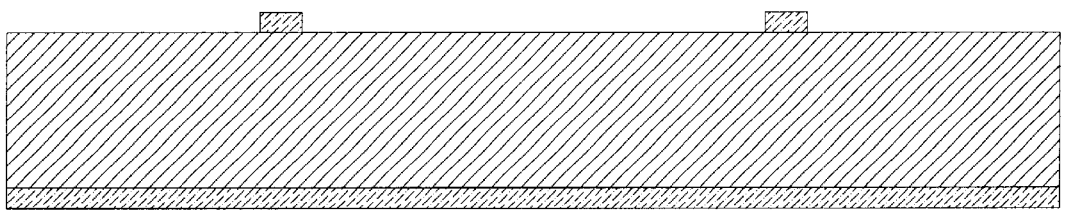
FIG. 23 illustrates a silicon wafer have a remaining layer of photoresist removed therefrom.

1.20 CHANNEL—RESIST STRIP—Remove the remaining photoresist by immersing in acetone (removal of strip with acetone is fast). Rinse in nanostrip solution for final cleaning at room temperature as shown in FIG. 23.

Figure 24:
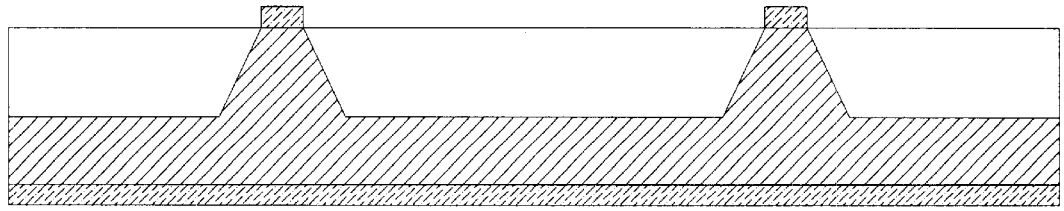
FIG. 24 illustrates a silicon wafer that has been selectively etched to form a plurality of channels.

1.21 CHANNEL—KOH ETCH—The pattern from the photoresist is transferred onto S1 of the silicon substrate by immersing in 30 wt % KOH solution at 80° C. (depth is dependent on duration of etching, 1.65–1.75 µm/min) as shown in FIG. 24.

1.22 CHANNEL—RINSE—Rinse off KOH etching solution with DI $H_2O$ three times.

1.23 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

Figure 25:
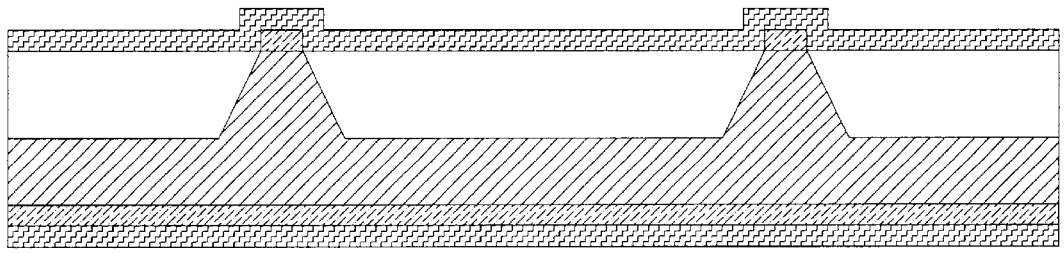
FIG. 25 illustrates an etched silicon wafer having a thin layer of hexamethyldilazane deposited thereon.

1.24 POROUS SILICON—PRIMER DEPOSITION—Primer Oven is used to deposit a thin layer of hexamethyldilazane to increase the photoresist adhesion on the silicon wafer surface as shown in FIG. 25.

Figure 26:
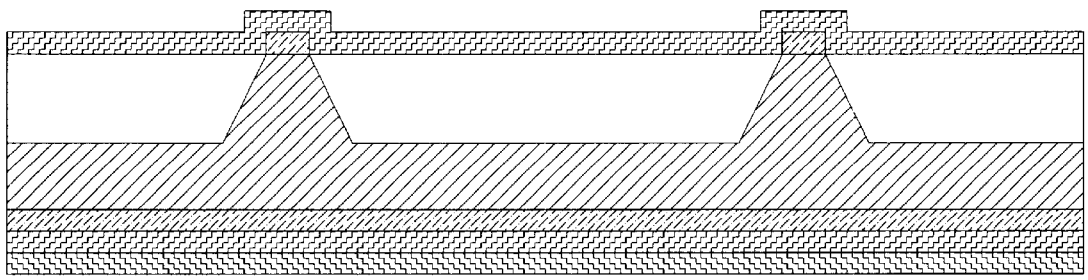
FIG. 26 illustrates an etched silicon wafer having a thin layer of hexamethyldilazane and photoresist deposited thereon.

1.25 POROUS SILICON—SPIN COAT RESIST—Deposit a thin layer of photoresist (which acts as a mask so that patterns can be introduced on the nitride for selective nitride etching) with a Spin Coater at 3,000 rpm for 30 seconds on S2 as shown in FIG. 26.

1.26 POROUS SILICON—PRE-BAKE RESIST—Place wafer on a hot plate at 90° C. for 45 seconds to semi-harden photoresist for UV exposure preparation.

Figure 27:
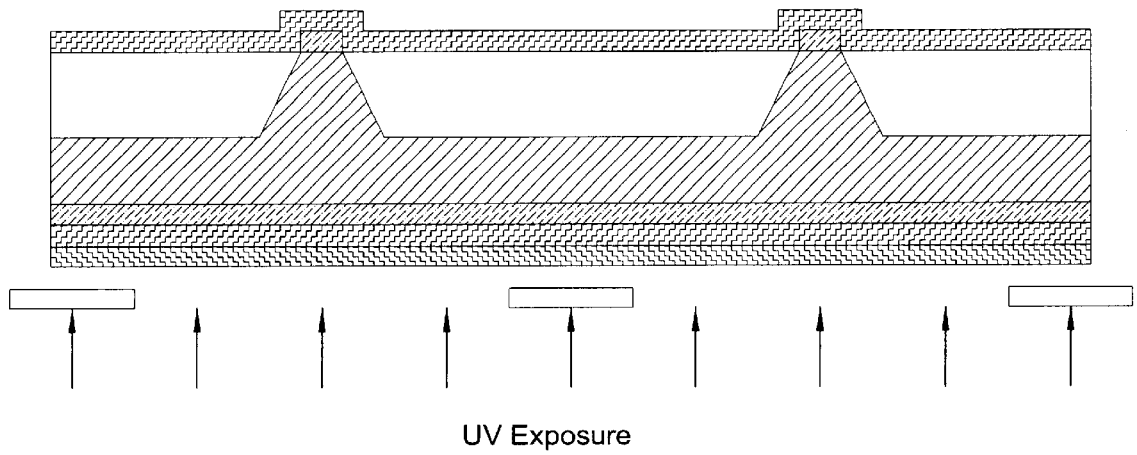
FIG. 27 illustrates the transferring of a pattern onto a photoresist layer associated with a silicon wafer.

1.27 POROUS SILICON UV EXPOSURE—Transfer pattern on mask onto the photoresist layer, S2, with an IR contact aligner under UV for 15 seconds as shown in FIG. 27.

Figure 28:
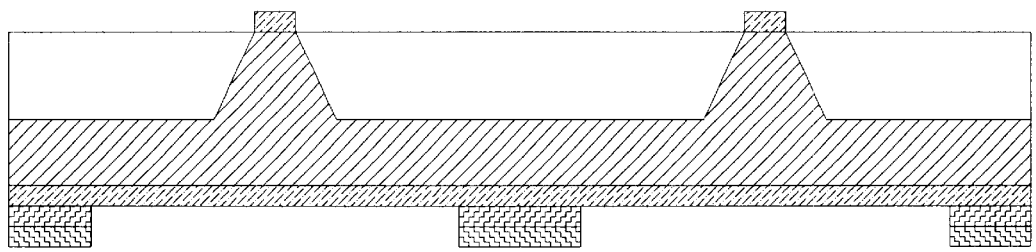
FIG. 28 illustrates a silicon wafer having a developed photoresist layer removed therefrom.

1.28 POROUS SILICON—DEVELOP PATTERN—Immerse sample in 1:5 AZ312 MIF:DI $H_2O$ solution for 60 seconds to develop pattern onto wafer as shown in FIG. 28.

1.29 POROUS SILICON—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

1.30 POROUS SILICON—POST BAKE RESIST—Place wafer on a hot plate at 145° C. for 45 seconds to harden the resist.

Figure 29:
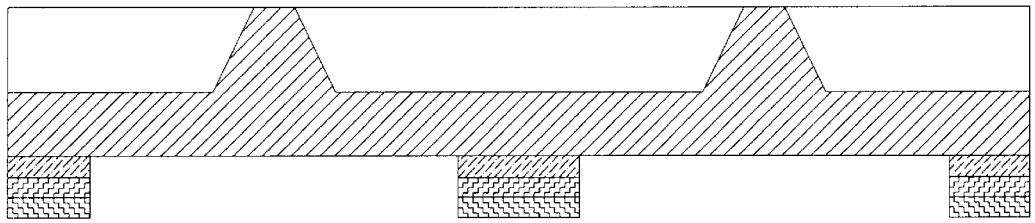
FIG. 29 illustrates a silicon wafer having a nitride layer removed therefrom.

1.31 POROUS SILICON—PHOSPHORIC ACID ETCH—Remove nitride layer on S2 of the substrate by immersing in 85 wt % phosphoric acid at 160° C. (depth is dependent on duration of etching, 30 Å/min) as shown in FIG. 29.

1.32 POROUS SILICON—RINSE—Rinse off phosphoric acid etching solution with DI $H_2O$ three times.

Figure 30:
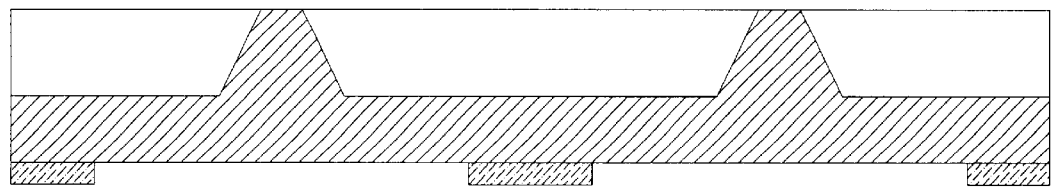
FIG. 30 illustrates a silicon wafer having a remaining layer of photoresist removed therefrom.

1.33 POROUS SILICON—RESIST STRIP—Remove the remaining photoresist by immersing in acetone (removal of strip with acetone is fast). Rinse in nanostrip solution for final cleaning at room temperature as shown in FIG. 30.

Figure 31:
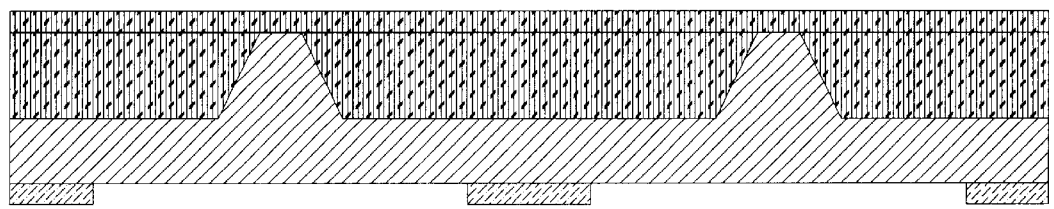
FIG. 31 illustrates a silicon wafer having a 500 nm layer of aluminum deposited thereon for an ohmic contact.

1.34 POROUS SILICON—ALUMINUM DEPOSITION—Deposit a 500 nm layer of aluminum by evaporation deposition for an ohmic contact on S1 of the wafer (preparation for anodic etching) as shown in FIG. 31.

1.35 POROUS SILICON—THIN FILM ANNEAL—Anneal for 30 minutes in an oxidation/diffusion furnace at 450° C. under $N_2$ gas flow. This will reduce the interface resistivity between the aluminum contact and the silicon.

Figure 32:
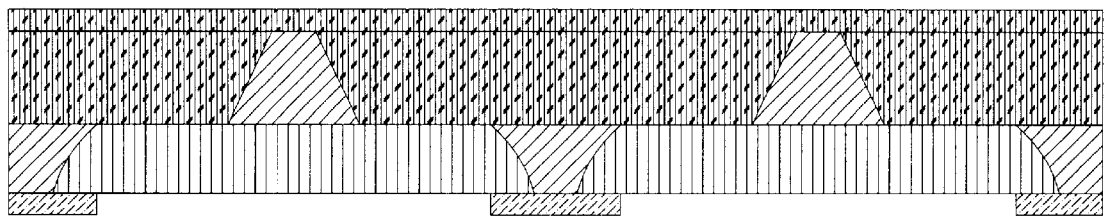
FIG. 32 illustrates a silicon wafer that has been selectively etched to form a plurality of porous silicon regions.
Figure 32:
Figure 32:
Figure 32:
Figure 32:
Figure 32:

1.36 POROUS SILICON—ANODIC ETCH—Substrate is immersed in an HF-$H_2O$ solution (1% HF–17% HF), a potential is applied on the substrate to provide a current density of 12 mA/cm². To provide a thick porous silicon layer, the substrate will be etched for more than 1,000 seconds. Illumination (UV light source) of the substrate is required for n-type silicon substrates as shown in FIG. 32.

Figure 33:
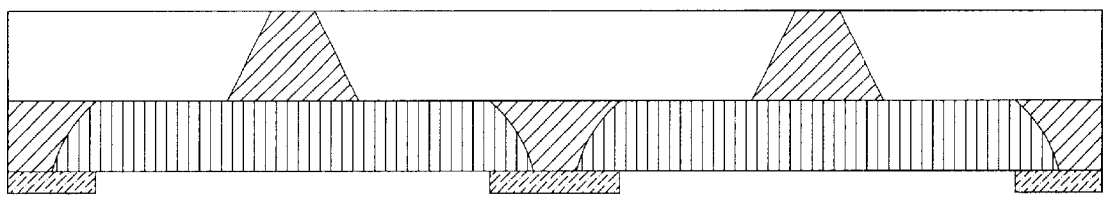
FIG. 33 illustrates a silicon wafer having an aluminum layer removed therefrom.
Figure 33:
Figure 33:
Figure 33:
Figure 33:

1.37 POROUS SILICON—ALUMINUM STRIP—Remove the aluminum layer on S1 by immersing in an aqueous solution containing phosphoric acid, nitric acid, and acetic acid at 50° C. (depth is dependent on duration of etching, 6,600 Å/min) as shown in FIG. 33.

Figure 34:
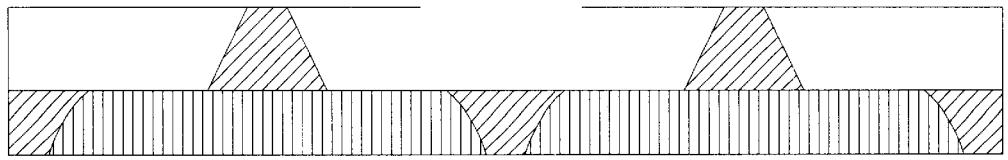
FIG. 34 illustrates a silicon wafer having a silicon nitride layer removed therefrom.

1.38 POROUS SILICON—PHOSPHORIC ACID ETCH—Remove nitride layer on S2 of the substrate by immersing in 85 wt % phosphoric acid at 160° C. (depth is dependent on duration of etching, 30 Å/min) as shown in FIG. 34.

1.39 POROUS SILICON—RINSE—Rinse off phosphoric acid etching solution with DI $H_2O$ three times.

1.40 CURRENT CONDUCTOR—BORON DOPING—Heat substrate to 950° C. under a flow of $N_2$ and $H_2$ for 24 hours to enable Boron diffusion from a Planar Diffusion Source (PDS).

1.41 CURRENT CONDUCTOR—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

1.42 CURRENT CONDUCTOR—SPUTTER ADHESION LAYER—Sputter a 500 Å thick layer of titanium-tungsten onto S1 of the substrate.

1.43 CURRENT CONDUCTOR—SPUTTER GOLD—Sputter a 200 Å thick layer of gold onto S1 of the substrate.

1.44 CATALYST—PRE-FURNACE—Heat the silicon substrate to 200° C. in air for 2 hours.

1.45 CATALYST—PLATINUM SOLUTION—After the silicon substrate has cooled to room temperature, place silicon wafer in an aqueous ammonia solution of tetraamineplatinum(II) hydroxide hydrate, $[Pt(NH_3)_4](OH)_2 \cdot xH_2O$, at pH 8.5 and stir for 10 hours. The solution will contain enough platinum complex to deposit a maximum of 2% weight platinum on silicon, i.e., a 100 mg wafer will be placed in a bath containing 2 mg of platinum (3.4 mg tetraamineplatinum(II) hydroxide hydrate).

1.46 CATALYST—DRY—Remove the silicon wafer from the aqueous ammonia solution and dry in vacuo for 1 hour.

1.47 CATALYST—POST FURNACE—Heat silicon substrate under a flow of oxygen/nitrogen (20:80) from RT to 400° C. at a rate of 2° C. per minute, approximately 3 hours, and then hold at 400° C. for 1 hour.

1.48 CATALYST—RUTHENIUM SOLUTION—After the silicon wafer has cooled to room temperature, placed silicon wafer in an aqueous ammonia solution of hexamineruthenium(III) chloride, $[Ru(NH_3)_6]Cl_3$, at pH 8.5 and stir for 10 hours. The solution will contain enough ruthenium complex to deposit a maximum of 1.5% weight ruthenium on silicon, i.e., a 100 mg wafer will be placed in a bath containing 1.5 mg ruthenium (4.6 mg hexamineruthenium(III) chloride).

1.49 CATALYST—DRY—Remove the silicon wafer from the aqueous ammonia solution and dry in vacuo for 1 hour.

1.50 CATALYST—POST FURNACE—Heat silicon substrate under a flow of oxygen/nitrogen (20:80) from room temperature to 400° C. at a rate of 2° C. per minute, approximately 3 hours, and then hold at 400° C. for 1 hour.

1.51 CATALYST—ACTIVATION—Heat the silicon wafer under flowing hydrogen. The temperature should be rapidly increased from room temperature to 400° C. at a rate of 25° C. per minute, approximately 15 minutes, and held at 400° C. for 4 hours.

CATHODE FABRICATION—The cathode fabrication steps involve processing a silicon wafer so as to form (1) a plurality of channels, (2) a plurality of porous regions, (3) an enhanced current conductor, (4) a methanol barrier layer, and (5) a chemisorbed catalyst as set forth below:

2.1 CHANNEL—BASE MATERIAL—Start with a 500 μm double sided polished silicon wafer as shown in FIG. 15 (note that the top side will be referred to as S1 and that the bottom side will be referred to as S2 below).

2.2 CHANNEL—NANOSTRIP IMMERSION—Remove organics adhered to surface of silicon by immersing in nanostrip solution for half an hour at room temperature.

2.3 CHANNEL—RINSE—Rinse off nanostrip solution with DI $H_2O$ three times.

2.4 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

2.5 CHANNEL—SILICON NITRIDE DEPOSITION—Deposit a 1,000 Å layer of silicon nitride via CVD on both sides of the silicon wafer as shown in FIG. 16.

2.6 CHANNEL—NANOSTRIP IMMERSION—Remove organics adhered to surface of silicon nitride by immersing in nanostrip solution.

2.7 CHANNEL—RINSE—Rinse off nanostrip solution with DI $H_2O$ three times.

2.8 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

2.9 CHANNEL—PRIMER DEPOSITION—Primer Oven is used to deposit a thin layer of hexamethyldilazane to increase the photoresist adhesion on the silicon wafer surface as shown in FIG. 17.

2.10 CHANNEL—SPIN COAT RESIST—Deposit a thin layer of photoresist (which acts as a mask so that patterns can be introduced on the nitride layer for selective nitride etching) with a Spin Coater at 3,000 rpm for 30 seconds on one side of the wafer on S2 as shown in FIG. 18.

2.11 CHANNEL—POST BAKE RESIST—Place wafer on a hot plate at 145° C. for 45 seconds to harden the resist.

2.12 CHANNEL—SPIN COAT RESIST—Deposit a thin layer of photoresist (which acts as a mask so that patterns can be introduced on the nitride for selective nitride etching) with a Spin Coater at 3,000 rpm for 30 seconds on the other side of the wafer, S1, as shown in FIG. 19.

2.13 CHANNEL—PRE-BAKE RESIST—Place wafer on a hot plate at 90° C. for 45 seconds to semi-harden photoresist for UV exposure preparation.

2.14 CHANNEL—UV EXPOSURE—Transfer pattern on mask onto the photoresist layer with an IR contact aligner under UV for 15 seconds on S1 as shown in FIG. 20.

2.15 CHANNEL—DEVELOP PATTERN—Immerse sample in 1:5 AZ312 MIF:DI $H_2O$ solution for 60 seconds to develop pattern onto wafer as shown in FIG. 21.

2.16 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

2.17 CHANNEL—POST BAKE RESIST—Place wafer on a hot plate at 145° C. for 45 seconds to harden the resist.

2.18 CHANNEL—PHOSPHORIC ACID ETCH—Selectively remove nitride layer on S1 by immersing in 85 wt % phosphoric acid at 160° C. (depth is dependent on duration of etching, 30 Å/min) as shown in FIG. 22.

2.19 CHANNEL—RINSE—Rinse off phosphoric acid etching solution with DI $H_2O$ three times.

2.20 CHANNEL—RESIST STRIP—Remove the remaining photoresist by immersing in acetone (removal of strip with acetone is fast). Rinse in nanostrip solution for final cleaning at room temperature as shown in FIG. 23.

2.21 CHANNEL—KOH ETCH—The pattern from the photoresist is transferred onto S1 of the silicon substrate by immersing in 30 wt % KOH solution at 80° C. (depth is dependent on duration of etching, 1.65 μm/min–1.75 μm/min) as shown in FIG. 24.

2.22 CHANNEL—RINSE—Rinse off KOH etching solution with DI $H_2O$ three times.

2.23 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

2.24 POROUS SILICON—PRIMER DEPOSITION—Primer Oven is used to deposit a thin layer of hexamethyldilazane to increase the photoresist adhesion on the silicon wafer surface as shown in FIG. 25.

2.25 POROUS SILICON—SPIN COAT RESIST—Deposit a thin layer of photoresist (which acts as a mask so that patterns can be introduced on the nitride for selective nitride etching) with a Spin Coater at 3,000 rpm for 30 seconds on S2 as shown in FIG. 26.

2.26 POROUS SILICON—PRE-BAKE RESIST—Place wafer on a hot plate at 90° C. for 45 seconds to semi-harden photoresist for UV exposure preparation.

Figure 35:
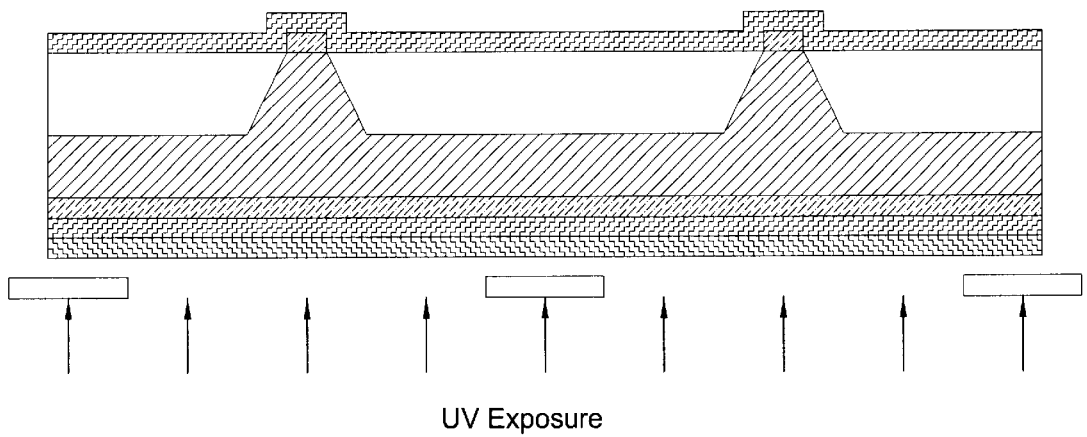
FIG. 35 illustrates the transferring of a pattern onto a photoresist layer associated with a silicon wafer.

2.27 POROUS SILICON—UV EXPOSURE—Transfer pattern on mask onto the photoresist layer, S2, with an IR contact aligner under UV for 15 seconds as shown in FIG. 35.

Figure 36:
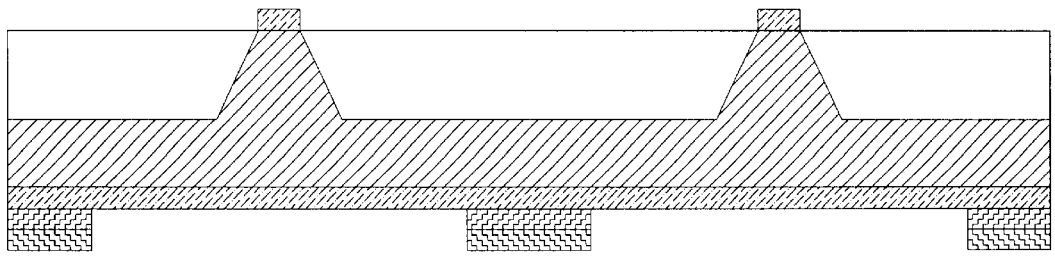
FIG. 36 illustrates a silicon wafer have a developed photoresist layer removed therefrom.

2.28 POROUS SILICON—DEVELOP PATTERN—Immerse sample in 1:5 AZ312 MIF:DI $H_2O$ solution for 60 seconds to develop pattern onto wafer as shown in FIG. 36.

2.29 POROUS SILICON—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

2.30 POROUS SILICON—POST BAKE RESIST—Place wafer on a hot plate at 145° C. for 45 seconds to harden the resist.

Figure 37:
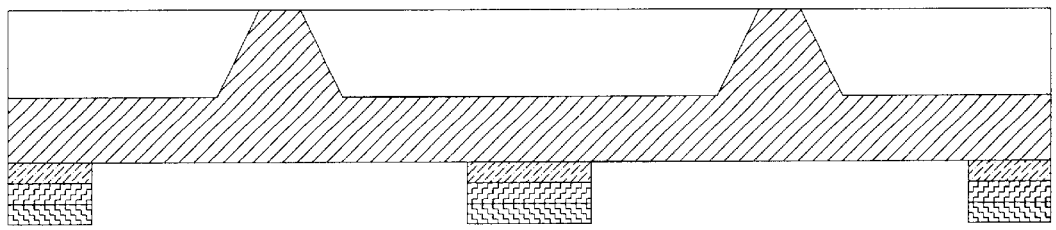
FIG. 37 illustrates a silicon wafer have a nitride layer removed therefrom.

2.31 POROUS SILICON—PHOSPHORIC ACID ETCH—Remove nitride layer on S2 of the substrate by immersing in 85 wt % phosphoric acid at 160° C. (depth is dependent on duration of etching, 30 Å/min) as shown in FIG. 37.

2.32 POROUS SILICON—RINSE—Rinse off phosphoric acid etching solution with DI $H_2O$ three times.

Figure 38:
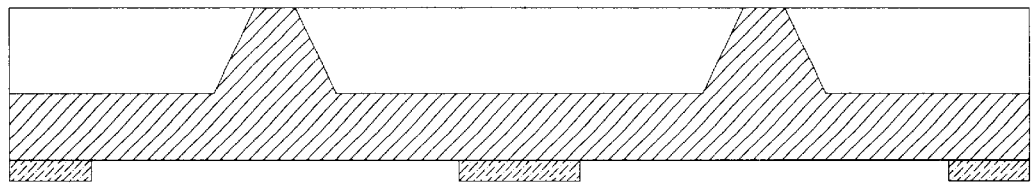
FIG. 38 illustrates a silicon wafer have a remaining layer of photoresist removed therefrom.

2.33 POROUS SILICON—RESIST STRIP—Remove the remaining photoresist by immersing in acetone (removal of strip with acetone is fast). Rinse in nanostrip solution for final cleaning at room temperature as shown in FIG. 38.

Figure 39:
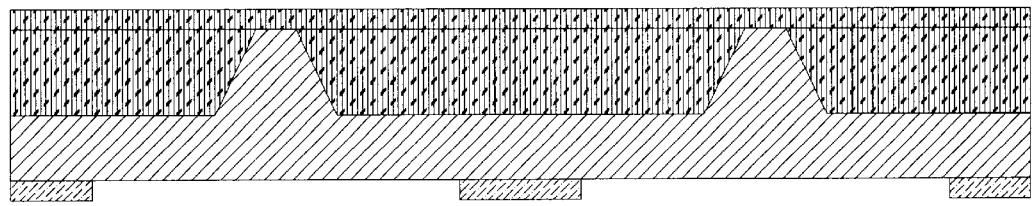
FIG. 39 illustrates a silicon wafer having a 500 nm layer of aluminum deposited thereon for an ohmic contact.

2.34 POROUS SILICON—ALUMINUM DEPOSITION—Deposit a 500 nm layer aluminum for an ohmic contact on S1 of the wafer (preparation for anodic etching) as shown in FIG. 39.

2.35 POROUS SILICON—THIN FILM ANNEAL—Anneal for 30 minutes in an oxidation/diffusions furnace at 450° C. under $N_2$ gas flow. This will reduce the interface resistivity between the aluminum contact and the silicon.

Figure 40:
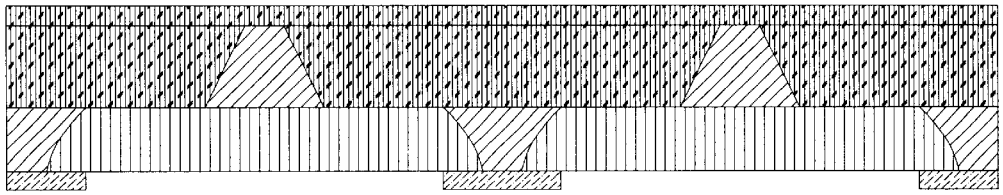
FIG. 40 illustrates a silicon wafer that has been selectively etched to form a plurality of porous silicon regions.

2.36 POROUS SILICON—ANODIC ETCH—Substrate is immersed in a HF-$H_2O$ solution (1–17% HF), a potential is applied on the substrate to provide a current density of 12 $mA/cm^2$. To provide a thick porous silicon layer, the substrate will be etched for more than 1,000 seconds. Illumination (UV light source) of the substrate is required for n-type silicon substrates as shown in FIG. 40.

Figure 41:
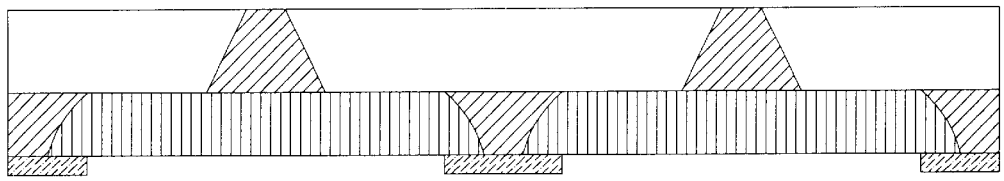
FIG. 41 illustrates a silicon wafer having an aluminum layer removed therefrom.

2.37 POROUS SILICON—ALUMINUM STRIP—Remove the aluminum layer on S1 by immersing in an aqueous solution containing phosphoric acid, nitric acid, and acetic acid at 50° C. (depth is dependent on duration of etching, 6,600 Å/min) as shown in FIG. 41.

Figure 42:
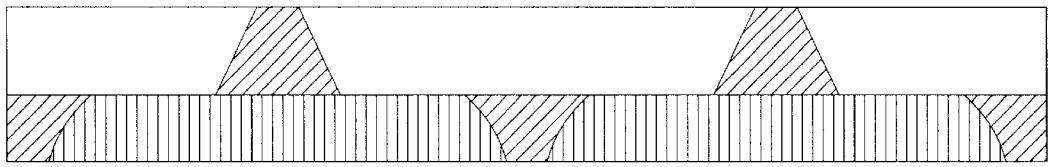
FIG. 42 illustrates a silicon wafer having a silicon nitride layer removed therefrom.

2.38 POROUS SILICON—PHOSPHORIC ACID ETCH—Remove nitride layer on S2 of the substrate by immersing in 85 wt % phosphoric acid at 160° C. (depth is dependent on duration of etching, 30 Å/min) as shown in FIG. 42.

2.39 POROUS SILICON—RINSE—Rinse off phosphoric acid etching solution with DI $H_2O$ three times.

2.40 CURRENT CONDUCTOR—BORON DOPING—Heat substrate to 950° C. under a flow of $N_2$ and $H_2$ for 4 hours to enable Boron diffusion from a Planar Diffusion Source (PDS).

2.41 CURRENT CONDUCTOR—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

2.42 CURRENT CONDUCTOR—SPUTTER ADHESION LAYER—Sputter a 500 Å thick layer of titanium-tungsten onto S1 of the substrate.

2.43 CURRENT CONDUCTOR—SPUTTER GOLD—Sputter a 200 Å thick layer of gold onto S1 of the substrate.

2.44 METHANOL BARRIER—NANOSTRIP IMMERSION—Remove organics adhered to surface of silicon by immersing in nanostrip solution for half an hour at room temperature.

2.45 METHANOL BARRIER—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

Figure 43:
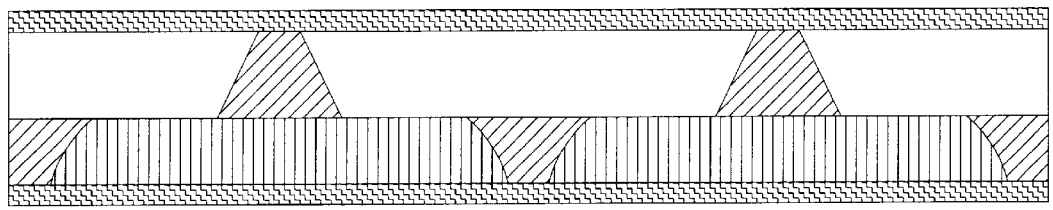
FIG. 43 illustrates an etched silicon wafer having a thin layer of hexamethyldilazane deposited thereon.

2.46 METHANOL BARRIER—PRIMER DEPOSITION—Primer Oven is used to deposit a thin layer of hexamethyldilazane to increase the photoresist adhesion on the silicon wafer surface (note that the Ti-W:Au current conductor is no longer shown for simplicity) as shown in FIG. 43.

Figure 44:
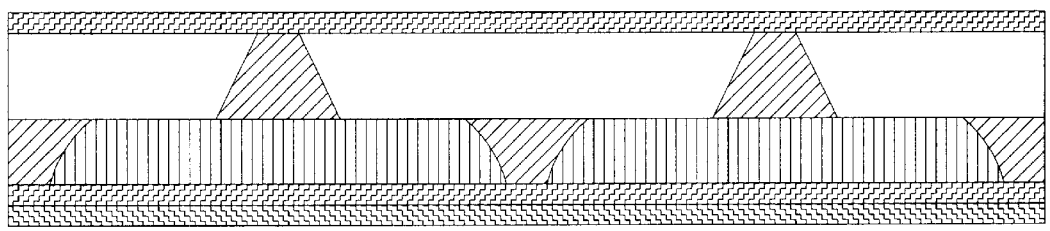
FIG. 44 illustrates an etched silicon wafer having a thin layer of hexamethyldilazane and photoresist deposited thereon.
Figure 44:
Figure 44:
Figure 44:
Figure 44:

2.47 METHANOL BARRIER—SPIN COAT RESIST—Deposit a thin layer of Shipley 1400–31 resist with a Spin Coater at 3,000 rpm for 30 seconds on S2 as shown in FIG. 44.

2.48 METHANOL BARRIER—POST BAKE RESIST—Place wafer on a hot plate at 145° C. for 45 seconds to harden the resist.

2.49 METHANOL BARRIER—PREPARE RESIST—Immerse sample in chlorobenzene solution for 10 minutes.

Figure 45:
FIG. 45 illustrates the transferring of a pattern onto a photoresist layer associated with a silicon wafer.
Figure 45:
Figure 45:
Figure 45:
Figure 45:
Figure 45:
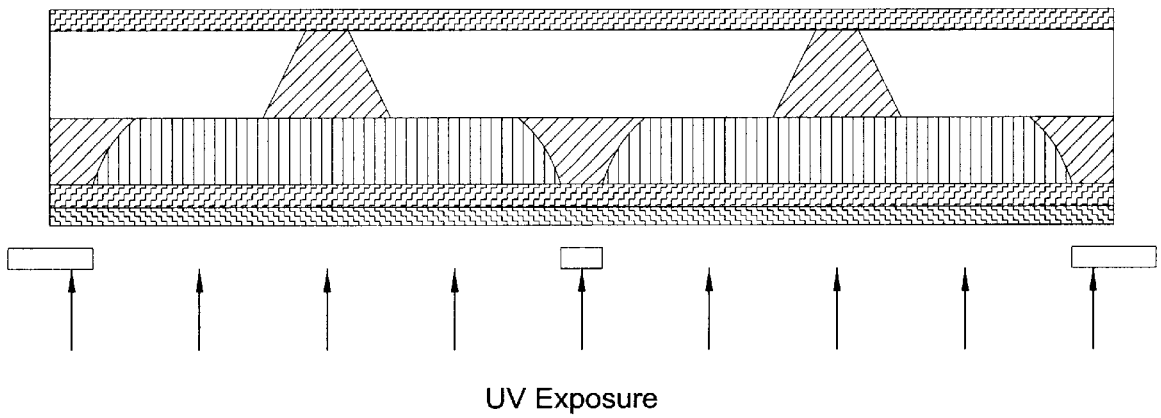

2.50 METHANOL BARRIER—UV EXPOSURE—Transfer pattern on mask onto the photoresist layer with an IR contact aligner under UV for 15 seconds as shown in FIG. 45.

Figure 46:
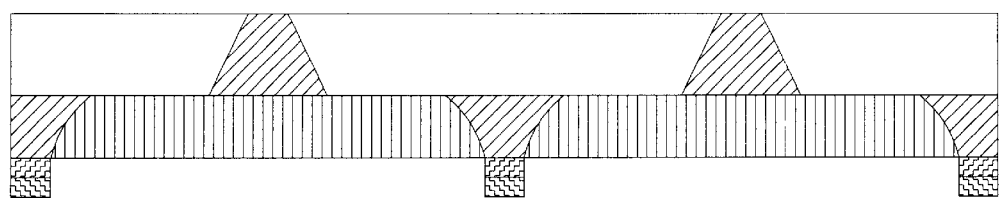
FIG. 46 illustrates a silicon wafer having a developed photoresist layer removed therefrom.

2.51 METHANOL BARRIER—DEVELOP PATTERN—Immerse sample in Microposit Developer Concentrate solution for 60 seconds to develop Pattern onto wafer as shown in FIG. 46.

2.52 METHANOL BARRIER—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

2.53 METHANOL BARRIER—POST BAKE RESIST—Place wafer on a hot plate at 145° C. for 45 seconds to harden the resist.

2.54 METHANOL BARRIER—SPUTTER DIFFUSION BARRIER—Deposit a layer of Ti/W alloy 100 Å thick onto S2 of the porous substrate using the MRC sputtersphere. The purpose of this layer is to promote adhesion and prevent reactions between the bulk diffusion layer and the substrate.

Figure 47:
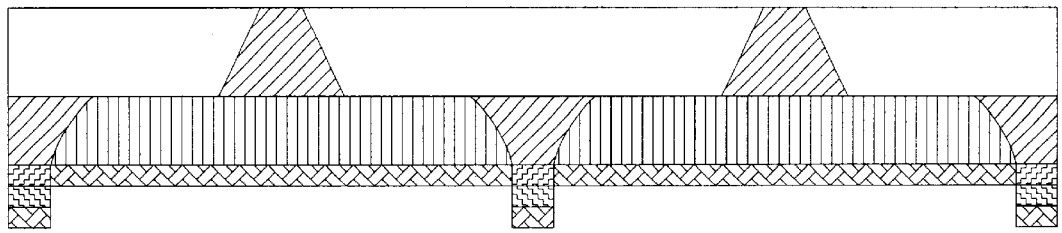
FIG. 47 illustrates a silicon wafer having a palladium layer deposited thereon, wherein the palladium layer defines a plurality of palladium plugs aligned in rows across the silicon wafer.

2.55 METHANOL BARRIER—EVAPORATE PALLADIUM LAYER—Deposit the bulk palladium (or vanadium) layer onto S2 of the porous substrate using the Temescal E-Beam evaporator as shown in FIG. 47. The thickness of the bulk diffusion layer should be twice that of the average porosity of the substrate in order to ensure that there are no pin-holes or other defects that would allow methanol to diffuse through the methanol blocker. Because of process limitations with respect to the Temescal e-beam evaporator, the metal will need to be deposited in 0.5 $\mu$m increments, after which vacuum will need to be broken, the metal source will need to be refilled and vacuum re-established. The deposition pressure is $3.0 \times 10^{-6}$ Torr and the deposition rate is 100 Å per minute.

Figure 48:
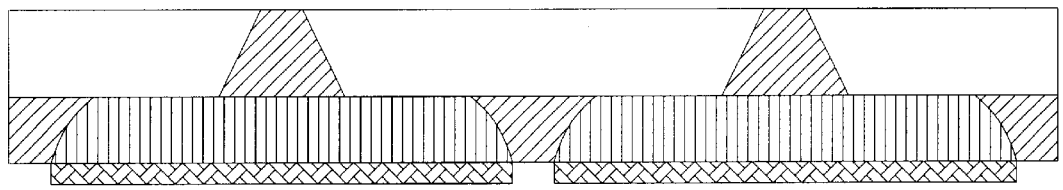
FIG. 48 illustrates a silicon wafer having a remaining layer of photoresist removed therefrom.

2.56 METHANOL BARRIER—RESIST STRIP—Remove the remaining photoresist by immersing in acetone (removal of strip with acetone is fast). Rinse in DI $H_2O$ solution for final cleaning at room temperature as shown in FIG. 48. Contacts will be approximately 1 mm×1 mm with wires approximately 500 $\mu$m.

2.57 METHANOL BARRIER—ANNEAL—Anneal the bulk diffusion layer covered porous substrate in an atmosphere of argon gas for 1 hour at 300° C.

2.58 METHANOL BARRIER—ELECTROCHEMICALLY CLEAN—Place the bulk diffusion layer covered porous substrate into the substrate cleaning bath. The bath is a solution of sulfuric acid with a pH of 1. Apply a potential to the substrate of between +0.8 and +1.6 V for one minute. This step is employed in order to remove any surface oxides or contaminates from the exposed surface of the bulk diffusion layer.

2.59 METHANOL BARRIER—ELECTROPLATE PALLADIUM—Place the bulk diffusion layer covered porous substrate into the palladium electroplating bath. Deposit a layer of palladium 0.5 $\mu$m thick from a palladium bath consisting of 10 g/L palladium (Pd Bath 450, Degussa AG, Schwabisch Gmund, West Germany) at a deposition rate of 0.26 $\mu$m/min at 0.5 to 2 $A/dm^2$. The plating bath should not exceed 35° C.

2.60 METHANOL BARRIER—ULTRASONICALLY CLEAN—Suspend the palladium electroplated bulk diffusion layer in a DI-H$_2$O rinse bath for 20 minutes and ultrasonically agitate.

2.61 METHANOL BARRIER—ELECTROPLATE PLATINUM—Place the bulk diffusion layer covered porous substrate into the platinum electroplating bath. Deposit a layer of platinum 0.5 μm thick from a platinum bath (Pt 5Q from Johnson Matthey) at pH of 10.6 and at 2 mA/cm$^2$ at 95° C.

2.62 METHANOL BARRIER—ULTRASONICALLY CLEAN—Place the palladium:platinum electroplated bulk diffusion layer into the DI-H$_2$O rinse bath for 20 minutes and ultrasonically agitate.

2.63 METHANOL BARRIER—ANNEAL—Anneal the bulk diffusion layer covered porous substrate in an atmosphere of argon gas for 1 hour at 300° C.

2.64 CATALYST—PRE-FURNACE—Heat the silicon substrate to 200° C. in air for 2 hours.

2.65 CATALYST—PLATINUM SOLUTION—After the silicon substrate has cooled to room temperature, place silicon wafer in an aqueous ammonia solution of tetraamineplatinum(II) hydroxide hydrate, [Pt(NH$_3$)$_4$](OH)$_2$-xH$_2$O, at pH 8.5 and stir for 10 hours. The solution will contain enough platinum complex to deposit a maximum of 2% weight platinum on silicon, i.e., a 100 mg wafer will be placed in a bath containing 2 mg of platinum (3.4 mg tetraamineplatinum(II) hydroxide hydrate).

2.66 CATALYST—DRY—Remove the silicon wafer from the aqueous ammonia solution and dry in vacuo for 1 hour.

2.67 CATALYST—POST FURNACE—Heat silicon substrate under a flow of oxygen/nitrogen (20:80) from RT to 400° C. at a rate of 2° C. per minute, approximately 3 hours, and then hold at 400° C. for 1 hour.

2.68 CATALYST—ACTIVATION—Heat the silicon wafer under flowing 1% H$_2$ in N$_2$. The temperature should be rapidly increased from room temperature to 400° C. at a rate of 25° C. per minute, approximately 15 minutes, and held at 400° C. for 4 hours.

Figure 49:
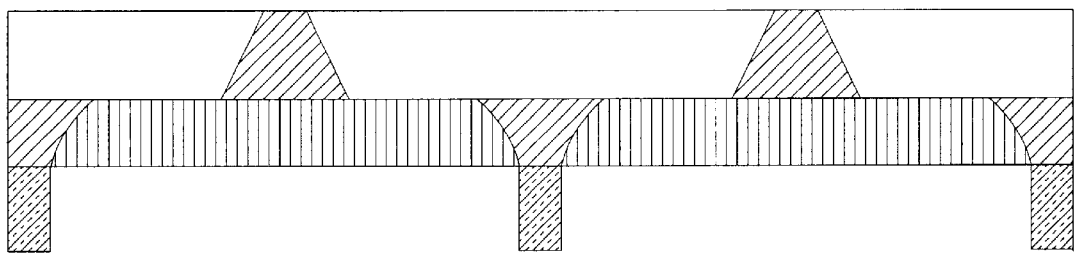
FIG. 49 illustrates a silicon wafer having wafer having a plurality of etched channels and a plurality of porous regions, and having a wafer bonding material applied thereon.
Figure 49:
Figure 49:
Figure 49:

MEA FABRICATION—The MEA fabrication or the anode/electrolyte/cathode assembly steps involves further processing the anode and cathode so as to form a membrane electrode assembly by (1) wafer bonding the anode and cathode together, and (2) depositing a solid polymer electrolyte between the anode and cathode as set forth below:

3.1 WAFER BONDING—GLASS DEPOSITION—Glass (Corning type 7740) paste screen printing, 25 microns wet condition, on S2 of the anode as shown in FIG. 49. The paste shall be dried off and binder is burned out in air at 300° C.

Figure 50:
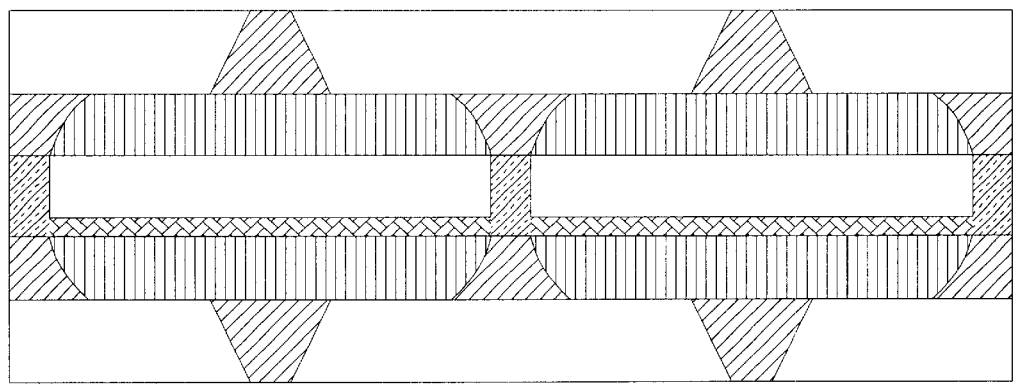
FIG. 50 illustrates an electrode assembly in accordance with an embodiment of the present invention.

3.2 WAFER BONDING—WAFER BOND—The two electrodes are aligned and pressed together gently. The assembly is heated to 300° C.–500° C. A constant pressure of 0.5–1 lb/cm$^2$ is applied to the assembly. The assembly is maintained at elevated temperature and pressure for at least 30 minutes. The assembly, as shown in FIG. 50, is cooled down slowly afterwards.

3.3 SOLID ELECTROLYTE POLYMER—CLEAN—Clean piece to be impregnated by soaking in semiconductor-grade isopropanol (or ethanol or methanol) for several hours. Rinse with same solvent.

3.4 SOLID ELECTROLYTE POLYMER—DRY—Dry porous structure by baking in vacuum oven at 200° C.–300° C. for several hours. Cool back to room temperature under vacuum.

3.5 SOLID ELECTROLYTE POLYMER—PRIME DEPOSITION—Primer Oven is used to deposit a thin layer of hexamethyldilazane to increase the Nafion adhesion on the silicon wafer surface.

Figure 51:
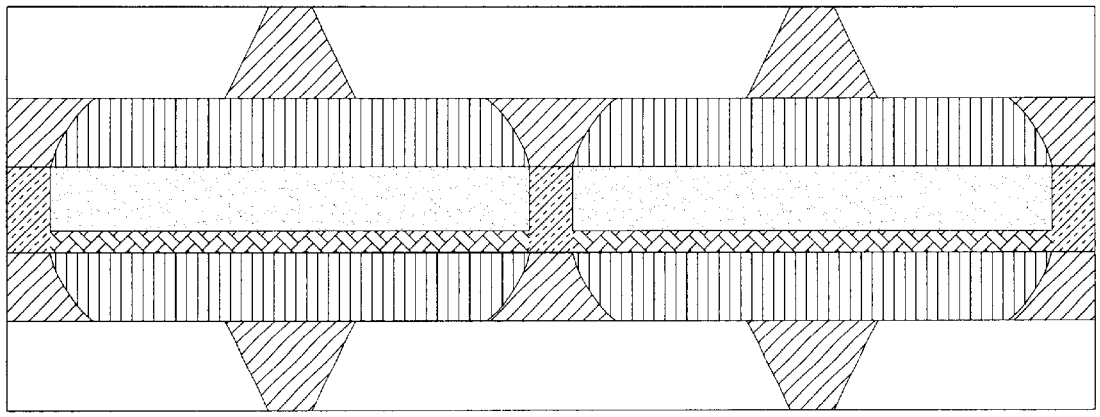
FIG. 51 illustrates an electrode assembly in accordance with an embodiment of the present invention.

3.6 SOLID ELECTROLYTE POLYMER—NAFION SOLUTION—Immerse piece immediately in commercially available Nafion solution, bubbles should rise from the surface indicating solution displacing air inside the pores. Leave uncovered until solution evaporates as shown in FIG. 51.

3.7 SOLID ELECTROLYTE POLYMER—CURE—To cure onto the surface and dry out any excess solvent, bake in vacuum oven at no higher than 130° C. for 1 hour.

EXAMPLE 2

SILICON SUBSTRATE ELECTRODE ASSEMBLY

This example discloses the processing steps associated with making an membrane electrode assembly adapted for use with a fuel cell, wherein the membrane electrode assembly comprises: a planar anode made from a silicon substrate; an electrolyte layer; a planar cathode made from a silicon substrate; and optionally a blocking layer that is substantially impermeable to at least methanol and is substantially permeable to protons; wherein the planar anode and the planar cathode are spaced apart and substantially parallel to each other so as to define a spaced apart region, wherein the electrolyte layer and optional blocking layer are interposed between the planar anode and the planar cathode and within at least a portion of the spaced apart region.

In this example, the processing steps consist essentially of (1) the anode fabrication steps, (2) the cathode fabrication steps, and (3) the anode/electrolyte/cathode fabrication steps. However, the anode and cathode fabrication steps in this example are identical to the anode and cathode fabrication steps of Example 1; therefore, these steps are not repeated here. Rather, the difference in this example (and resulting electrode assembly structure) reside in the MEA fabrication or the anode/electrolyte/cathode assembly steps. Accordingly, only the further processing steps with the MEA fabrication are set forth below, with reference to FIGS. 52 to 54:

3.1 SOLID ELECTROLYTE POLYMER—CLEAN—Clean both the anode and cathode to be impregnated by soaking in semiconductor-grade isopropanol (or ethanol or methanol) for several hours. Rinse with same solvent.

3.2 SOLID ELECTROLYTE POLYMER—DRY—Dry porous structure by baking in vacuum oven at 200° C.–300° C. for several hours. Cool back to room temperature under vacuum.

3.3 SOLID ELECTROLYTE POLYMER—PRIME DEPOSITION—Primer Oven is used to deposit a thin layer of hexamethyldisiloxane to increase the Nafion adhesion on the silicon wafer surface.

3.4 SOLID ELECTROLYTE POLYMER—NAFION SOLUTION—Immerse piece immediately in commercially available Nafion solution, bubbles should rise from the surface indicating solution displacing air inside the pores. Leave uncovered until solution evaporates.

3.5 SOLID ELECTROLYTE POLYMER—CURE—To cure onto the surface and dry out any excess solvent, bake in vacuum oven at no higher than 130° C. for 1 hour.

Figure 52:
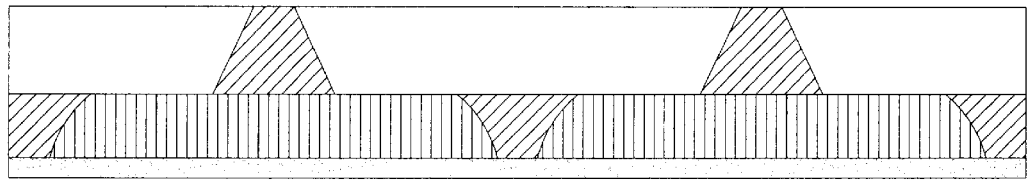
FIG. 52 illustrates a silicon wafer having a plurality of etched channels and a plurality of porous regions, and having a solid electrolyte coating applied thereon.
Figure 53:
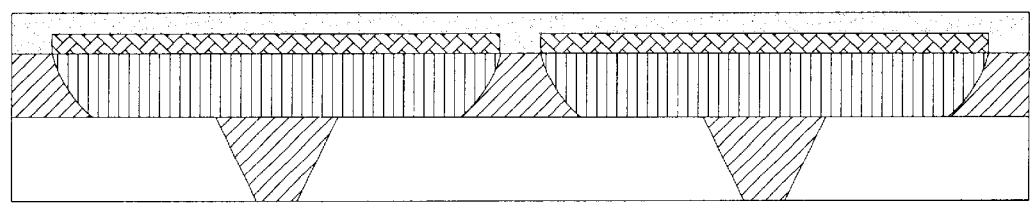
FIG. 53 illustrates a silicon wafer having a plurality of etched channels and a plurality of porous regions together a palladium blocking layer, and having a solid electrolyte coating applied thereon.

3.6 SOLID ELECTROLYTE POLYMER—NAFION SOLUTION—Spin coat 3 ml of Nafion 117 solution at 900 rpm for 30 seconds onto S2 of both electrodes, as shown in FIGS. 52 and 53, respectively.

Figure 54:
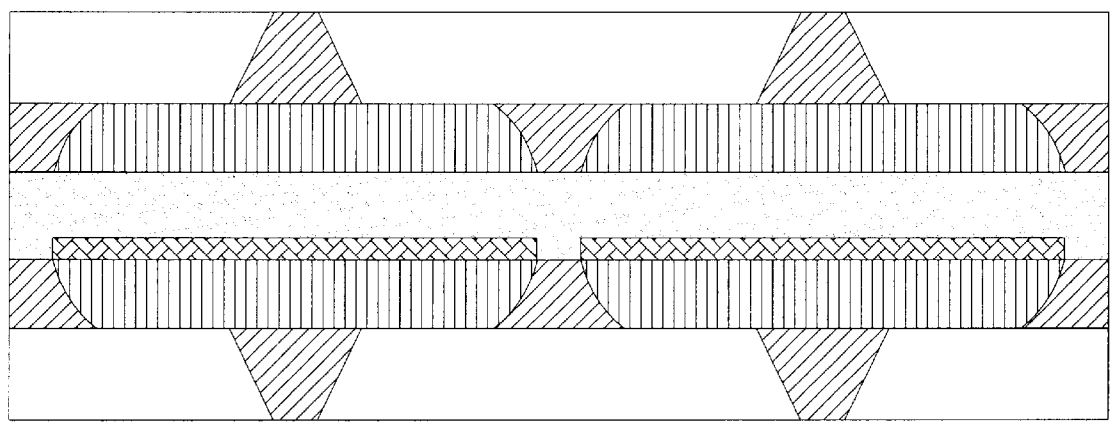
FIG. 54 illustrates an electrode assembly in accordance with an embodiment of the present invention.

3.7 SOLID ELECTROLYTE POLYMER—DRY—Dry the spin-coated Nafion coatings on both electrodes in ambient air for 10 minutes. 3.8 SOLID ELECTROLYTE POLYMER—NAFION MEMBRANE—Align a 50 μm thick Nafion 117 Proton Exchange Membrane in between the two electrodes and place the assembly into a hot press. Raise the temperature of the hot press to 90° C. and hold for 30 minutes, then increase the temperature to 130° C. Apply 0.2 MPa of pressure when the hot press reaches 130° C. and hold for 5 minutes. Release the pressure after the hot press is cooled to room temperature as shown in FIG. 54.

EXAMPLE 3

SOL-GEL SUPPORT STRUCTURE ELECTRODE ASSEMBLY WITH SPANNING BRIDGE MEMBERS

This example discloses an electrode assembly adapted for use with a fuel cell, wherein the membrane electrode assembly comprises: a planar anode made from a sol-gel derived support structure; an electrolyte layer; a planar cathode made from a sol-gel derived support structure; and optionally a blocking layer that is substantially impermeable to at least methanol and is substantially permeable to protons; wherein the planar anode and the planar cathode are spaced apart and substantially parallel to each other so as to define a spaced apart region, wherein the electrolyte layer and optional blocking layer are interposed between the planar anode and the planar cathode and within at least a portion of the spaced apart region, and wherein the planar anode and the planar cathode are attached to each other by at least one bridge member that spans across the spaced apart region.

In this example, the processing steps consist essentially of (1) the anode fabrication steps, (2) the cathode fabrication steps, and (3) the anode/electrolyte/cathode fabrication steps as set forth below and with reference to FIGS. 15 to 23 (of Example 1) and 55 to 75.

ANODE FABRICATION—The anode fabrication steps involve processing a silicon wafer so as to form (1) a plurality of channels, (2) a plurality of sol-gel derived support structures, (3) an enhanced current conductor, and (4) a chemisorbed catalyst as set forth below:

1.1 CHANNEL—BASE MATERIAL—Start with a 500 μm double sided polished silicon wafer (Note that the top side will be referred to as S1 and that the bottom side will be referred to as S2 in the rest of section 1.0) as shown in FIG. 15 of Example 1.

1.2 CHANNEL—NANOSTRIP IMMERSION—Remove organics adhered to surface of silicon by immersing in Nanostrip Solution for half an hour at room temperature.

1.3 CHANNEL—RINSE—Rinse off Nanostrip solution with DI $H_2O$ three times.

1.4 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

1.5 CHANNEL—SILICON NITRIDE DEPOSITION—Deposit a 1000 Å layer of silicon nitride via CVD on both sides of the silicon wafer as shown in FIG. 16 of Example 1.

1.6 CHANNEL—NANOSTRIP IMMERSION—Remove organics adhered to surface of silicon by immersing in Nanostrip Solution for half an hour at room temperature.

1.7 CHANNEL—RINSE—Rinse off Nanostrip solution with DI $H_2O$ three times.

1.8 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

1.9 CHANNEL—PRIMER DEPOSITION—Primer Oven is used to deposit a thin layer of hexamethyldilazane to increase the photo resist adhesion on the silicon wafer surface as shown in FIG. 17 of Example 1.

1.10 CHANNEL—SPIN COAT RESIST—Deposit a thin layer of Photo Resist (which acts as a mask so that patterns can be introduced on the nitride layer for selective nitride etching) with a Spin Coater at 3,000 rpm for 30 seconds on S2 of the wafer as shown in FIG. 18 of Example 1.

1.11 CHANNEL—POST BAKE RESIST—Place wafer on a hot plate at 145° C. for 45 seconds to harden the Resist on S2.

1.12 CHANNEL—SPIN COAT RESIST—Deposit a thin layer of Photo Resist (which acts as a mask so that patterns can be introduced on the nitride for selective nitride etching) with a Spin Coater at 3,000 rpm for 30 seconds on the other side of the wafer, S1, as shown in FIG. 19 of Example 1.

1.13 CHANNEL—PRE-BAKE RESIST—Place wafer on a hot plate at 90° C. for 45 seconds to semi-harden photo-resist on S1 for UV exposure preparation.

1.14 CHANNEL—UV EXPOSURE—Transfer pattern on mask onto the photo-resist layer with an IR contact aligner under UV for 15 seconds on S1 as shown in FIG. 20 of Example 1.

1.15 CHANNEL—DEVELOP PATTERN—Immerse sample in 1:5 AZ312 MIF:DI $H_2O$ solution for 60 seconds to develop Pattern onto Wafer as shown in FIG. 21 of Example 1.

1.16 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

1.17 CHANNEL—POST BAKE RESIST—Place wafer on a hot plate at 145° C. for 45 seconds to harden the Resist on S1.

1.18 CHANNEL—PHOSPHORIC ACID ETCH—Selectively remove nitride layer on S1 by immersing in 85 wt % Phosphoric Acid at 160° C. (depth is dependent on duration of etching, 30 Å/min) as shown in FIG. 22 of Example 1.

1.19 CHANNEL—RINSE—Rinse off Phosphoric Acid etching solution with DI $H_2O$ three times.

1.20 CHANNEL—RESIST STRIP—Remove the remaining photo-resist by immersing in acetone (removal of strip with acetone is fast). Rinse in Nanostrip solution for final cleaning at room temperature as shown in FIG. 23 of Example 1.

1.21 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

Figure 55:
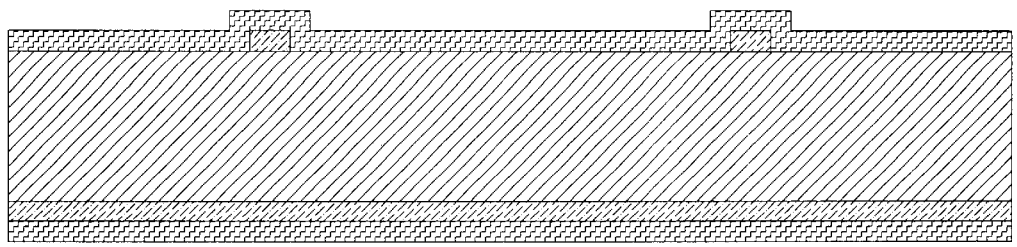
FIG. 55 illustrates a silicon wafer having a 1,000 Å layer of silicon nitride and a thin layer of hexamethyldilazane deposited on one side and selectively deposited on the other side.

1.22 CHANNEL—PRIMER DEPOSITION—Primer Oven is used to deposit a thin layer of hexamethyldilazane to increase the photo resist adhesion on the silicon wafer surface as shown in FIG. 55.

Figure 56:
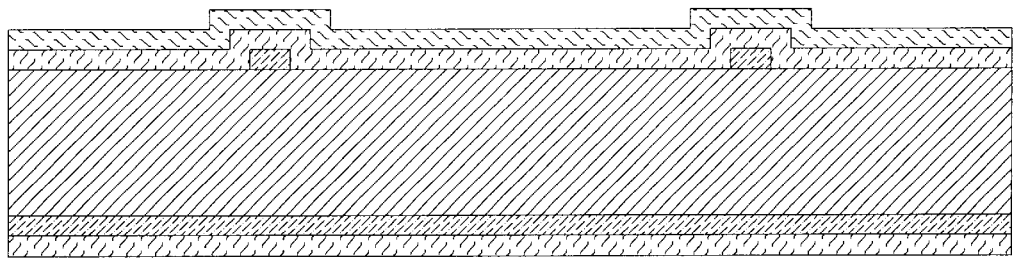
FIG. 56 illustrates a silicon wafer having a thin photoresist layer applied thereon.

1.23 CHANNEL—SPIN COAT RESIST—Deposit a thin layer of Photo Resist (which acts as a mask so that patterns can be introduced on the nitride layer for selective nitride etching) with a Spin Coater at 3,000 rpm for 30 seconds on S1 of the wafer as shown in FIG. 56.

1.24 CHANNEL—POST BAKE RESIST—Place wafer on a hot plate at 145° C. for 45 seconds to harden the Resist on S1.

Figure 57:
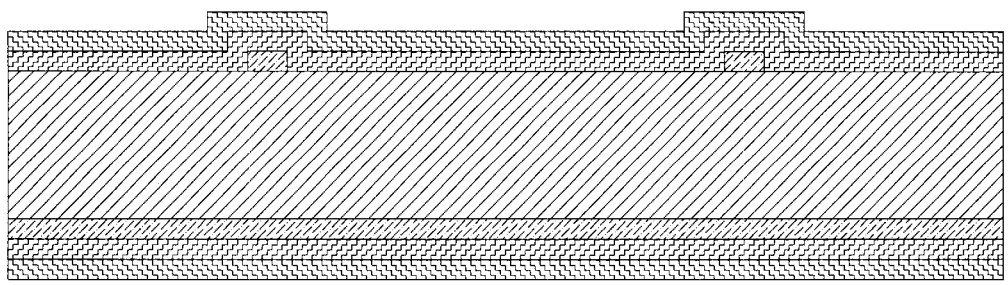
FIG. 57 illustrates a silicon wafer having a thin photoresist layer applied thereon.

1.25 CHANNEL—SPIN COAT RESIST—Deposit a thin layer of Photo Resist (which acts as a mask so that patterns can be introduced on the nitride for selective nitride etching) with a Spin Coater at 3,000 rpm for 30 seconds on the other side of the wafer, S2, as shown in FIG. 57.

1.26 CHANNEL—PRE-BAKE RESIST—Place wafer on a hot plate at 90° C. for 45 seconds to semi-harden photoresist on S2 for UV exposure preparation.

Figure 58:
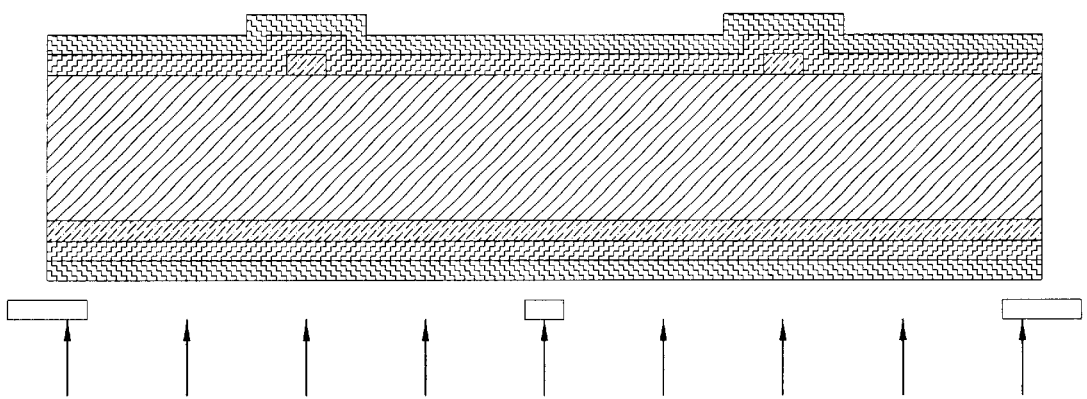
FIG. 58 illustrates a silicon wafer having a thin photoresist layer applied thereon.

1.27 CHANNEL—UV EXPOSURE—Transfer pattern on mask onto the photo-resist layer with an IR contact aligner under UV for 15 seconds on S2 as shown in FIG. 58.

Figure 59:
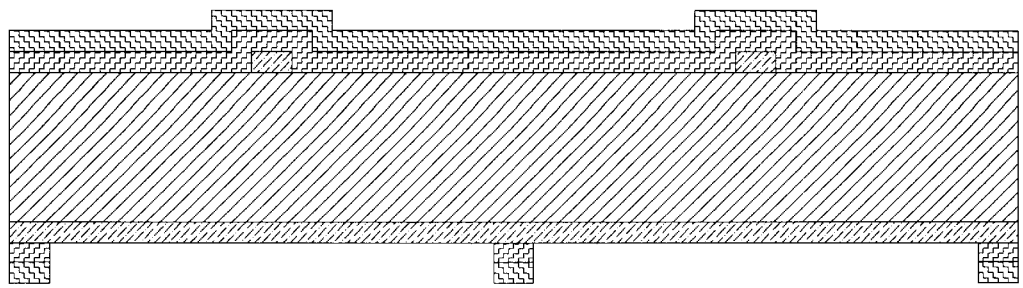
FIG. 59 illustrates a silicon wafer having a developed photoresist layer removed therefrom.

1.28 CHANNEL—DEVELOP PATTERN—Immerse sample in 1:5 AZ312 MIF:DI $H_2O$ solution for 60 seconds to develop Pattern onto wafer as shown in FIG. 59.

Figure 60:
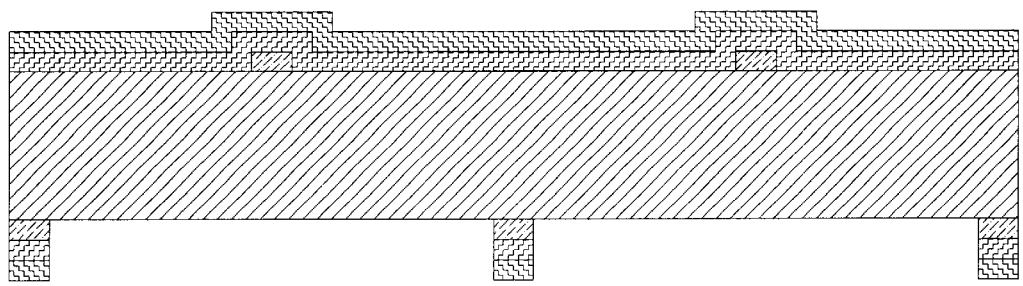
FIG. 60 illustrates a silicon wafer having a nitride layer removed therefrom.

1.29 CHANNEL—PHOSPHORIC ACID ETCH—Selectively remove nitride layer on S2 by immersing in 85 wt % phosphoric acid at 160° C. (depth is dependent on duration of etching, 30 Å/min) as shown in FIG. 60.

1.30 CHANNEL—RINSE—Rinse off phosphoric acid etching solution with DI $H_2O$ three times.

Figure 61:
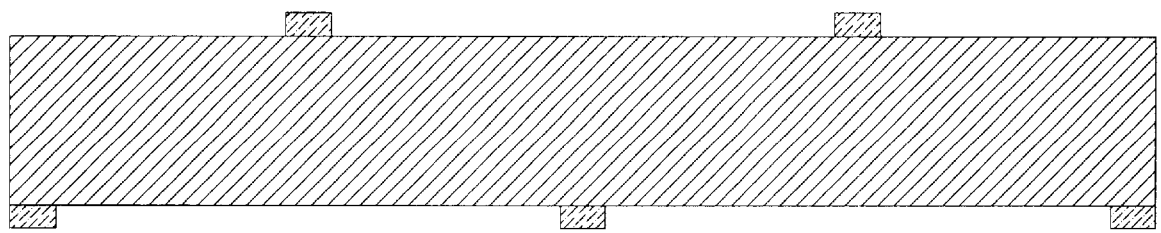
FIG. 61 illustrates a silicon wafer having a remaining layer of photoresist removed therefrom.

1.31 CHANNEL—RESIST STRIP—Remove the remaining photo-resist by immersing in acetone (removal of strip with acetone is fast). Rinse in Nanostrip solution for final cleaning at room temperature as shown in FIG. 61.

Figure 62:
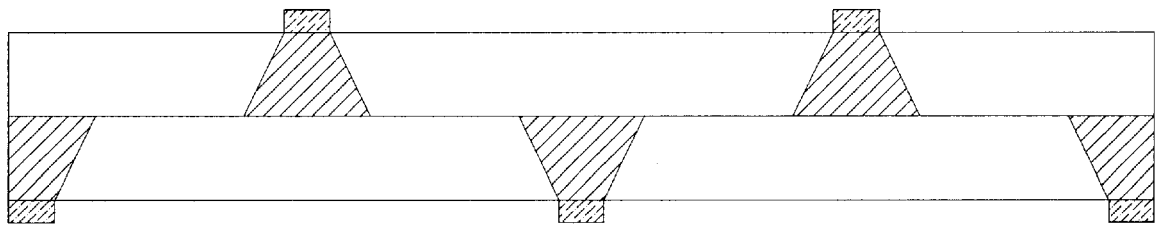
FIG. 62 illustrates a silicon wafer that has been selectively etched to form a plurality of channels.

1.32 CHANNEL—KOH ETCH—The pattern from the photo-resist is transferred onto S1 and S2 of the silicon substrate simultaneously by immersing in 30 wt % KOH solution at 80° C. (depth is dependent on duration of etching, 1.65–1.75 $\mu$m/min) as shown in FIG. 62.

1.33 CHANNEL—RINSE—Rinse off KOH etching solution with DI $H_2O$ three times.

Figure 63:
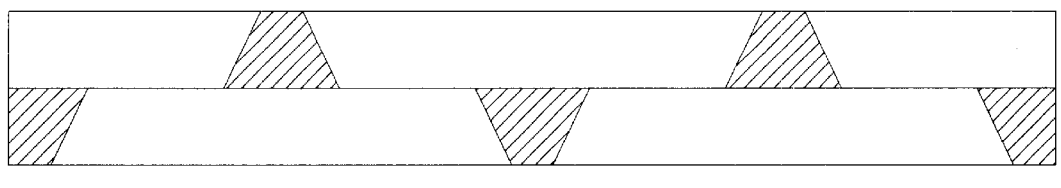
FIG. 63 illustrates a silicon wafer having a remaining nitride layer removed therefrom.
Figure 63:
Figure 63:

1.34 CHANNEL—PHOSPHORIC ACID ETCH—Remove all of the remaining nitride layer on both sides of the silicon substrate by immersing in 85 wt % Phosphoric Acid at 160° C. (depth is dependent on duration of etching, 30 Å/min) as shown in FIG. 63.

1.35 CHANNEL—RINSE—Rinse off Phosphoric Acid etching solution with DI $H_2O$ three times.

1.36 PT-RUO$_2$ SOL-GEL STRUCTURE—NANOSTRIP IMMERSION—Remove organics adhered to surface of silicon by immersing in Nanostrip Solution for half an hour at room temperature.

1.37 PT-RUO$_2$ SOL-GEL STRUCTURE—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

1.38 PT-RUO$_2$ SOL-GEL STRUCTURE—INTRODUCTION OF HYDROXYL GROUPS—The substrate is then placed in a solution of 15 ml 30 vol % $H_2O_2$ and 35 ml $H_2SO_4$ at 90° C. for 30 min, then rinse and dry.

Figure 64:
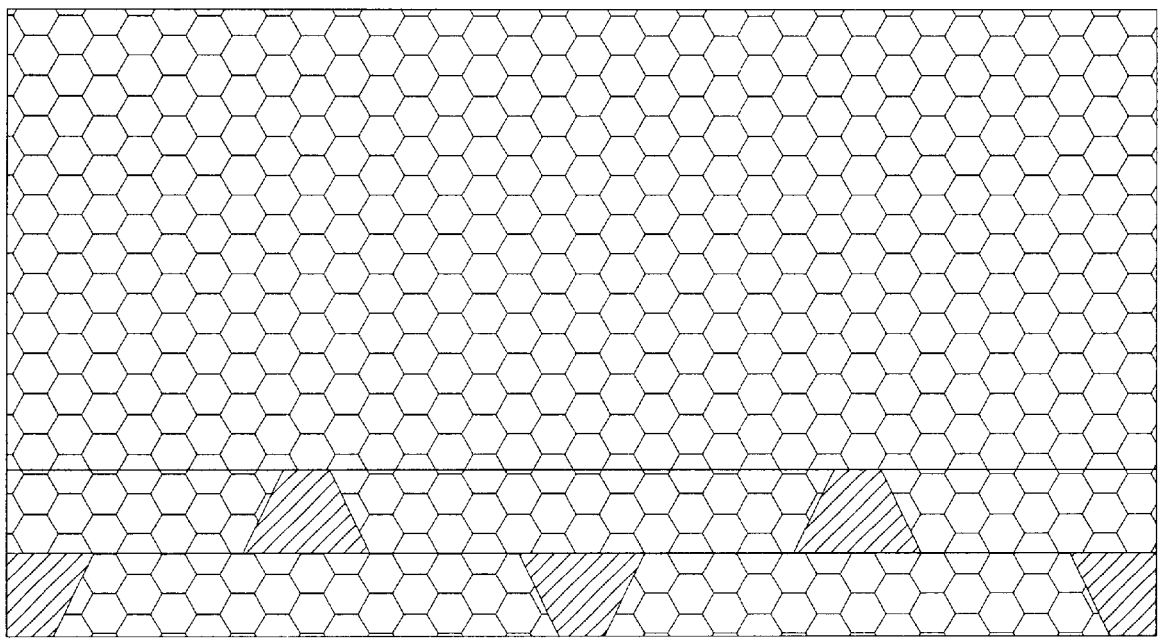
FIG. 64 illustrates a silicon wafer having a plurality of etched and having a sol-gel derived support structure cast into the plurality of etched channels.
Figure 64:
Figure 64:
Figure 64:

1.39 PT-RUO$_2$ SOL-GEL STRUCTURE—SOL CASTING—Place the substrate into a Teflon container and cast the polymeric sol into the etched trenches/channels/pits of the silicon substrate by pouring the sol to completely cover the top of the substrate [the Platinum-Ruthenium oxide precursor solution is prepared by mixing hexachloroplatinic acid ($H_2PtCl_6xH_2O$), Ruthenium nitrosyl nitrate (Ru(NO)(NO$_3$)$_x$(OH)$_{3-x}$) with ethyl alcohol ($C_2H_5OH$), and DI water. The solution will be under vigorous stirring at 60° C. for 1 hr. to yield a nominal molar ratio of 1:0.5:5:1 of OH$_2$PtCl$_6$xH$_2$O:Ru(NO)(NO$_3$)$_x$(OH)$_{3-x}$:C$_2$H$_5$OH:H$_2$O] as shown in FIG. 64.

1.40 PT-RUO$_2$ SOL-GEL STRUCTURE—GELATION—Place the cast sol in a closed container for 24 hrs.

Figure 65:
FIG. 65 illustrates evaporation of a solvent associated with a silicon wafer having a plurality of etched and having a sol-gel derived support structure cast into the plurality of etched channels.
Figure 65:
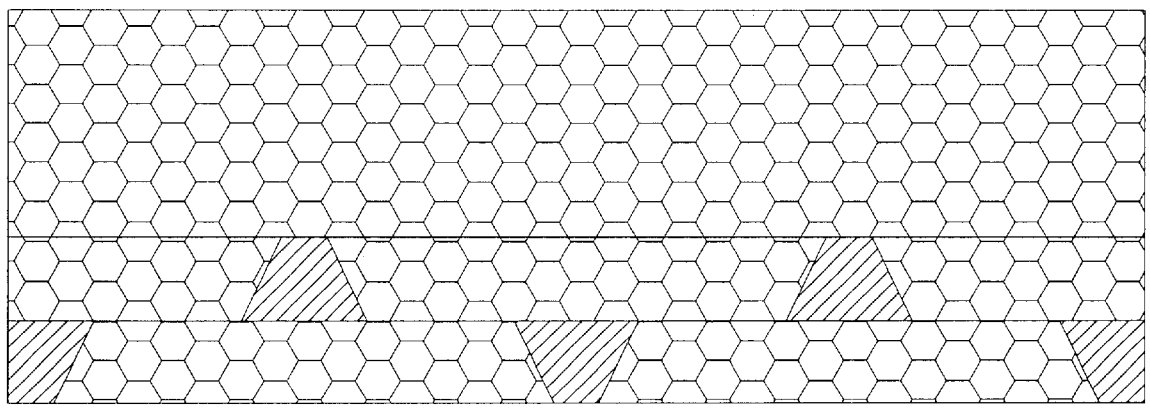

1.41 PT-RUO$_2$ SOL-GEL STRUCTURE—Gel Drying—Dry the resultant gels in ambient air at 70° C. for 24 hrs as shown in FIG. 65.

1.42 PT-RUO$_2$ SOL-GEL STRUCTURE—GEL DRYING—Dry the resultant gels under vacuum at 150° C. for 12 hrs.

Figure 66:
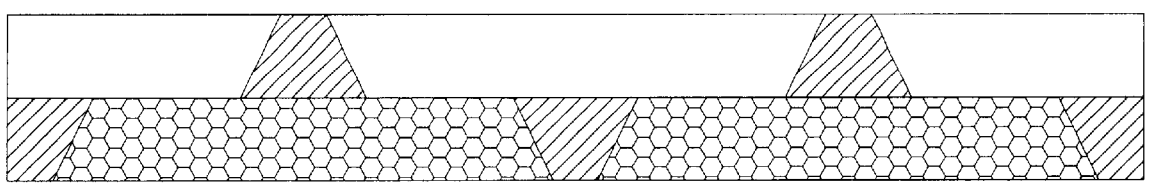
FIG. 66 illustrates a silicon wafer having a plurality of etched channels and a plurality of regions that have a sol-gel derived support structure.

1.43 PT-RUO$_2$ SOL-GEL STRUCTURE—PYROLYSIS—Heat the resultant structures under a flow of oxygen/nitrogen (20:80) from room temperature to 500° C. at 5° C./min with a dwell time of 2 hrs as shown in FIG. 66.

1.44 PT-RUO$_2$ SOL-GEL STRUCTURE—PLATINUM REDUCTION—Heat the resultant structures under flowing hydrogen. The temperature should be rapidly increased from RT to 400° C. at 10° C./min, and held at 400° C. for 4 hours.

1.45 CURRENT CONDUCTOR—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

1.46 CURRENT CONDUCTOR—SPUTTER ADHESION LAYER—Sputter a 500 Å thick layer of titanium-tungsten onto S1 of the substrate.

1.47 CURRENT CONDUCTOR—SPUTTER GOLD—Sputter a 200 Å thick layer of gold onto S1 of the substrate.

1.48 CATALYST—ACTIVATION—Heat the silicon wafer under flowing hydrogen. The temperature should be rapidly increased from room temperature to 400° C. at a rate of 25° C. per minute, approximately 15 minutes, and held at 400° C. for 4 hours.

CATHODE FABRICATION—The cathode fabrication steps involve processing a silicon wafer so as to form (1) a plurality of channels, (2) a plurality of sol-gel derived support structures, (3) an enhanced current conductor, (4) a methanol barrier layer, and (5) a chemisorbed catalyst as set forth below:

2.1 CHANNEL—BASE MATERIAL—Start with a 500 $\mu$m double sided polished silicon wafer as shown in FIG. 15 of Example 1 (Note that the top side will be referred to as S1 and that the bottom side will be referred to as S2 in the rest of section 1.0).

2.2 CHANNEL—NANOSTRIP IMMERSION—Remove organics adhered to surface of silicon by immersing in Nanostrip Solution for half an hour at room temperature.

2.3 CHANNEL—RINSE—Rinse off Nanostrip solution with DI $H_2O$ three times.

2.4 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

2.5 CHANNEL—SILICON NITRIDE DEPOSITION—Deposit a 1000 Å layer of silicon nitride via CVD on both sides of the silicon wafer as shown in FIG. 16 of Example 1.

2.6 CHANNEL—NANOSTRIP IMMERSION—Remove organics adhered to surface of silicon by immersing in Nanostrip Solution for half an hour at RT. Rinse off Nanostrip solution with DI $H_2O$ three times.

2.7 CHANNEL—RINSE—Rinse off Nanostrip solution with DI $H_2O$ three times.

2.8 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

2.9 CHANNEL—PRIMER DEPOSITION—Primer Oven is used to deposit a thin layer of hexamethyldilazane to increase the photo resist adhesion on the silicon wafer surface as shown in FIG. 17 of Example 1.

2.10 CHANNEL—SPIN COAT RESIST—Deposit a thin layer of Photo Resist (which acts as a mask so that patterns can be introduced on the nitride layer for selective nitride etching) with a Spin Coater at 3,000 rpm for 30 seconds on S2 of the wafer as shown in FIG. 18 of Example 1.

2.11 CHANNEL—POST BAKE RESIST—Place wafer on a hot plate at 145° C. for 45 seconds to harden the resist on S2.

2.12 CHANNEL—SPIN COAT RESIST—Deposit a thin layer of Photo Resist (which acts as a mask so that patterns can be introduced on the nitride for selective nitride etching) with a Spin Coater at 3,000 rpm for 30 seconds on the other side of the wafer, S1, as shown in FIG. 19 of Example 1.

2.13 CHANNEL—PRE-BAKE RESIST—Place wafer on a hot plate at 90° C. for 45 seconds to semi-harden photo-resist on S1 for UV exposure preparation.

2.14 CHANNEL—UV EXPOSURE—Transfer pattern on mask onto the photo-resist layer with an IR contact aligner under UV for 15 seconds on S1 as shown in FIG. 20 of Example 1.

2.15 CHANNEL—DEVELOP PATTERN—Immerse sample in 1:5 AZ312 MIF:DI $H_2O$ solution for 60 seconds to develop Pattern onto wafer as shown in FIG. 21 of Example 1.

2.16 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

2.17 CHANNEL—POST BAKE RESIST—Place wafer on a hot plate at 145° C. for 45 seconds to harden the resist.

2.18 CHANNEL—PHOSPHORIC ACID ETCH—Selectively remove nitride layer on S1 by immersing in 85 wt % Phosphoric Acid at 160° C. (depth is dependent on duration of etching, 30 Å/min) as shown in FIG. 22 of Example 1.

2.19 CHANNEL—RINSE—Rinse off Phosphoric Acid etching solution with DI $H_2O$ three times.

2.20 CHANNEL—RESIST STRIP—Remove the remaining photo-resist by immersing in acetone (removal of strip with acetone is fast). Rinse in Nanostrip solution for final cleaning at room temperature as shown in FIG. 23 of Example 1.

2.21 CHANNEL—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

2.22 CHANNEL—PRIMER DEPOSITION—Primer Oven is used to deposit a thin layer of hexamethyldilazane to increase the photo resist adhesion on the silicon wafer surface as shown in FIG. 55.

2.23 CHANNEL—SPIN COAT RESIST—Deposit a thin layer of Photo Resist (which acts as a mask so that patterns can be introduced on the nitride layer for selective nitride etching) with a Spin Coater at 3,000 rpm for 30 seconds on S1 of the wafer as shown in FIG. 56.

2.24 CHANNEL—POST BAKE RESIST—Place wafer on a hot plate at 145° C. for 45 seconds to harden the Resist on S1.

2.25 CHANNEL—SPIN COAT RESIST—Deposit a thin layer of Photo Resist (which acts as a mask so that patterns can be introduced on the nitride for selective nitride etching) with a Spin Coater at 3,000 rpm for 30 seconds on the other side of the wafer, S2, as shown in FIG. 57.

2.26 CHANNEL—PRE-BAKE RESIST—Place wafer on a hot plate at 90° C. for 45 seconds to semi-harden photo-resist on S2 for UV exposure preparation.

2.27 CHANNEL—UV EXPOSURE—Transfer pattern on mask onto the photo-resist layer with an IR contact aligner under UV for 15 seconds on S2 as shown in FIG. 58.

2.28 CHANNEL—DEVELOP PATTERN—Immerse sample in 1:5 AZ312 MIF:DI $H_2O$ solution for 60 seconds to develop pattern onto wafer as shown in FIG. 59.

2.29 CHANNEL—PHOSPHORIC ACID ETCH—Selectively remove nitride layer on S2 by immersing in 85 wt % Phosphoric Acid at 160° C. (depth is dependent on duration of etching, 30 Å/min) as shown in FIG. 60.

2.30 CHANNEL—RINSE—Rinse off phosphoric acid etching solution with DI $H_2O$ three times.

2.31 CHANNEL—RESIST STRIP—Remove the remaining photo-resist by immersing in acetone (removal of strip with acetone is fast). Rinse in Nanostrip solution for final cleaning at room temperature as shown in FIG. 61.

2.32 CHANNEL—KOH ETCH—The pattern from the photo-resist is transferred onto S1 and S2 of the silicon substrate simultaneously by immersing in 30 wt % KOH solution at 80° C. (depth is dependent on duration of etching, 1.65–1.75 µm/min) as shown in FIG. 62.

2.33 CHANNEL—RINSE—Rinse off KOH etching solution with DI $H_2O$ three times.

2.34 CHANNEL—PHOSPHORIC ACID ETCH—Remove all of the remaining nitride layer on both sides of the silicon substrate by immersing in 85 wt % Phosphoric Acid at 160° C. (depth is dependent on duration of etching, 30 Å/min) as shown in FIG. 63.

2.35 CHANNEL—RINSE—Rinse off Phosphoric Acid etching solution with DI $H_2O$ three times.

2.36 PT-$RUO_2$ SOL-GEL STRUCTURE—NANOSTRIP IMMERSION—Remove organics adhered to surface of silicon by immersing in Nanostrip Solution for half an hour at room temperature.

2.37 PT-$RUO_2$ SOL-GEL STRUCTURE—RINSE AND DRY—Use a Verteq Spin/Dryer to (1) clean substrate by rinsing with DI $H_2O$ at 300 rpm for 5 minutes; then (2) dry with $N_2$ at 900 rpm for 10 minutes.

2.38 PT-$RUO_2$ SOL-GEL STRUCTURE—INTRODUCTION OF HYDROXYL GROUPS—The substrate is then placed in a solution of 15 ml 30 vol % $H_2O_2$ and 35 ml $H_2SO_4$ at 90° C. for 30 min, then rinse and dry.

2.39 PT-$RUO_2$ SOL-GEL STRUCTURE—SOL CASTING—Place the substrate into a Teflon container and cast the polymeric sol into the etched trenches/channels/pits of the silicon substrate by pouring the sol to completely cover the top of the substrate [the Platinum-Ruthenium oxide precursor solution is prepared by mixing hexachloroplatinic acid ($H_2PtCl_6 xH_2O$), Ruthenium nitrosyl nitrate (RU$(NO)(NO_3)_x(OH)_{3-x}$) with ethyl alcohol ($C_2H_5OH$), and DI water. The solution will be under vigorous stirring at 60° C. for 1 hr. to yield a nominal molar ratio of 1:0.5:5:1 of $OH_2PtCl_6 xH_2O:Ru(NO)(NO_3)_x(OH)_{3-x}:C_2H_5OH:H_2O$] as shown in FIG. 64.

2.40 PT-$RUO_2$ SOL-GEL STRUCTURE—GELATION—Place the cast sol in a closed container for 24 hrs.

2.41 PT-$RUO_2$ SOL-GEL STRUCTURE—GEL DRYING—Dry the resultant gels in ambient air at 70° C. for 24 hrs as shown in FIG. 65.

2.42 PT-RUO$_2$ SOL-GEL STRUCTURE—GEL DRYING—Dry the resultant gels under vacuum at 150° C. for 12 hrs.

2.43 PT-RUO$_2$ SOL-GEL STRUCTURE—PYROLYSIS—Heat the resultant structures under a flow of oxygen/nitrogen (20:80) from RT to 500° C. at 5° C./min with a dwell time of 2 hrs as shown in FIG. 66.

2.44 PT-RUO$_2$ SOL-GEL STRUCTURE—PLATINUM REDUCTION—Heat the resultant structures under flowing hydrogen. The temperature should be rapidly increased from RT to 400° C. at 10° C./min, and held at 400° C. for 4 hrs.

2.45 CURRENT CONDUCTOR—RINSE AND DRY—Use a Verteq Spin/Dryer to (1) clean substrate by rinsing with DI H$_2$O at 300 rpm for 5 minutes; then (2) dry with N$_2$ at 900 rpm for 10 minutes.

2.46 CURRENT CONDUCTOR—SPUTTER ADHESION LAYER—Sputter a 500 Å thick layer of titanium-tungsten onto S1 of the substrate.

2.47 CURRENT CONDUCTOR—SPUTTER GOLD—Sputter a 200 Å thick layer of gold onto S1 of the substrate.

2.48 METHANOL BARRIER—NANOSTRIP IMMERSION—Remove organics adhered to surface of substrate by immersing in Nanostrip Solution.

2.49 METHANOL BARRIER—RINSE AND DRY—Use a Verteq Spin/Dryer to (1) clean substrate by rinsing with DI H$_2$O at 300 rpm for 5 minutes; then (2) dry with N$_2$ at 900 rpm for 10 minutes.

Figure 67:
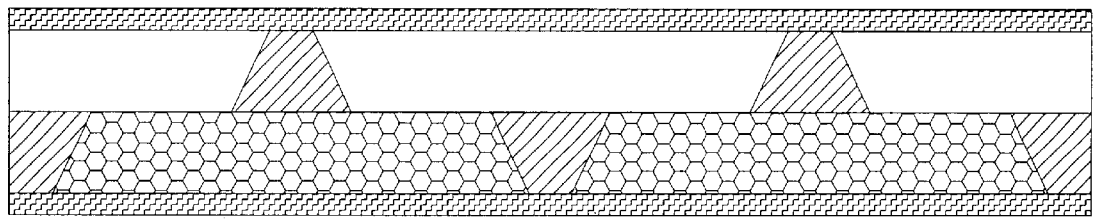
FIG. 67 illustrates a silicon wafer having a plurality of etched channels and a plurality of regions that have a sol-gel derived support structure, and having a thin layer of hexamethyldilazane deposited thereon.

2.50 METHANOL BARRIER—PRIMER DEPOSITION—Primer Oven is used to deposit a thin layer of hexamethyldilazane to increase the photo resist adhesion on the sol-gel surface as shown in FIG. 67.

Figure 68:
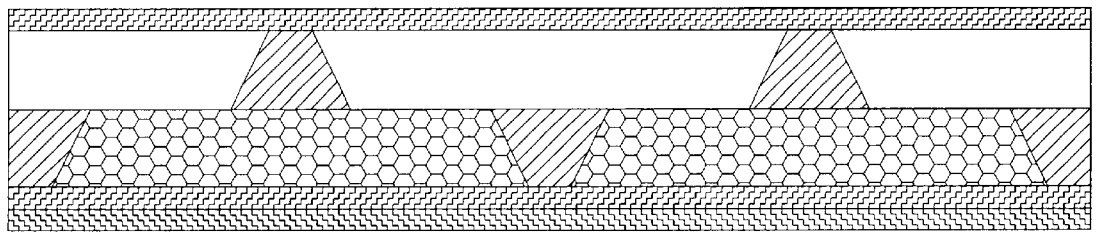
FIG. 68 illustrates a silicon wafer having a plurality of etched channels and a plurality of regions that have a sol-gel derived support structure, and having a thin layer of hexamethyldilazane and photoresist deposited thereon.

2.51 METHANOL BARRIER—SPIN COAT RESIST—Deposit a thin layer of Shipley 1400-31 Resist with a Spin Coater at 3,000 rpm for 30 seconds on S2 as shown in FIG. 68.

2.52 METHANOL BARRIER—POST BAKE RESIST—Place wafer on a hot plate at 145° C. for 45 seconds to harden the resist on S2.

2.53 METHANOL BARRIER—PREPARE RESIST—Immerse sample in chlorobenzene solution for 10 minutes.

Figure 69:
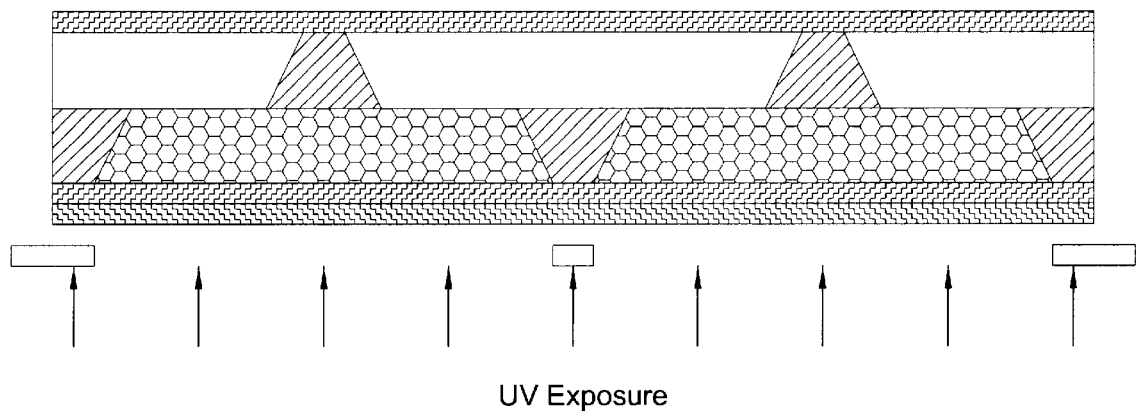
FIG. 69 illustrates the transferring of a pattern onto a photoresist layer associated with a silicon wafer.

2.54 METHANOL BARRIER—UV EXPOSURE—Transfer pattern on mask onto the photo-resist layer with an IR contact aligner under UV for 15 seconds as shown in FIG. 69.

Figure 70:
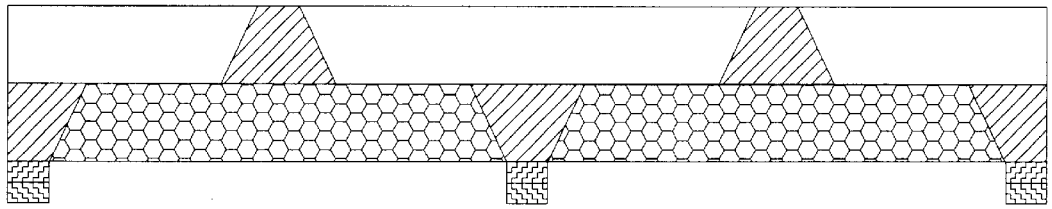
FIG. 70 illustrates a silicon wafer having a developed photoresist layer removed therefrom.

2.55 METHANOL BARRIER—DEVELOP PATTERN—Immerse sample in Microposit Developer Concentrate solution for 60 seconds to develop Pattern onto wafer as shown in FIG. 70.

2.56 METHANOL BARRIER—RINSE AND DRY—Use a Verteq Spin/Dryer to (1) clean substrate by rinsing with DI H$_2$O at 300 rpm for 5 minutes; then (2) dry with N$_2$ at 900 rpm for 10 minutes.

2.57 METHANOL BARRIER—POST BAKE RESIST—Place wafer on a hot plate at 145° C. for 45 seconds to harden the Resist.

2.58 METHANOL BARRIER—SPUTTER DIFFUSION BARRIER—Deposit a layer of Ti/W alloy 100 Å thick onto S2 of the porous substrate using the MRC sputtersphere. The purpose of this layer is to promote adhesion and prevent reactions between the bulk diffusion layer and the substrate.

Figure 71:
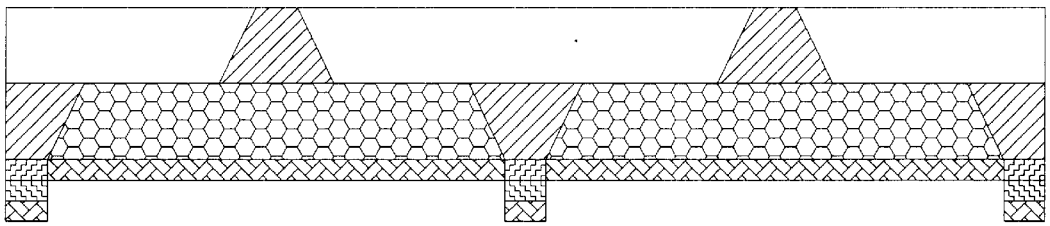
FIG. 71 illustrates a silicon wafer having a palladium layer deposited thereon, wherein the palladium layer defines a plurality of palladium plugs aligned in rows across the silicon wafer.

2.59 METHANOL BARRIER—EVAPORATE PALLADIUM LAYER—Deposit the bulk palladium (or vanadium) layer onto S2 of the porous substrate using the Temescal e-Beam evaporator as shown in FIG. 71. The thickness of the bulk diffusion layer should be twice that of the average porosity of the substrate in order to ensure that there are no pin-holes or other defects that would allow methanol to diffuse through the methanol blocker. Because of process limitations with respect to the Temescal e-Beam evaporator, the metal will need to be deposited in 0.5 $\mu$m increments, after which vacuum will need to be broken, the metal source will need to be refilled and vacuum reestablished. The deposition pressure is $3.0 \times 10^{-6}$ Torr and the deposition rate is 100 Å per minute.

Figure 72:
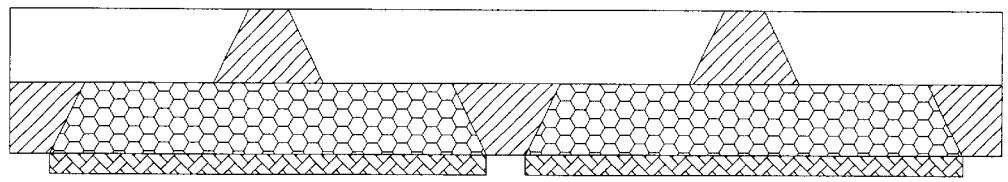
FIG. 72 illustrates a silicon wafer have a remaining layer of photoresist removed therefrom.

2.60 METHANOL BARRIER—RESIST STRIP—Remove the remaining photo-resist by immersing in acetone (removal of strip with acetone is fast) as shown in FIG. 72. Rinse in DI H$_2$O solution for final cleaning at room temperature. Contacts will be approximately 1 mm×1 mm with wires approximately 500 $\mu$m.

2.61 METHANOL BARRIER—ANNEAL—Anneal the bulk diffusion layer covered porous substrate in an atmosphere of argon gas for 1 hour at 300° C.

2.62 METHANOL BARRIER—ELECTROCHEMICALLY CLEAN—Place the bulk diffusion layer covered porous substrate into the substrate cleaning bath. The bath is a solution of Sulfuric Acid with a pH of 1. Apply a potential to the substrate of between +0.8 and +1.6 V for one minute. This step is employed in order to remove any surface oxides or contaminates from the exposed surface of the bulk diffusion layer.

2.63 METHANOL BARRIER—ELECTROPLATE PALLADIUM—Place the bulk diffusion layer covered porous substrate into the palladium electroplating bath. Deposit a layer of palladium 0.5 $\mu$m thick from a palladium bath consisting of 10 g/L palladium (Pd Bath 450, Degussa AG, Schwabisch Gmund, West Germany) at a deposition rate of 0.26 $\mu$m/min at 0.5 to 2 A/dm$^2$. The plating bath should not exceed 35° C.

2.64 METHANOL BARRIER—ULTRASONICALLY CLEAN—Suspend the palladium electroplated bulk diffusion layer in a DI—H$_2$O rinse bath for 20 minutes and ultrasonically agitate.

2.65 METHANOL BARRIER—ELECTROPLATE PLATINUM—Place the bulk diffusion layer covered porous substrate into the platinum electroplating bath. Deposit a layer of platinum 0.5 $\mu$m thick from a platinum bath (Pt 5Q from Johnson Matthey) at pH of 10.6 and at 2 mA/cm$^2$ at 95° C.

2.66 METHANOL BARRIER—ULTRASONICALLY CLEAN—Place the palladium:platinum electroplated bulk diffusion layer into the DI-H$_2$O rinse bath for 20 minutes and ultrasonically agitate.

2.67 METHANOL BARRIER—ANNEAL—Anneal the bulk diffusion layer covered porous substrate in an atmosphere of argon gas for 1 hour at 300° C.

2.68 CATALYST—ACTIVATION—Heat the silicon wafer under flowing 1% H$_2$ in N$_2$. The temperature should be rapidly increased from room temperature to 400° C. at a rate of 25° C. per minute, approximately 15 minutes, and held at 400° C. for 4 hrs.

Figure 73:
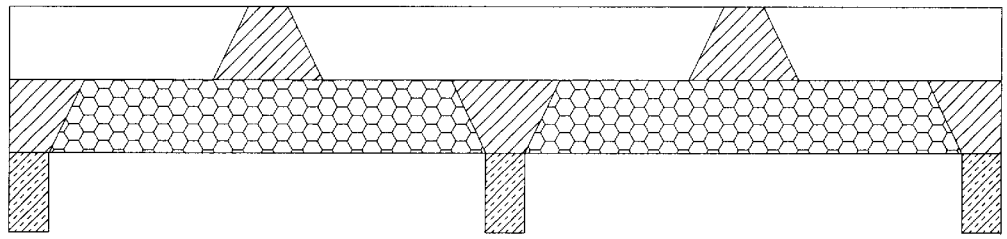
FIG. 73 illustrates a silicon wafer having wafer having a plurality of etched channels and a plurality of porous regions, and having a wafer bonding material applied thereon.

MEA FABRICATION—The MEA fabrication or the anode/electrolyte/cathode assembly steps involves further processing the anode and cathode so as to form a membrane electrode assembly by (1) wafer bonding the anode and cathode together, and (2) depositing a solid polymer electrolyte between the anode and cathode as set forth below:

3.1 WAFER BONDING—GLASS DEPOSITION—Glass (Corning Type 7740) paste screen printing, 25 microns wet condition, on S2 of the anode as shown in FIG. 73. The paste shall be dried off and binder is burned out in air at 300° C.

Figure 74:
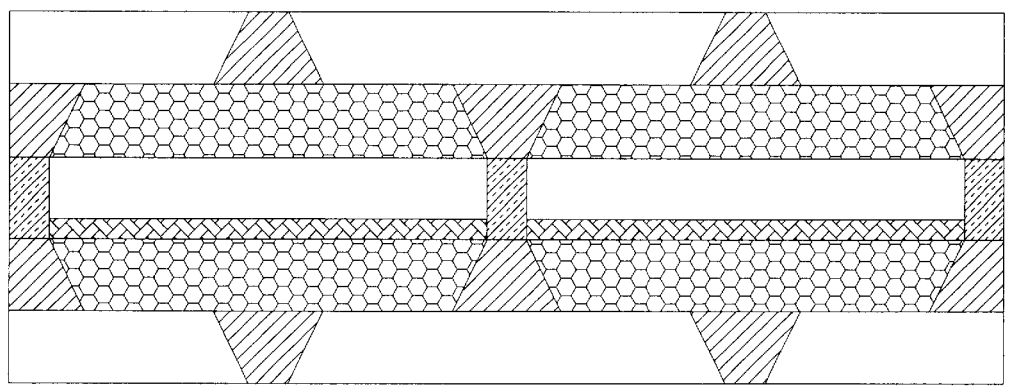
FIG. 74 illustrates an electrode assembly in accordance with an embodiment of the present invention.

3.2 WAFER BONDING—WAFER BOND—The two electrodes are aligned and pressed together gently. The assembly is heated to 300° C.–500° C. A constant pressure of 0.5–1 lb/cm$^2$ is applied to the assembly. The assembly is maintained at elevated temperature and pressure for at least 30 minutes. The assembly, as shown in FIG. 74, is cooled down slowly afterwards.

3.3 SOLID ELECTROLYTE POLYMER—CLEAN—Clean piece to be impregnated by soaking in semiconductor-grade isopropanol (or ethanol or methanol) for several hours. Rinse with same solvent.

3.4 SOLID ELECTROLYTE POLYMER—DRY—Dry porous structure by baking in vacuum oven at 200° C.–300° C. for several hours. Cool back to room temperature under vacuum.

3.5 SOLID ELECTROLYTE POLYMER—PRIME DEPOSITION—Primer Oven is used to deposit a thin layer of hexamethyldilazane to increase the Nafion adhesion on the silicon wafer surface.

Figure 75:
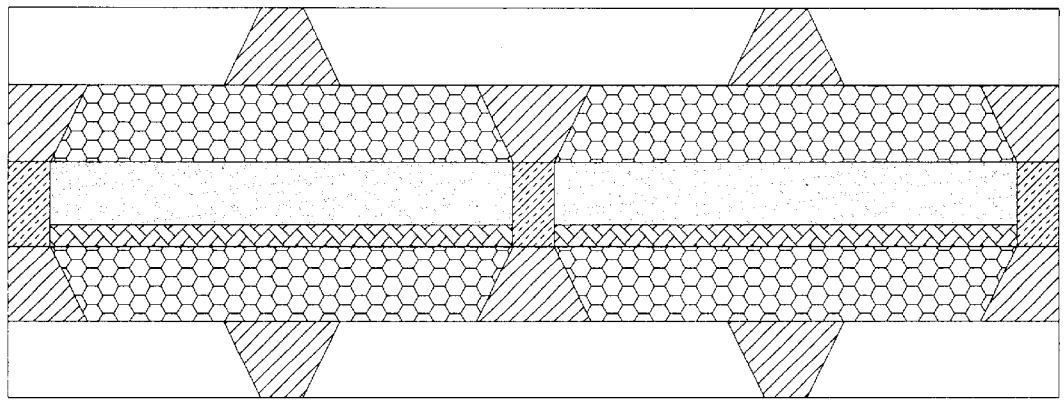
FIG. 75 illustrates an electrode assembly in accordance with an embodiment of the present invention.

3.6 SOLID ELECTROLYTE POLYMER—NAFION SOLUTION—Immerse piece immediately in commercially available Nafion solution, bubbles should rise from the surface indicating solution displacing air inside the pores. Leave uncovered until solution evaporates as shown in FIG. 75.

3.7 SOLID ELECTROLYTE POLYMER—CURE—To cure onto the surface and dry out any excess solvent, bake in vacuum oven at no higher than 130° C. for 1 hour.

EXAMPLE 4

SOL-GEL SUPPORT STRUCTURE ELECTRODE ASSEMBLY

This example discloses an electrode assembly adapted for use with a fuel cell, wherein the membrane electrode assembly comprises: a planar anode made from a sol-gel derived support structure; an electrolyte layer; a planar cathode made from a sol-gel derived support structure; and optionally a blocking layer that is substantially impermeable to at least methanol and is substantially permeable to protons; wherein the planar anode and the planar cathode are spaced apart and substantially parallel to each other so as to define a spaced apart region, wherein the electrolyte layer and optional blocking layer are interposed between the planar anode and the planar cathode and within at least a portion of the spaced apart region.

In this example, the processing steps consist essentially of (1) the anode fabrication steps, (2) the cathode fabrication steps, and (3) the anode/electrolyte/cathode fabrication steps. However, the anode and cathode fabrication steps in this example are identical to the anode and cathode fabrication steps of Example 3; therefore, these steps are not repeated here. Rather, the difference in this example (and resulting electrode assembly structure) reside in the MEA fabrication or the anode/electrolyte/cathode assembly steps. Accordingly, only the further processing steps with the MEA fabrication are set forth below, with reference to FIGS. 76 to 78:

3.1 SOLID ELECTROLYTE POLYMER—CLEAN—Clean both the anode and cathode to be impregnated by soaking in semiconductor-grade isopropanol (or ethanol or methanol) for several hours. Rinse with same solvent.

3.2 SOLID ELECTROLYTE POLYMER—DRY—Dry porous structure by baking in vacuum oven at 200° C.–300° C. for several hours. Cool back to room temperature under vacuum.

3.3 SOLID ELECTROLYTE POLYMER—PRIME DEPOSITION—Primer Oven is used to deposit a thin layer of hexamethyldisiloxane to increase the Nafion adhesion on the silicon wafer surface.

3.4 SOLID ELECTROLYTE POLYMER—NAFION SOLUTION—Immerse piece immediately in commercially available Nafion solution, bubbles should rise from the surface indicating solution displacing air inside the pores. Leave uncovered until solution evaporates.

3.5 SOLID ELECTROLYTE POLYMER—CURE—To cure onto the surface and dry out any excess solvent, bake in vacuum oven at no higher than 130° C. for 1 hour.

Figure 76:
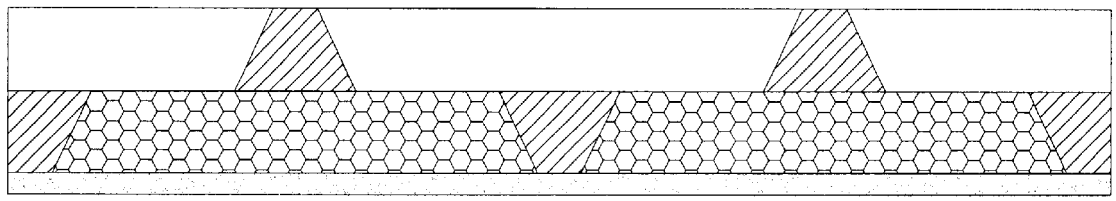
FIG. 76 illustrates a silicon wafer having a plurality of etched channels and a plurality of porous regions, and having a solid electrolyte coating applied thereon.
Figure 77:
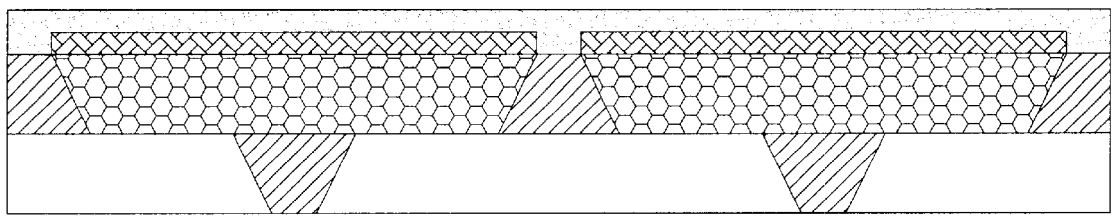
FIG. 77 illustrates a silicon wafer having a plurality of etched channels and a plurality of porous regions together a palladium blocking layer, and having a solid electrolyte coating applied thereon.

3.6 SOLID ELECTROLYTE POLYMER—NAFION SOLUTION—Spin coat 3 ml of Nafion 117 solution at 900 rpm for 30 seconds onto S2 of both electrodes, as shown in FIGS. 76 and 77, respectively.

3.7 SOLID ELECTROLYTE POLYMER—DRY—Dry the spin-coated Nafion coatings on both electrodes in ambient air for 10 minutes.

Figure 78:
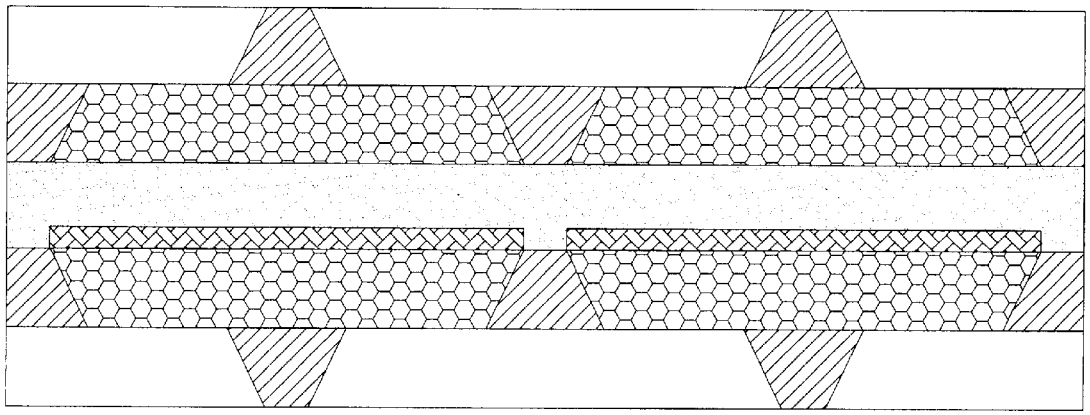
FIG. 78 illustrates an electrode assembly in accordance with an embodiment of the present invention.

3.8 SOLID ELECTROLYTE POLYMER—NAFION MEMBRANE—Align a 50 μm thick Nafion 117 Proton Exchange Membrane in between the two electrodes and place the assembly into a hot press. Raise the temperature of the hot press to 90° C. and hold for 30 minutes, then increase the temperature to 130° C. Apply 0.2 MPa of pressure when the hot press reaches 130° C. and hold for 5 minutes. Release the pressure after the hot press is cooled to room temperature as shown in FIG. 78.

In the disclosure set forth herein, reference has been made to several patents and other publications. These patents and publications are expressly incorporated herein by reference in their entireties; therefore, they constitute part of this disclosure.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

We claim:

1. An electrode assembly adapted for use with a fuel cell, comprising:

an anode derived from a first planar silicon substrate;

an electrolyte;

a cathode derived from a second planar silicon substrate;

wherein the anode and the cathode are spaced apart and substantially parallel to each other so as to define a spaced apart region, and wherein the electrolyte is interposed between the anode and the cathode, and wherein the anode and the cathode each have a plurality of porous regions that define anode pore surfaces and cathode pore surfaces, and wherein the anode pore surfaces and the cathode pore surfaces each have a catalyst dispersed thereon such that the catalyst is noncontiguously dispersed throughout the plurality of porous regions of the anode and the cathode.

2. The electrode assembly of claim 1 wherein the first and second planar silicon substrates are silicon wafers.

3. The electrode assembly of claim 1, further comprising a blocking media that is substantially impermeable to at least methanol and is substantially permeable to hydrogen atoms, wherein the blocking media is interposed between the anode and the cathode.

4. The electrode assembly of claim 3 wherein the blocking media is integrally connected to the cathode.

5. The electrode assembly of claim 3 wherein the blocking media comprises a metallic membrane.

6. The electrode assembly of claim 3 wherein the blocking media comprises palladium, niobium, tantalum, vanadium, or a combination thereof.

7. The electrode assembly of claim 3 wherein the blocking media is a plurality of proton conducting plugs.

8. The electrode assembly of claim 1 wherein the anode has a plurality of etched or micromachined flow channels.

9. The electrode assembly of claim 1 wherein the catalyst dispersed on the anode pore surfaces comprises a plurality of metallic particles.

10. The electrode assembly of claim 9 wherein the metallic particles are derived from platinum and ruthenium precursors.

11. The electrode assembly of claim 1 wherein the cathode has a plurality of etched or micromachined flow channels.

12. The electrode assembly of claim 1 wherein the plurality of porous regions of the cathode are nanoporous, mesoporous, and/or macroporous.

13. The electrode assembly of claim 1 wherein the plurality of porous regions of the cathode are mesoporous, wherein each of the plurality of mesoporous regions comprise a random array of sponge-like interconnected pores having an open cell structure.

14. The electrode assembly of claim 1 wherein the catalyst dispersed on the cathode pore surfaces comprises a plurality of metallic particles.

15. The electrode assembly of claim 14 wherein the metallic particles are derived from a platinum precursor.

16. The electrode assembly of claim 1 wherein the electrolyte comprises a solid polymer electrolyte.

17. The electrode assembly of claim 16 wherein the solid polymer electrolyte comprises a perfluorosulfonic polymer membrane.

18. The electrode assembly of claim 1 wherein the electrolyte comprises first and second solid polymer electrolyte coatings and an acid, wherein the first solid polymer electrolyte coating is on the anode, and wherein the second solid polymer electrolyte coating is on the cathode, and wherein the acid is contained in an organic fuel that flows through the anode and the spaced apart region.

19. The electrode assembly of claim 18 wherein the organic fuel comprises water and an alcohol selected from the group consisting ethanol, propanol, methanol, or a combination thereof, and the acid is phosphoric acid, sulfuric acid, or a combination thereof.

20. The electrode assembly of claim 19 wherein the methanol and water are mixed together in about equal molar amounts, and wherein the acid is in amount of about 0.25 M.

21. An electrode assembly adapted for use with a fuel cell, comprising:
an anode derived from a first planar silicon substrate, wherein the anode has integrally associated therewith a plurality of anode sol-gel derived support structures;
an electrolyte;
a cathode derived from a second planar silicon substrate, wherein the cathode has integrally associated therewith a plurality of cathode sol-gel derived support structures;
wherein the anode and the cathode are spaced apart and substantially parallel to each other so as to define a spaced apart region, and wherein the electrolyte is interposed between the anode and the cathode.

22. The electrode assembly of claim 21 wherein the first and second planar silicon substrates are silicon wafers.

23. The electrode assembly of claim 21, further comprising a blocking media that is substantially impermeable to at least methanol and is substantially permeable to hydrogen atoms, wherein the blocking media is interposed between the anode and the cathode.

24. The electrode assembly of claim 23 wherein the blocking media is integrally connected to the cathode.

25. The electrode assembly of claim 23 wherein the blocking media comprises a metallic membrane.

26. The electrode assembly of claim 23 wherein the blocking media comprises palladium, niobium, tantalum, vanadium, or a combination thereof.

27. The electrode assembly of claim 23 wherein the blocking media is a plurality of proton conducting plugs.

28. The electrode assembly of claim 23 wherein the anode has a plurality of etched or micromachined flow channels.

29. The electrode assembly of claim 21 wherein each of the plurality of anode and cathode sol-gel derived support structures contains a solid porous rectangular region having a volume of about $3 \times 10^{-4}$ cm$^3$.

30. The electrode assembly of claim 29 wherein the solid porous rectangular regions of the anode are nanoporous, mesoporous, and/or macroporous.

31. The electrode assembly of claim 29 wherein the solid porous rectangular regions of the anode are mesoporous, and wherein each of the plurality of mesoporous regions comprise a random array a sponge-like interconnected pores having an open cell structure.

32. The electrode assembly of claim 29 wherein the solid porous rectangular regions of the anode contain anode pore surfaces, wherein the anode pore surfaces have a catalyst thereon.

33. The electrode assembly of claim 32 wherein the catalyst comprises a plurality of noncontiguous chemisorbed metallic particles.

34. The electrode assembly of claim 32 wherein the catalyst comprises a chemisorbed bi-metallic catalyst derived from platinum and ruthenium percursors.

35. The electrode assembly of claim 21 wherein the cathode has a plurality of etched or micromachined flow channels.

36. The electrode assembly of claim 29 wherein the solid porous rectangular regions of the cathode are nanoporous, mesoporous, and/or macroporous.

37. The electrode assembly of claim 36 wherein the solid porous rectangular regions of the cathode are mesoporous, wherein each of the plurality of mesoporous regions comprise a random array of sponge-like interconnected pores having an open cell structure.

38. The electrode assembly of claim 37 wherein the solid porous rectangular regions of the cathode contain cathode pore surfaces, wherein the cathode pore surfaces have a catalyst thereon.

39. The electrode assembly of claim 38 wherein the catalyst comprises a plurality of noncontiguous chemisorbed metallic particles.

40. The electrode assembly of claim 38 wherein the catalyst comprises a chemisorbed metallic catalyst derived from a platinum percursor.

41. The electrode assembly of claim 21 wherein the electrolyte comprises a solid polymer electrolyte.

42. The electrode assembly of claim 41 wherein the solid polymer electrolyte comprises a perfluorosulfonic polymer membrane.

43. The electrode assembly of claim 32 wherein the anode pore surfaces having a catalyst thereon, further include at least a portion of the electrolyte thereon, wherein the electrolyte comprises a solid polymer electrolyte.

44. The electrode assembly of claim 43 wherein the solid polymer electrolyte is a thin film having a thickness ranging from about 0.05 to about 0.5 microns.

45. The electrode assembly of claim 38 wherein the cathode pore surfaces having a catalyst thereon, further include at least a portion of the electrolyte thereon, wherein the electrolyte comprises a solid polymer electrolyte.

46. The electrode assembly of claim 45 wherein the solid polymer electrolyte is a thin film having a thickness ranging from about 0.05 to about 0.5 microns.

47. The electrode assembly of claim 21 wherein the electrolyte comprises first and second solid polymer electrolyte coatings and an acid, wherein the first solid polymer electrolyte coating is on the anode, and wherein the second solid polymer coating is on the cathode, and wherein the acid is contained in an organic fuel that flows through the anode and the spaced apart region.

48. The electrode assembly of claim 47 wherein the organic fuel comprises water and an alcohol selected from the group consisting ethanol, propanol, methanol, or a combination thereof, and the acid is phosphoric acid, sulfuric acid, or a combination thereof.

49. The electrode assembly of claim 48 wherein the methanol and water are mixed together in about equal molar amounts, and wherein the acid is in amount of about 0.25 M.

50. The electrode assembly of claim 1, further comprising a spacing structure, wherein the spacing structure spans across the spaced apart region and connects the anode to the cathode.

51. The electrode assembly of claim 21, further comprising a spacing structure, wherein the spacing structure spans across the spaced apart region and connects the anode to the cathode.

52. A hydrogen or hydrocarbon fuel cell, comprising the electrode assembly of claim 1 or 21.

53. An electrode assembly adapted for use with a fuel cell, comprising:

anode derived from a first planar silicon substrate;

an electrolyte;

a cathode derived from a second planar silicon substrate;

wherein the anode and the cathode are spaced apart and substantially parallel to each other so as to define a spaced apart region, and wherein the electrolyte is interposed between the anode and the cathode, and wherein the anode and the cathode each have a plurality of porous regions that define anode pore surfaces and cathode pore surfaces, and wherein the anode pore surfaces and the cathode pore surfaces each have a catalyst dispersed thereon such that the catalyst is noncontiguously dispersed throughout the plurality of porous regions of the anode and the cathode, and wherein the anode and the cathode each have been doped such that the anode and the cathode are each capable of functioning as a current conductor.

54. An electrode assembly adapted for use with a fuel cell, comprising:

anode derived from a first planar silicon substrate;

an electrolyte;

a cathode derived from a second planar silicon substrate;

wherein the anode and the cathode are spaced apart and substantially parallel to each other so as to define a spaced apart region, and wherein the electrolyte is interposed between the anode and the cathode, and wherein the anode and the cathode each have a plurality of porous regions that are separated from one another by a plurality of nonporous silicon regions and that define anode pore surfaces and cathode pore surfaces, and wherein the anode pore surfaces and the cathode pore surfaces each have a catalyst dispersed thereon such that the catalyst is noncontiguously dispersed throughout the plurality of porous regions of the anode and the cathode.

55. An electrode assembly adapted for use with a fuel cell, comprising:

anode derived from a first planar silicon substrate;

an electrolyte;

a cathode derived from a second planar silicon substrate;

wherein the anode and the cathode are spaced apart and substantially parallel to each other so as to define a spaced apart region, and wherein the electrolyte is interposed between the anode and the cathode, and wherein the anode and the cathode each have a plurality of porous regions that are separated from one another by a plurality of nonporous silicon regions and that define anode pore surfaces and cathode pore surfaces, and wherein the anode pore surfaces and the cathode pore surfaces each have a catalyst dispersed thereon such that the catalyst is noncontiguously dispersed throughout the plurality of porous regions of the anode and the cathode, and wherein the anode and the cathode each have been doped such that the anode and the cathode are each capable of serving as a current conductor.

* * * * *